US012354437B2

(12) United States Patent
Shigeta

(10) Patent No.: US 12,354,437 B2
(45) Date of Patent: *Jul. 8, 2025

(54) GAME MANAGEMENT SYSTEM

(71) Applicant: ANGEL GROUP CO., LTD., Shiga (JP)

(72) Inventor: Yasushi Shigeta, Shiga (JP)

(73) Assignee: ANGEL GROUP CO., LTD., Shiga (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/225,818

(22) Filed: Jul. 25, 2023

(65) Prior Publication Data

US 2023/0368611 A1 Nov. 16, 2023

Related U.S. Application Data

(63) Continuation of application No. 17/400,691, filed on Aug. 12, 2021, now Pat. No. 11,783,670, which is a (Continued)

(30) Foreign Application Priority Data

Jun. 28, 2017 (JP) ................................ 2017-125723

(51) Int. Cl.

*G07F 17/32* (2006.01)
*A63F 1/00* (2006.01)

(Continued)

(52) U.S. Cl.

CPC ............ *G07F 17/3241* (2013.01); *A63F 1/18* (2013.01); *A63F 3/00157* (2013.01);

(Continued)

(58) Field of Classification Search

CPC ............. G07F 17/3241; G07F 17/3206; G07F 17/322; G07F 17/3223; G07F 17/3234;

(Continued)

(56) References Cited

U.S. PATENT DOCUMENTS 6,460,848 B1 10/2002 Soltys et al.
8,087,983 B2 1/2012 Longway (Continued)

FOREIGN PATENT DOCUMENTS

CN 1639729 A 7/2005
CN 102125756 A 7/2011

(Continued)

OTHER PUBLICATIONS

US Office Action dated Mar. 4, 2024 issued in U.S. Appl. No. 17/895,702.

(Continued)

*Primary Examiner* — Ronald Laneau

(74) *Attorney, Agent, or Firm* — NORTON ROSE FULBRIGHT US LLP

(57) ABSTRACT

A game management system manages a casino game performed in a plurality of tables in casino facilities. The game management system includes: a camera obtaining an image by capturing bet gaming tokens; a control device specifying a betting amount on the basis of the type and the number of gaming tokens in the image by specifying a betting target on the basis of a position of the gaming token in the image; a card distribution device determining a game result of the casino game; an arithmetic device calculating a profit of a casino manager for each table and each game of the plurality of tables, on the basis of the betting target, the betting amount, and the game result; and a recording apparatus recording the profit.

10 Claims, 60 Drawing Sheets

Related U.S. Application Data continuation of application No. 16/710,247, filed on Dec. 11, 2019, now Pat. No. 11,158,161, which is a continuation of application No. 16/021,768, filed on Jun. 28, 2018, now Pat. No. 10,580,254.

(51) Int. Cl.

| | |
|---|---|
| ***A63F 1/14*** | (2006.01) |
| ***A63F 1/18*** | (2006.01) |
| ***A63F 3/00*** | (2006.01) |
| ***G06Q 50/34*** | (2012.01) |

(52) U.S. Cl.

CPC ......... *G06Q 50/34* (2013.01); *G07F 17/3206* (2013.01); *G07F 17/322* (2013.01); *G07F 17/3223* (2013.01); *G07F 17/3234* (2013.01); *G07F 17/3248* (2013.01); *G07F 17/3251* (2013.01); *G07F 17/3293* (2013.01); *A63F 2001/001* (2013.01); *A63F 1/14* (2013.01); *A63F 2250/58* (2013.01)

(58) Field of Classification Search

CPC ............. G07F 17/3248; G07F 17/3251; G07F 17/3293; A63F 1/18; A63F 3/00157; A63F 1/14; A63F 2001/001; A63F 2250/58; A63F 2009/2435; A63F 2300/5586; A63F 13/75; G06Q 50/34; G06N 3/08; G06V 10/255; G06V 20/64; G06V 40/103; G06V 40/28; H04N 7/181

See application file for complete search history.

(56) References Cited

U.S. PATENT DOCUMENTS

| | | | | |
|---|---|---|---|---|
| 8,285,034 | B2 | 10/2012 | Rajaraman et al. | |
| 9,378,615 | B2 | 6/2016 | Emori et al. | |
| 9,919,201 | B2 | 3/2018 | Walker | |
| 10,032,335 | B2 | 7/2018 | Shigeta | |
| 10,580,254 | B2 | 3/2020 | Shigeta | |
| 10,956,750 | B2 | 3/2021 | Nhat et al. | |
| 11,367,325 | B2 | 6/2022 | Shigeta | |
| 11,410,494 | B2 | 8/2022 | Shigeta | |
| 11,443,586 | B2 | 9/2022 | Shigeta | |
| 11,450,173 | B2 | 9/2022 | Emeric et al. | |
| 2003/0003997 | A1 | 1/2003 | Vuong et al. | |
| 2003/0036425 | A1 | 2/2003 | Kaminkow et al. | |
| 2003/0220136 | A1 | 11/2003 | Soltys et al. | |
| 2004/0147313 | A1 | 7/2004 | Stanley et al. | |
| 2004/0176975 | A1 | 9/2004 | Fujimoto | |
| 2005/0026680 | A1 | 2/2005 | Gururajan | |
| 2005/0051955 | A1 | 3/2005 | Schbert et al. | |
| 2005/0233803 | A1 | 10/2005 | Yang | |
| 2006/0160600 | A1 | 7/2006 | Hill et al. | |
| 2006/0177109 | A1 | 8/2006 | Storch | |
| 2006/0252521 | A1 | 11/2006 | Gururajan et al. | |
| 2006/0281537 | A1 | 12/2006 | Abbott et al. | |
| 2007/0111773 | A1 | 5/2007 | Gururajan et al. | |
| 2008/0180250 | A1 | 7/2008 | Steil | |
| 2009/0075725 | A1 | 3/2009 | Koyama | |
| 2009/0191933 | A1 | 7/2009 | French | |
| 2010/0167811 | A1 | 7/2010 | Denham et al. | |
| 2011/0052049 | A1 | 3/2011 | Rajaraman et al. | |
| 2011/0127722 | A1 | 6/2011 | Emori et al. | |
| 2011/0128382 | A1 | 6/2011 | Pennington et al. | |
| 2012/0040727 | A1 | 2/2012 | Gururajan et al. | |
| 2012/0329537 | A1 | 12/2012 | Gururajan et al. | |
| 2013/0172062 | A1* | 7/2013 | Amaitis | G07F 17/3293 463/13 |
| 2013/0310165 | A1 | 11/2013 | Witty et al. | |
| 2014/0094239 | A1 | 4/2014 | Grauzer et al. | |
| 2015/0087417 | A1 | 3/2015 | George et al. | |
| 2015/0199872 | A1 | 7/2015 | George et al. | |
| 2015/0258420 | A1 | 9/2015 | Shigeta | |
| 2015/0312517 | A1 | 10/2015 | Hoyt et al. | |
| 2015/0375096 | A1 | 12/2015 | Jackson et al. | |
| 2016/0240035 | A1 | 8/2016 | Merrell et al. | |
| 2016/0335837 | A1 | 11/2016 | Shigeta | |
| 2016/0371933 | A1 | 12/2016 | Nicely | |
| 2017/0039807 | A1 | 2/2017 | Shigeta | |
| 2017/0169667 | A1 | 6/2017 | Montgomery et al. | |
| 2017/0274272 | A1 | 9/2017 | Shigeta | |
| 2017/0309128 | A1 | 10/2017 | Shigeta | |
| 2018/0114406 | A1 | 4/2018 | Shigeta | |
| 2018/0232987 | A1 | 8/2018 | Shigeta | |
| 2018/0350191 | A1 | 12/2018 | Shigeta | |
| 2019/0005767 | A1 | 1/2019 | Shigeta | |
| 2019/0035210 | A1 | 1/2019 | Bulzacki et al. | |
| 2019/0073855 | A1 | 3/2019 | Moore et al. | |
| 2019/0088082 | A1 | 3/2019 | Shigeta | |
| 2019/0130700 | A1 | 5/2019 | Oguchi et al. | |
| 2019/0206177 | A1 | 7/2019 | Shigeta | |
| 2019/0251786 | A1 | 8/2019 | Shigeta | |
| 2020/0294359 | A1 | 9/2020 | Bulzacki et al. | |
| 2021/0019989 | A1 | 1/2021 | Bulzacki et al. | |
| 2021/0350665 | A1* | 11/2021 | Shigeta | G07F 17/3234 |
| 2022/0198876 | A1* | 6/2022 | Shigeta | G06K 19/0723 |
| 2024/0013617 | A1 | 1/2024 | Arbogast et al. | |

FOREIGN PATENT DOCUMENTS

| | | | |
|---|---|---|---|
| CN | 105005906 | A | 10/2015 |
| CN | 105120206 | A | 12/2015 |
| CN | 106062836 | A | 10/2016 |
| CN | 106408785 | A | 2/2017 |
| CN | 106463024 | A | 2/2017 |
| CN | 107073330 | A | 8/2017 |
| EP | 3479879 | A1 | 5/2019 |
| JP | 2002216247 | A | 8/2002 |
| JP | 2004199208 | A | 7/2004 |
| JP | 2008302236 | A | 12/2008 |
| JP | 2010128915 | A | 6/2010 |
| JP | 2014083414 | A | 5/2014 |
| JP | 2015-198935 | A | 11/2015 |
| JP | 2016-045819 | A | 4/2016 |
| JP | 2017-018501 | A | 1/2017 |
| JP | 2017064386 | A | 4/2017 |
| KR | 1020060043058 | A | 5/2006 |
| KR | 1020070099820 | A1 | 10/2007 |
| KR | 1020170016303 | A | 2/2017 |
| WO | 2015/107902 | A1 | 7/2015 |
| WO | 2015164523 | A1 | 10/2015 |
| WO | 2016092711 | A1 | 6/2016 |
| WO | 2017/022767 | A1 | 2/2017 |
| WO | 2017022673 | A1 | 2/2017 |
| WO | 2017022766 | A | 2/2017 |
| WO | 2017086412 | A | 5/2017 |
| WO | 2018/025752 | A1 | 2/2018 |

OTHER PUBLICATIONS

US Office Action dated Mar. 7, 2024 issued in U.S. Appl. No. 17/895,750.

Japanese Office Action dated Nov. 7, 2023 issued in JP Application 2022-126788.

Korean application No. 10-2018-0074349, Office Action dated Oct. 23, 2019.

Macao application No. 1/001576, Office Action dated Jul. 3, 2019.

Japanese application No. JP2018-110257, Office Action dated Apr. 2, 2019.

European application No. 18180201.8, European Extended Search Report dated Sep. 10, 2018.

New Zealand application No. 743932, First Examination Report dated Nov. 6, 2018.

Chinese Office Action dated Jun. 24, 2020 issued in CN application No. 201810684822.4.

Filipino Office Action dated Jun. 11, 2020 issued in PH application No. 1-2018-000185.

Singaporean Office Action dated Oct. 20, 2020 issued in SG application No. 10201805585X.

(56) References Cited

OTHER PUBLICATIONS

Filipino application No. 1-20180000185, Office Action dated Jan. 14, 2020.
Japanese Office Action dated May 11, 2021 issued in JP application No. 2020-075646.
Korean Notice of Grant dated 2022-03-30 issued in KR Application 10-2020-0113807.
Japanese Office Action dated May 17, 2022 issued in JP Application 2021-093603.
Japanese Office Action dated Jun. 14, 2022 2022 issued in JP Application 2021-114075.
Chinese Office Action dated Jun. 17, 2022 issued in CN Application 202110934118.1.
Chinese Office Action dated Jun. 17, 2022 issued in CN Application 202110931840.X.
Australian Office Action dated Jul. 18, 2022 issued in AU Application 2021215222.
US Office Action dated Feb. 6, 2023 issued in U.S. Appl. No. 17/381,519.
Japanese Office Action dated May 2, 2023 issued in JP Application 2022-126788.
Australian Office Action dated Aug. 17, 2023 issued in AU Application 2022224728.
Chinese Office Action dated May 31, 2024 issued in CN Application 202210303362.2.
US Office Action dated Jul. 25, 2024 issued in U.S. Appl. No. 18/222,076.
Japanese Office Action mailed on Feb. 18, 2025, issued in JP Application No. 2024-048268.
New Zealand Patent Examination Report dated Mar. 12, 2025, issued in NZ Application No. 800744.

* cited by examiner

Fig. 21

| Table No. | Chip Count | | | | | | | | Total Amount |
|---|---|---|---|---|---|---|---|---|---|
| | $100,000 | $50,000 | $10,000 | $5,000 | $1,000 | $500 | $100 | $25 | |
| 1 | 4 | 10 | 37 | 43 | 62 | 70 | 85 | 26 | $1,591,150 |
| 2 | 5 | 11 | 35 | 20 | 89 | 67 | 82 | 23 | $1,631,275 |
| 3 | 5 | 12 | 36 | 36 | 56 | 66 | 52 | 36 | $1,735,100 |
| 4 | 2 | 7 | 49 | 45 | 78 | 65 | 61 | 31 | $1,382,375 |
| 5 | 3 | 15 | 36 | 18 | 52 | 63 | 70 | 25 | $1,591,125 |
| 6 | 4 | 10 | 44 | 41 | 80 | 60 | 80 | 38 | $1,663,950 |
| 7 | 6 | 5 | 34 | 26 | 51 | 66 | 77 | 42 | $1,412,750 |
| · | · | · | · | · | · | · | · | · | · |
| · | · | · | · | · | · | · | · | · | · |
| · | · | · | · | · | · | · | · | · | · |
| 73 | 36 | 24 | 50 | 20 | 12 | 27 | 31 | 18 | $5,429,050 |
| 74 | 47 | 20 | 28 | 21 | 46 | 21 | 40 | 12 | $6,145,800 |
| 75 | 4 | 5 | 30 | 20 | 66 | 68 | 80 | 27 | $1,158,675 |
| Total | 311 | 750 | 2904 | 2454 | 5014 | 4896 | 5432 | 2368 | $117,974,400 |

Fig. 22

Table 1

| Game No. | $100,000 | $50,000 | $10,000 | $5,000 | $1,000 | $500 | $100 | $25 | Total Amount |
|---|---|---|---|---|---|---|---|---|---|
| 1 | 0 | 0 | 0 | 0 | 1 | 1 | 3 | 1 | $1,825 |
| 2 | 0 | 0 | 1 | 0 | 0 | 2 | 4 | 0 | $11,400 |
| 3 | 0 | 0 | 0 | 2 | 3 | 3 | 2 | 0 | $14,700 |
| . | . | . | . | . | . | . | . | . | . |
| . | . | . | . | . | . | . | . | . | . |
| . | . | . | . | . | . | . | . | . | . |
| 79 | 0 | 0 | 2 | 0 | 2 | 0 | 2 | 1 | $22,225 |
| 80 | 0 | 0 | 0 | 1 | 0 | 1 | 2 | 0 | $5,700 |
| Total | 4 | 10 | 37 | 43 | 62 | 70 | 85 | 26 | $1,591,150 |

Fig. 23

| Table No. | Total Bet Amount | Gross Profit | Profit Ratio |
|---|---|---|---|
| 1 | $1,700,200 | $42,505 | 2.5% |
| 2 | $1,460,400 | $58,416 | 4.0% |
| 3 | $1,050,500 | -$21,010 | -2.0% |
| 4 | $1,650,700 | $39,617 | 2.4% |
| 5 | $968,000 | $32,912 | 3.4% |
| 6 | $1,104,200 | $16,563 | 1.5% |
| 7 | $1,458,500 | $90,427 | 6.2% |
| . | . | . | . |
| . | . | . | . |
| . | . | . | . |
| 75 | $1,755,425 | $43,886 | 2.5% |
| Total | $100,633,929 | $3,019,018 | 3.0% |

Fig. 28

| |
|---|
| MEMBER ID |
| RETAINED POINT |
| RECENT BALANCE |
| ACQUISITION POINT FOR LAST THREE DAYS |
| ACQUISITION POINT FOR LAST ONE MONTH |
| ACQUISITION POINT FOR LAST ONE YEAR |

Fig. 38

| | | | | | | | | | | | | | | |
|---|---|---|---|---|---|---|---|---|---|---|---|---|---|---|
| DATA AND TIME | 2018/3/14 20:38 | | | | | | | | | | | | | |
| TABLE ID | T0001 | | | | | | | | | | | | | |
| LAYOUT | Type-a | | | | | | | | | | | | | |
| MINIMUM BET AMOUNT | $100 | | | | | | | | | | | | | |
| DEALER ID | D0001 | | | | | | | | | | | | | |
| BET TIME | '46 | | | | | | | | | | | | | |
| GAMING TIME | 1'03 | | | | | | | | | | | | | |
| CHIP COLLECTION TIME | '16 | | | | | | | | | | | | | |
| CHIP WITHDRAWAL TIME | '42 | | | | | | | | | | | | | |
| GAME RESULT | PLAYER | | | | | | | | | | | | | |
| START DEALER CHIP AMOUNT | 5,825,410 | | | | | | | | | | | | | |
| POST-LIQUIDATION DEALER CHIP AMOUNT | 5,825,660 | | | | | | | | | | | | | |
| VERIFICATION RESULT | OK | | | | | | | | | | | | | |
| POSITION | 1 | | 2 | | 3 | | 5 | | 6 | | 7 | | 8 | |
| MEMBER ID | - | | P0001 | | - | | P0002 | | P0003 | | P0004 | | - | |
| BET AMOUNT | 100,000 | - | 100,000 | 0 | 100,000 | - | 100,000 | 0 | 100,000 | 0 | 100,000 | 0 | 100,000 | - |
| | 10,000 | - | 10,000 | 0 | 10,000 | - | 10,000 | 0 | 10,000 | 0 | 10,000 | 0 | 10,000 | - |
| | 1,000 | - | 1,000 | 0 | 1,000 | - | 1,000 | 0 | 1,000 | 0 | 1,000 | 0 | 1,000 | - |
| | 100 | - | 100 | 1 | 100 | - | 100 | 0 | 100 | 3 | 100 | 2 | 100 | - |
| | 10 | - | 10 | 5 | 10 | - | 10 | 0 | 10 | 0 | 10 | 0 | 10 | - |
| BET TARGET | - | | BANKER | | - | | - | | BANKER | | PLAYER | | - | |
| WITHDRAWAL (-) /COLLECTION (+) | - | | +150 | | - | | 0 | | +300 | | -200 | | - | |
| SALES | 650 | | | | | | | | | | | | | |
| NET PROFIT | +250 | | | | | | | | | | | | | |

Fig. 40

Chip Count in Chip Tray for Each Table

15-Mar-18

| Table No. | Chip Count | | | | | | | | Total Amount |
|---|---|---|---|---|---|---|---|---|---|
| | $100,000 | $50,000 | $10,000 | $5,000 | $1,000 | $500 | $100 | $25 | |
| 1 | 4 | 10 | 37 | 43 | 62 | 70 | 85 | 26 | $1,591,150 |
| 2 | 5 | 11 | 35 | 20 | 89 | 67 | 82 | 23 | $1,631,275 |
| 3 | 5 | 12 | 36 | 36 | 56 | 66 | 52 | 36 | $1,735,100 |
| 4 | 2 | 7 | 49 | 45 | 78 | 65 | 61 | 31 | $1,382,375 |
| 5 | 3 | 15 | 36 | 18 | 52 | 63 | 70 | 25 | $1,591,125 |
| 6 | 4 | 10 | 44 | 41 | 80 | 60 | 80 | 38 | $1,663,950 |
| 7 | 6 | 5 | 34 | 26 | 51 | 66 | 77 | 42 | $1,412,750 |
| . | . | . | . | . | . | . | . | . | . |
| . | . | . | . | . | . | . | . | . | . |
| . | . | . | . | . | . | . | . | . | . |
| 73 | 36 | 24 | 50 | 20 | 12 | 27 | 31 | 18 | $5,429,050 |
| 74 | 47 | 20 | 28 | 21 | 46 | 21 | 40 | 12 | $6,145,800 |
| 75 | 4 | 5 | 30 | 20 | 66 | 68 | 80 | 27 | $1,158,675 |
| Total | 311 | 750 | 2,904 | 2,454 | 5,014 | 4,896 | 5,432 | 2,368 | $117,939,900 |

Fig. 41

Profit

15-Mar-18

| Table No. | Total Bet Amount | Gross Profit | Profit Ratio |
|---|---|---|---|
| 1 | $1,700,200 | $42,505 | 2.5% |
| 2 | $1,460,400 | $58,416 | 4.0% |
| 3 | $1,050,500 | -$21,010 | -2.0% |
| 4 | $1,650,700 | $39,617 | 2.4% |
| 5 | $968,000 | $32,912 | 3.4% |
| 6 | $1,104,200 | $16,563 | 1.5% |
| 7 | $1,458,500 | $90,427 | 6.2% |
| . | . | . | . |
| . | . | . | . |
| . | . | . | . |
| 75 | $1,755,425 | $43,886 | 3.3% |
| Total | $100,633,929 | $3,019,018 | 3.0% |

Fig. 44A

| | PLAYER 1 | PLAYER 2 | PLAYER 3 | PLAYER 4 |
|---|---|---|---|---|
| 1 | $1,000 | $3,000 | $2,000 | $1,000 |
| 2 | $1,200 | $3,000 | $1,500 | $1,500 |
| 3 | $2,000 | $2,000 | $1,800 | $1,000 |
| 4 | $1,000 | $3,500 | $2,300 | $1,300 |
| 5 | $1,500 | $2,300 | $1,800 | $1,000 |
| | ↓ | ↓ | ↓ | ↓ |
| MINIMUM AMOUNT | $1,000 | $2,000 | $1,500 | $1,000 |
| | LOW AMOUNT | HIGH AMOUNT | HIGH AMOUNT | LOW AMOUNT |

Fig. 44B

| | PLAYER 1 | PLAYER 2 | PLAYER 3 | PLAYER 4 |
|---|---|---|---|---|
| 1 | $1,000 | $1,500 | $2,000 | $1,300 |
| 2 | $1,200 | $2,000 | $1,000 | $1,500 |
| 3 | $2,000 | $2,000 | $1,500 | $1,100 |
| 4 | $1,000 | $3,000 | $1,300 | $1,300 |
| 5 | $1,500 | $1,500 | $1,800 | $1,200 |
| | ↓ | ↓ | ↓ | ↓ |
| MINIMUM AMOUNT | $1,000 | $1,500 | $1,000 | $1,100 |
| | LOW AMOUNT | HIGH AMOUNT | LOW AMOUNT | LOW AMOUNT |

GAME MANAGEMENT SYSTEM

CROSS REFERENCE TO RELATED APPLICATION

The present application is a continuation of U.S. patent application Ser. No. 17/400,691 filed Aug. 12, 2021, which is a continuation of U.S. patent application Ser. No. 16/710,247 filed Dec. 11, 2019 (now U.S. Pat. No. 11,158,161), which is a continuation from U.S. patent application Ser. No. 16/021,768 filed Jun. 28, 2018 (now U.S. Pat. No. 10,580,254), which claims priority to JP Pat. App. No. 2017-125723, filed Jun. 28, 2017; the entire contents of each application are hereby incorporated by reference.

FIELD

The present invention relates to a system detecting fraud in a game in a casino, or error or fraud at the time of betting or settlement of chips.

BACKGROUND AND SUMMARY

In a casino or the like, attempts have been made to prevent various frauds. The casino includes a surveillance camera for surveilling the fraud, and prevents a fraud by detecting a fraud in a game, or a fraud due to collection or paying of chips, different from a win or lose result, from an image obtained by the surveillance camera.

On the other hand, it is proposed that a wireless IC (RFID) tag is applied to each of the chips in order to recognize the numbers or the total amount of bet chips, and thus, the amount of chips is recognized.

In a card game monitoring system described in WO 2015/107902 A, whether or not chips placed on a gaming table are collected or paid as a win or lose result is determined by performing image analysis with respect to the movement of the chip, and thus, fraud monitoring is performed.

An object of the invention is to provide a novel system managing a game in a casino.

One aspect of the invention is a game management system managing a casino game performed in a plurality of tables in casino facilities, the system including: a camera obtaining an image by capturing bet gaming tokens; an information processing device specifying a betting amount on the basis of the type and the number of gaming tokens in the image by specifying a betting target on the basis of a position of the gaming token in the image; a game result determination device determining a game result of the casino game; a calculation device calculating a profit of a casino manager for each table and each game of the plurality of tables, on the basis of the betting target, the betting amount, and the game result; and a recording apparatus recording the profit.

The foregoing and other objects, features, aspects and advantages of the exemplary embodiments will become more apparent from the following detailed description of the exemplary embodiments when taken in conjunction with the accompanying drawings.

BRIEF DESCRIPTION OF THE DRAWINGS

FIG. 21 is an example of a table indicating sales (a total amount of betting amounts) for each gaming table of the third embodiment of the invention.

FIG. 22 is an example of a table indicating sales for each game in each of the gaming tables of the third embodiment of the invention.

FIG. 23 is an example of a table indicating a total betting amount, a profit (a gross), and a profit rate for each gaming table of the third embodiment of the invention.

FIG. 28 is a diagram illustrating information stored in the membership card of the third embodiment of the invention.

FIG. 38 is a diagram showing a configuration of a game record generated for each game.

FIG. 40 is a diagram showing an example of a sales table generated by a sales balance management unit of the overall management device.

FIG. 41 is a diagram showing an example of a gross profit table generated by the sales balance management unit of the overall management device.

FIG. 44A is a diagram showing an example of setting of a minimum bet amount according to an actual bet amount.

FIG. 44B is a diagram showing an example of setting of a minimum bet amount according to an actual bet amount.

DETAILED DESCRIPTION OF NON-LIMITING EXAMPLE EMBODIMENTS

Figure 1:
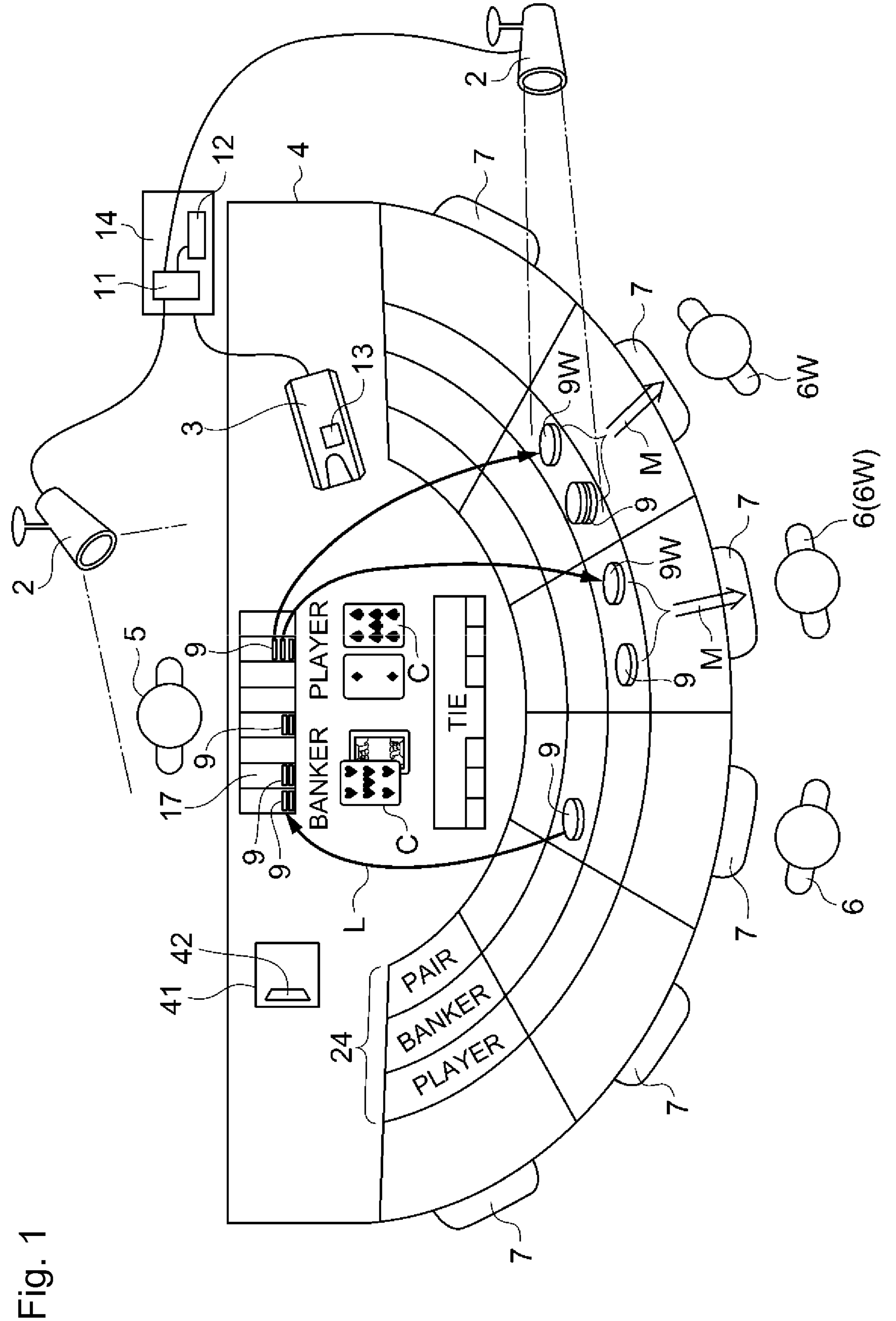
FIG. 1 is a diagram illustrating an overview of a fraud detection system in a casino having a plurality of gaming tables according to a first embodiment of the invention.

In a casino such as a casino, highly stacked chips are placed on a gaming table, and thus, there is a problem in that a total amount of the chips cannot be accurately read by an IC tag reading device provided under the gaming table. If the sensitivity of the reading device is heightened, chips placed at other positions (win or lose depends on the position) may be added, and thus, there is a problem in that the total amount of chips at each position cannot be recognized. In addition, in image capturing of a camera, there is a problem in that the total amount of chips cannot be recognized because a blind spot is formed according to a viewing angle of the camera, or entering into a shadow caused by overlap.

In addition, if cards are slanted by "card squeegee" (behavior of bending a face-down card to enjoying a rank of the card little by little) or the like which is frequently performed by players in a baccarat game, there is a problem in that ranks and suits of cards cannot be determined through image analysis using cameras.

In addition, fraud in the gaming table is further more sophisticated, and thus, there is a new problem in that fraud by an advanced betting method which cannot be found through simple detection of largeness or the like in the winning amount in the gaming table cannot be detected by the camera or by tracking the winning amount. In addition, fraud according to conspiracy of a dealer and a player is not sufficiently prevented in the related art.

In order to solve the above-described problems, in a first embodiment, a fraud detection system in a casino having a plurality of gaming tables is configured to include a game recording apparatus which records a progress of a game played in the gaming table including a dealer and a player as an image through a camera, an image analyzing apparatus which performs image analysis on the image of the recorded progress of the game, a card distribution device which determines a win or lose result of each game in the gaming table, and a control device which detects fraud practiced in the gaming table by using a result of the image analysis by the image analyzing apparatus and a win or lose result determined by the card distribution device.

In addition, in the fraud detection system, the card distribution device has a structure capable of reading ranks of the cards distributed. The control device has a structure capable of determining match or mismatch by checking information on the rank obtained from the image of each card distributed in the gaming table by the image analyzing apparatus and information on the rank of the card read by the card distribution device.

In addition, in the fraud detection system, the image analyzing apparatus or the control device has an artificial intelligence utilizing type structure or a deep learning structure capable of obtaining information on rank of a card from the card which is distributed in the gaming table and is folded or stained by a player.

In addition, in the fraud detection system, the control device recognizes positions, types, and numbers of chips wagered by players through the image analyzing apparatus and determines by image analysis of a progress of the game through the image analyzing apparatus whether or not the collection of the lost chips wagered by each player and the redemption for the winning chips are correctly performed in accordance with a win or lose result of the game.

In addition, in the fraud detection system, the image analyzing apparatus or the control device has an artificial intelligence utilizing type structure or a deep learning structure where, although a portion of or the entire chips among a plurality of the chips placed on the gaming table is concealed due to a blind spot of the camera, the information on the type, number, and position of the wagered chips can be obtained.

In addition, in the fraud detection system, the control device has an artificial intelligence utilizing type structure or a deep learning structure where comparison calculation according to the win or lose result of the game can be performed on whether or not the recognized amount of the chips in the chip tray of the dealer of the gaming table is increased/decreased according to the collected amount of the lost chips wagered by each player and the paid amount of the winning chips after the end of the game and the settlement.

In addition, in the fraud detection system, the control device has an artificial intelligence utilizing type structure or a deep learning structure capable of recognizing the position and amount of the chips wagered in each play position of the game table and comparing the history of win and lose of each player obtained from the win or lose result of each game and the amount of the acquired chips and the statistical data of previous games to extract a strange situation.

In addition, in the fraud detection system, the control device has an artificial intelligence utilizing type structure or a deep learning structure capable of comparing a state that, at a play position of a certain gaming table, the amount of betting chips at the lost time is smaller than the amount of betting chips at the win time and the statistical data of previous games to extract a strange situation.

In addition, in the fraud detection system, the control device has a structure capable of extracting the strange situation through the image analyzing apparatus or specifying individual players at the player positions where winning of a predetermined amount or more occurs.

In addition, in the fraud detection system, the control device has a caution function of informing about the existence of the specified player in another gaming table when the specified player departs and arrives at the other gaming table.

In order to solve the above-described problems, according the invention, there is provided a fraud detection system in a casino having a plurality of gaming tables is configured to include a game recording apparatus which records a progress of a game played in the gaming table including a dealer and a player as an image through a camera, a card distribution device which determines a win or lose result of each game in the gaming table, an image analyzing apparatus which performs image analysis on the image of the recorded progress of the game, and a control device which can detect cash and chips in the game table by using a result of the image analysis by the image analyzing apparatus. The image analyzing apparatus or the control device has an artificial intelligence utilizing type structure or a deep learning structure capable of detecting the exchange of cash and chips in the gaming table in a situation other than the state that the dealer is dealing based on information from the card distribution device or the dealer, capable of recognizing the total amount of the cash which is genuine cash verified by black light and recognizing the total amount of the chips even in the state that a portion of or entire one chip among a plurality of the chips placed on the gaming table as an exchange object is concealed due to a blind spot of the camera, and capable of comparing the total amount of cash placed on the gaming table by the player and the total amount of chips placed by the dealer to determine whether or not the two amounts match with each other.

In addition, in the fraud detection system, the control device has an artificial intelligence utilizing type structure or a deep learning structure capable of performing comparison calculation as to whether or not the recognized amount of chips in a chip tray of a dealer of the gaming table is increased or decreased according to a paid amount of the chips corresponding to the exchanged cash after exchange of cash and chips for settlement.

In addition, in the fraud detection system, the control device has an artificial intelligence utilizing type structure or a deep learning structure where, after the exchange of the cash and the chips for settlement, comparison calculation of match or mismatch between the input amount of the cash according to the input by the dealer and the total amount of the cash according to the result of the image analysis by the image analyzing apparatus can be performed. In addition, the control device has an artificial intelligence utilizing type structure or a deep learning structure capable of performing comparison calculation of match or mismatch between the total input amount of the cash according to the input by the dealer in the gaming table for which the dealer is responsible and the total amount of the cash according to the result of the image analysis by the image analyzing apparatus.

According to the fraud detection system of the embodiment, although the cards are slanted by "card squeegee" frequently performed by players in a baccarat game or the like, the rank and suit of the cards can be determined by image analysis, so that the total amount of chips being overlapped or being in a blind spot together with the positions can be recognized. In addition, fraud at the time of exchanging cash and chips can be detected.

Hereinafter, an overview of the fraud detection system in the casino having a plurality of the gaming tables in the first embodiment will be described more in detail. FIG. 1 is a diagram illustrating the overview of the system. The fraud detection system in a casino having a plurality of gaming tables 4 is configured to include a game recording apparatus 11 which records a progress of a game played in the gaming table 4 including a player (game participant) 6 and a dealer 5 as an image through a plurality of cameras 2, an image analyzing apparatus 12 which performs image analysis on the recorded image of the progress of the game, and a card distribution device 3 which has a function of determining a win or lose result of each game in the gaming table 4 and displaying the win or lose result. The card distribution device 3 is a so-called electronic shoe used by the skilled in the art and has a structure where a game rule is programmed in advance and win or lose of the game can be determined by reading information of the cards C distributed. For example, in a baccarat game, banker win, player win, or tie is basically determined by a rank of two or three cards, and a determination result (win or lose result) is displayed by a result display lamp 13.

The fraud detection system is configured to further include a control device 14 which compares the actual rank of the cards according to the result of the image analysis by the image analyzing apparatus 12 and the win or lose result determined by the card distribution device 3 to detect fraud (for example, mismatch between a sum of ranks of distributed cards and a win or lose result) performed in the gaming table 4. The card distribution device 3 has a structure capable of reading rank (A, 2 to 10, J, Q, K) and suit (heart, spade, or the like) of the card C manually distributed by the dealer 5. The control device 14 has a structure capable of determining match or mismatch by checking information on rank and suit obtained from the image (captured by using the camera 2) of each card distributed in the gaming table 4 by the image analyzing apparatus 12 (using artificial intelligence) and information on rank and suit read by the card distribution device 3. In this fraud detection system, each of the image analyzing apparatus 12 and the control device 14 has a structure including a computer configured with an integrated or plural components, a program, and a memory in a complex manner.

Figure 4:
FIG. 4 is an enlarged diagram illustrating a mark explaining stains of a card recognized in the first embodiment of the invention.
Figure 5A:
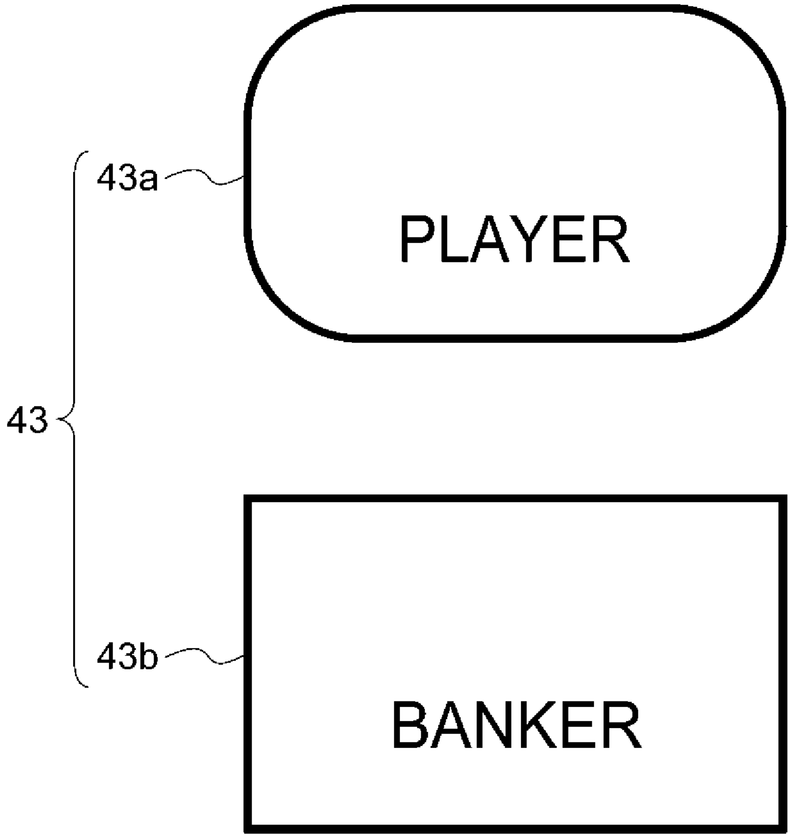
FIG. 5A is a plan diagram illustrating a font side of a marker in the first embodiment of the invention.
Figure 5B:
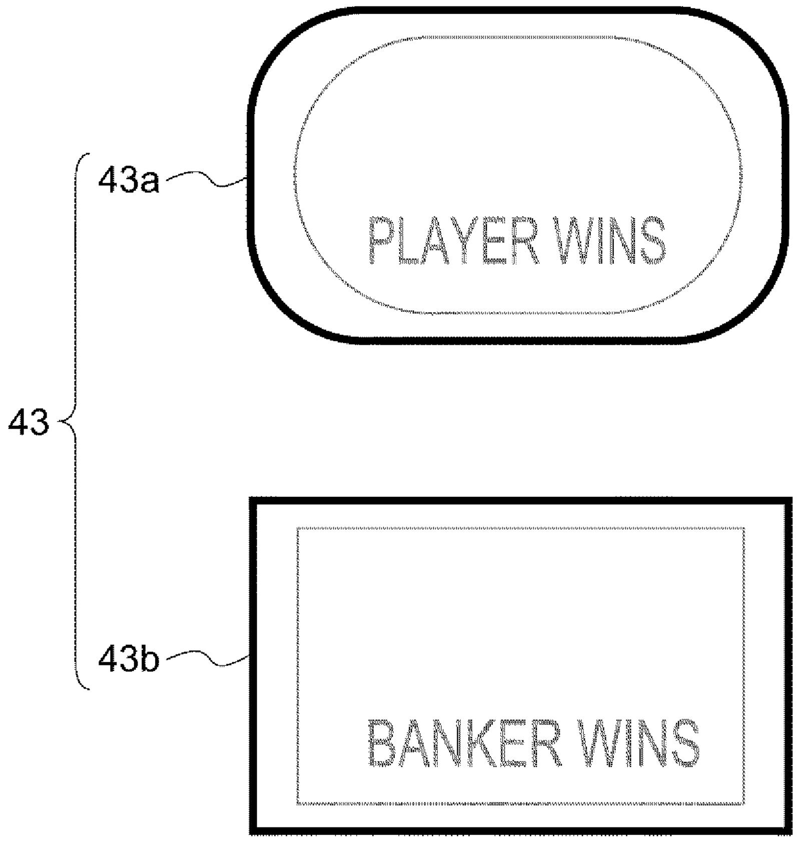
FIG. 5B is a plan diagram illustrating a back side of the marker in the first embodiment of the invention.

Each of the image analyzing apparatus 12 and the control device 14 has an artificial intelligence utilizing type structure or a deep learning structure where, with respect to even a card C which is distributed in the gaming table 4 and is folded or stained by the player 6, information on rank of the card can be obtained. As illustrated in FIG. 4, there occurs a situation where the stained card C is difficult to distinguish clover from spade 1*t*. Even in this case, suit determination can be performed by image analysis and determination using an artificial intelligence utilizing type computer or control system and a deep learning (structure) technique. In addition, although the cards are slanted by "card squeegee" frequently performed by players in a baccarat game or the like, the suits or ranks of the cards before deformation can be recognized by using self-learning or the like of a large number of images in a modified example by artificial intelligence utilizing type computer or control system and a deep learning (structure) technique. Since the artificial intelligence utilizing type computer or control system and a deep learning (structure) technique are well-known and available by the skilled in the art, the description thereof is omitted.

Figure 2A:
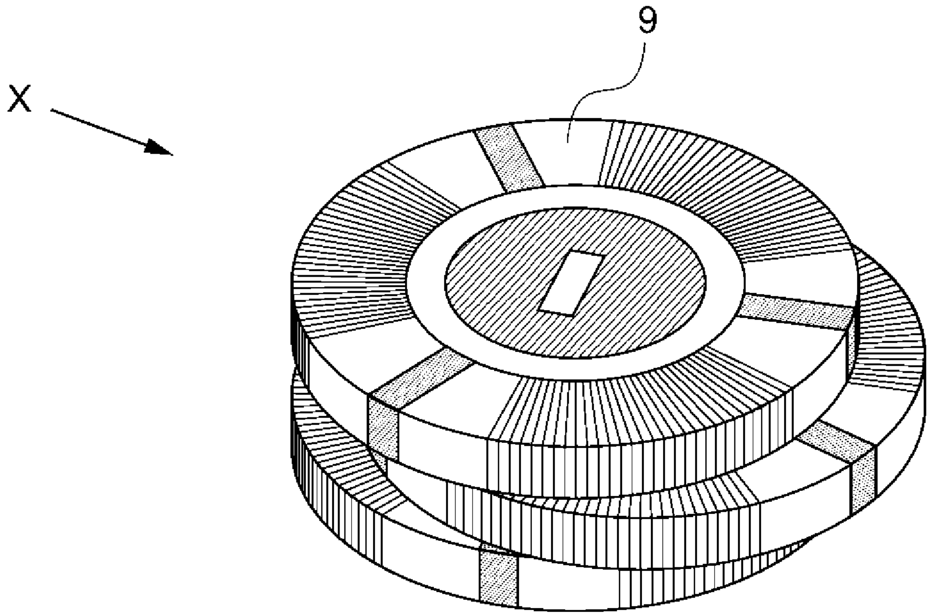
FIG. 2A is a perspective diagram of chips illustrating an example of different overlapped states of chips recognized in the first embodiment of the invention.
Figure 2B:
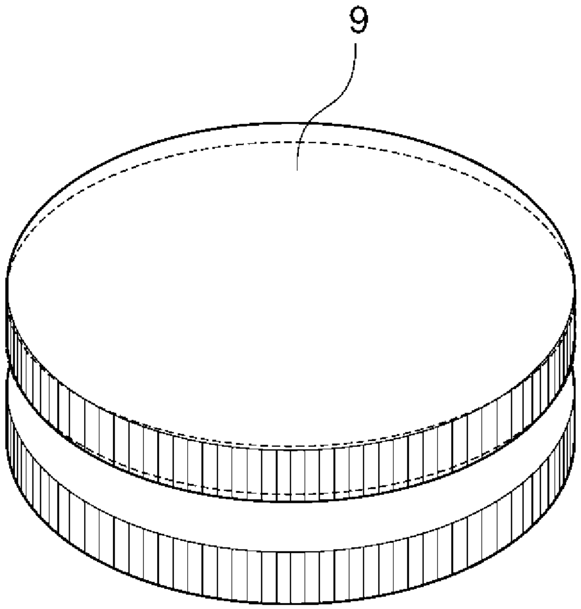
FIG. 2B is a perspective diagram of chips illustrating an example of different overlapped states of chips recognized in the first embodiment of the invention.

The control device 14 having an artificial intelligence utilizing type structure or a deep learning structure can recognize, through the camera 2 and the image analyzing apparatus 12, the position (player, banker, or pair) of the betting area 8 on which the player 6 wagers the chip 9 and the types (different amount values are designated to different colors of the chips 9) and the number of the wagered chips 9. In many case, the chips 9 are not aligned and stacked in the vertical direction, but as illustrated in FIG. 2A, the chips are deviated and overlapped. In this case, it is assumed that, when the camera 2 is disposed in a direction of an arrow X illustrated in FIG. 2A (or when the direction of the chip 9 becomes a blind spot direction relatively), as illustrated in FIG. 2B, the chip 9 is not seen (in a blind spot). In an artificial intelligence utilizing type computer or control system and a deep learning (structure) technique, by using a self-learning function or the like, concealing or the like (including concealing of a portion of one chip and concealing of the entire chip) of the chip 9 caused by the blind spot is recognized, so that the number of chips or the like can be accurately recognized. In this manner, since which position (player, banker, or pair) of the betting area 8 the chips 9 are wagered on, types of wagered chips 9 (different amount values are designated to different colors of the chips 9), and the number of chips can be recognized, the control device 14 determines by image analysis of a progress of the game through the image analyzing apparatus 12 whether or not collection (indicated by an arrow L) of lost chips wagered by the players 6 and redemption (9W) for wined chips to the winning player 6W are correctly performed in accordance with a win or lose result of the game determined by the card distribution device 3 for each game.

The control device 14 is capable of performing analysis and recognition of the total amount of the chips 9 in the chip tray 17 of the dealer 5 of the gaming table 4 by using the image analyzing apparatus 12 and is capable of performing comparison calculation according to the win or lose result of the game as to whether or not the total amount of the chips 9 in the chip tray 17 is increased or decreased according to the amount of the collection of the lost chips 9 wagered by the players 6 and the redemption (9W) of the winning chips of the winning player 6W after the end of the game and the settlement. Although the total amount of the chips 9 in the chip tray 17 are always checked by means of RFID or the like, whether or not the increased or decreased amount is correct is performed by the control device 14 allowing the image analyzing apparatus 12 to perform image analysis of the progress of the game. An artificial intelligence utilizing type structure or a deep learning structure is used for these configurations.

In this example, since fraud or error is detected based on the information of the win or lose result of the game, information as to what position (player, banker, or pair) of the betting area 8 how many and what type of the chips 9 are wagered on, and the increased/decreased amount of the chips 9 in the chip tray 17 after the collection of the lost chips and the redemption for the winning chips 9, fraud or error can be detected although the recognition of the movement of the chips 9 after the end of the game, that is, the movement of the wagered chips 9 toward the player side or the movement toward the dealer side is not performed.

Herein, for example, in the baccarat, the win or lose result of the game can be determined in accordance with the rule of the baccarat by reading the rank of a card C fed out in the game in the card distribution device 3. In addition, the win or lose result of the game can be determined by capturing an image of the gaming table 4 by using the camera 2, analyzing the image by using the image analyzing apparatus 12, and matching the analysis result with the game rule by using the control device 14. In this case, the camera 2, the image analyzing apparatus 12, and the control device 14 constitute a win/lose result determining apparatus. Information on the players at each play position 7 and information as to what position (player, banker, or pair) of the betting area 8 how many and what type of the chips 9 are wagered on can be obtained by capturing an image of the chips 9 placed on the betting area 8 by using the camera 2 and analyzing the image at each play position 7 by using the image analyzing apparatus 12.

In addition, the increased/decreased amount of the chips 9 in the chip tray 17 before and after the collection of the lost chips 9 and the redemption for the winning chips 9 can be calculated by comparing total amount of the chips 9 in the chip tray 17 before the collection of the lost chips 9 and the redemption for the winning chips 9 and the total amount of the chips 9 in the chip tray 17 after the collection of the lost chips 9 and the redemption for the winning chips 9. The total amount of the chips 9 in the chip tray 17 before the collection of the lost chips 9 and the redemption for the winning chips 9 and the total amount of the chips 9 in the chip tray 17 after the collection of the lost chips 9 and the redemption for the winning chips 9 can be detected by capturing an image of the chip tray 17 containing the chips 9 by using the camera 2 and analyzing the image by using the image analyzing apparatus 12. In addition, the total amount of the chips 9 contained in the chip tray 17 may be detected by burying RFIDs representing the amount is in the chips 9 and providing an RFID reader to the chip tray 17.

For example, the total amount of the chips 9 in the chip tray 17 before the start of the game is denoted by Bb, and the total amount of the chips 9 in the chip tray 17 after the end of the game and the end of the collection of the lost chips and the redemption of the winning chip is denoted by Ba. In addition, in the game, the total amount of the entire play positions 7 in the player area where the chips 9 are wagered is denoted by bp, the total amount of the entire play positions 7 in the banker area where the chips 9 are wagered is denoted by bb, and the total amount of the entire play positions 7 in the tie area where the chips 9 are wagered is denoted by bt. For example, in the case where the win or lose result of the game is banker win, Ba−Bb=bp−bb+bt needs to be satisfied. Alternatively, the total amount Ba of the chips 9 in the chip tray 17 after the end of the game needs to be (Bb+bp−bb+bt). In the case where the above condition is not satisfied, it may be determined that fraud or mistake occurs in the collection of the chips or the redemption for the chips.

Figure 3A:
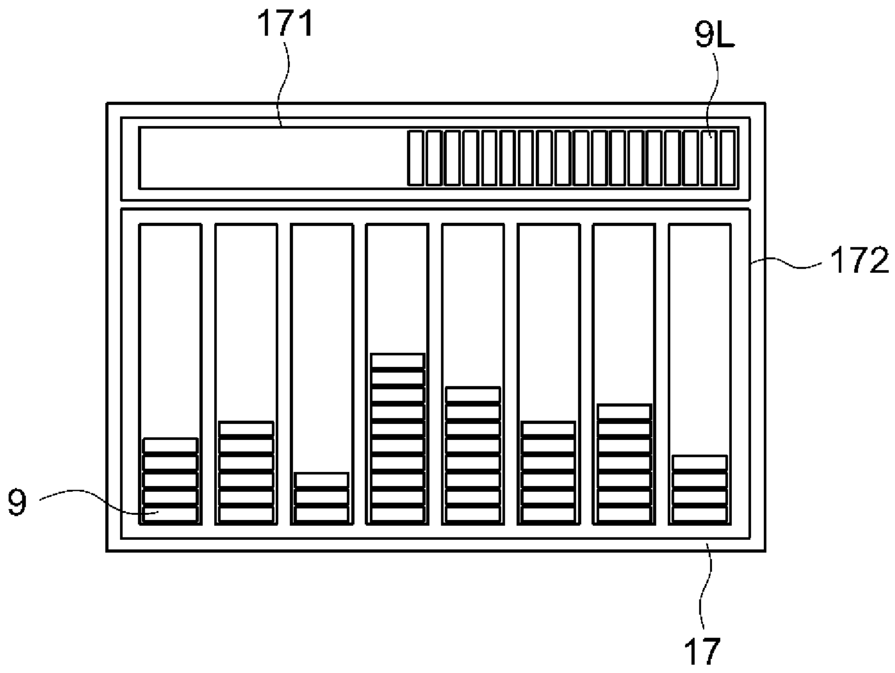
FIG. 3A is a diagram illustrating details of a chip tray in the first embodiment of the invention.
Figure 3B:
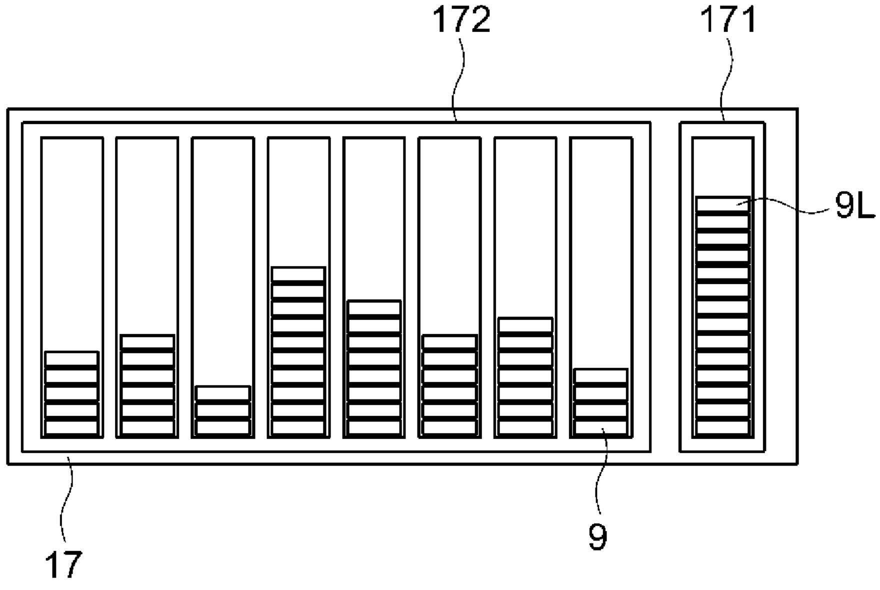
FIG. 3B is a diagram illustrating another example of a chip tray in the first embodiment of the invention.

FIG. 3A is a diagram illustrating details of the chip tray in the embodiment, and FIG. 3B is a diagram illustrating another example of the chip tray. The chip tray 17 is provided with a collection chip tray 171 where the chips 9L wagered by the lost player 6L are collected and temporarily stored and a redemption chip tray 172 where to-be-redeemed chips 9W are stored. The image analyzing apparatus 12 and the control device 14 checks the position, type, and number of the chips 9L wagered by the lost player 6L and calculate the increased amount of the chips OL in the game (correct amount of the chips 9 in the collection chip tray 171). In addition, the image analyzing apparatus 12 and the control device 14 checks the actual total amount of the chips 9 in the chip tray 171 after the collection and compares the correct total amount and the actual total amount to determine whether or not there is difference.

In addition, the redemption for the chip 9W to the wining player 6W is performed by using the chips 9 in the redemption chip tray 172, and the image analyzing apparatus 12 and the control device 14 can secure an enough time to recognize the actual total amount of the chips 9 in the collection chip tray 171 after the collection.

The gaming table 4 is provided with a discard area 41 and/or a discard slot 42 for discarding the cards C used in the game. When the game is ended, the cards C used in the game are collected and discarded in the discard area 41 or the discard slot 42 on the gaming table 4.

The gaming table 4 is further provided with a marker 43 indicating win or lose of the game. FIG. 4A is a plan diagram illustrating a front side of the marker, and FIG. 4B is a plan diagram illustrating a back side of the marker. In a baccarat game, used are two types of markers, that is, a marker 43*a* indicating win of a player and a marker 43*b* indicating win of the banker. When a result of the game is decided, the dealer 5 faces down the marker of the winning side of the player and the banker. Therefore, the win or lose of the game can be easily found on the table. After the end of the collection of the chips 9 and the redemption, the faced-down maker is returned to the initial state by the dealer 5. If the maker is returned to the initial state, the state denotes that the next game can be started.

In this manner, in the embodiment, the control device 14 calculates balance in chips from the amount of the betting chips on the gaming table 4 for each game and the win or lose result of the game and verifies the increased amount of the balance of the chips in the chip tray 17 after the game. If the difference is detected in the verification, the control device 14 issues caution or adds the record indicating this message to the record of the video captured by the camera 2. A casino manager can investigate the cause of the difference by checking the video.

In the embodiment, the fraud detection system performs addition/subtraction calculation of the increased/decreased amount of the chips in the game calculated from the position, type, and number of the chips 9 wagered by all the players 6 in the game and the win or lose result of the game obtained from the win/lose result determining apparatus from the total amount of the chips 9 in the chip tray 17 before the settlement of each game and compares the correct total amount of the chips 9 in the chip tray 17 after the end of the game and the settlement and the actual total amount of the chips 9 in the chip tray 17 at the time of the end of the game obtained through the image analyzing apparatus 12 to determine whether or not there is difference between the correct total amount and the actual total amount.

The control device 14 recognizes the position, type, and number of the chips wagered by each player through the image analyzing apparatus 12, recognizes the actual total amount of the chips in the chip tray at the time when the collection of all the amount of the lost chips wagered by each player is ended, compares the correct total amount of the chips 9 in the chip tray 17 added with the increased amount of the chips in the chip tray 17 in the game from the position, type, and number of the chips wagered by the lost player from the total amount of the chips in the chip tray before the settlement of each game and the actual total amount of the chips 9 in the chip tray 17 to determine whether or not there is difference between the correct total amount and the actual total amount.

In the case where the control device 14 compares the correct total amount of the chips 9 in the chip tray 17 added with the increased amount of the chips in the chip tray 17 in the game from the position, type, and number of the chips 9 wagered by the lost player from the total amount of the chips 9 in the chip tray 17 before the settlement of each game and the actual total amount of the chips 9 in the chip tray 17 and determines that there is no difference between the correct total amount and the actual total amount and the control device compares the correct total amount of the chips in the chip tray 17 after the end of the game and the settlement and the actual total amount of the chips 9 in the chip tray 17 obtained through the image analyzing apparatus 12 at the time of the end of the game and determines that there is difference between the correct total amount and the actual total amount, the control device determines a mistake in payment and generates a payment mistake signal indicating the mistake in payment.

The chip tray 17 is provided with a collection chip tray 171 where the chips 9 wagered by the lost player are collected and temporarily stored. The image analyzing apparatus 12 compares the correct total amount of the chips 9 in the collection chip tray 171 added with the increased amount of the chips 9 in the game calculated from the position, type, and number of the chips 9L wagered by the lost player and the actual total amount of the chips 9 in the collection chip tray 171 to determine whether or not there is difference between the correct total amount and the actual total amount.

When the control device 14 determines that there is difference that the recognized actual total amount of the chips 9 in the chip tray 17 of the dealer 5 of the gaming table 4 does not match with the increased/decreased amount of the chips calculated from the amount of the chips wagered by all the players and the win or lose result of the game, the game recording apparatus 11 may allocate indexes or time points to the acquired images or may reproduce the images specified with a collection scene or a redemption scene of the chips 9 so that the record of the game where the difference occurs can be analyzed in the game recording apparatus 11.

In this manner, the control device 14 acquires the total amount of the chips in the chip tray 17 after the end of the game and the settlement through the image analyzing apparatus 12, and in this case, the determination after the settlement is performed at any one of the times 1) to 4) as follows: 1) the time when redemption for the winning chips 9 is ended; 2) the time when the cards C used in the game are collected to be discarded into a discard area 41 or a discard slot 42 of the table; 3) the time when a predetermined button attached to the win/lose result determining apparatus is pushed; and 4) the time when a marker 43 representing win or lose is returned to an initial state.

In addition, the control device 14 has an artificial intelligence utilizing type structure or a deep learning structure capable of extracting a strange situation (set by the casino side) by recognizing the position (position of player, banker, or pair wagered) and amount (type and number) of the chips wagered on each play position 7 of the gaming table 4, comparing the history of win and lose of each player 6 obtained from win or lose result of each game and the amount of the acquired chips (winning amount) and the statistical data of a large number of previous games (big data). Typically, the control device 14 has an artificial intelligence utilizing type structure or a deep learning structure, where, in the case where an winning amount of a certain amount (one million dollars) or more occurs and the state that the amount of betting chips at the lose time is small and the amount of betting chips at the win time is large at a play position 7 of a certain gaming table 4 continues several games, the state can be extracted as a strange situation by comparing the state and the statistical data (big data or the like) of previous games.

In addition, the control device 14 (integrated with the image analyzing apparatus 12) of the fraud detection system has a structure capable of extracting a strange situation or specifying individual player 6 at the play position 7 which the player wins a predetermined amount or more. With respect to the specifying of the player 6, in the image analyzing apparatus 12, an image of a face is obtained by extraction of feature points, and identification number (ID) is provided to specify the player. In addition, the control device 14 has a caution function of informing about the existence of the specified player in another gaming table when the specified player 6 departs and arrives at the other gaming table. More specifically, a pit manger managing each gaming table 4 or each table manager (or a dealer) is informed, so that the strange situation can be further prevented.

In addition, control device 14 is provided with database storing history of exchange of cash K and the chips 9. By referring to the database in unit of a predetermined time or a day, the control device performs comparison determination as to whether or not the recognized amount of the chips 9 in the chip tray 17 of the dealer 5 of the gaming table 4 is increased or decreased according to the paid amount of the chips 9 corresponding to the exchanged cash K or the total amount of the paid amount of the cash K corresponding to the exchanged chips 9.

In addition, in the above-described example, the history of win and lose and the amount of the acquired chips (winning amount) for each play position 7 may be surveilled without specifying individual player 6. In this case, if each player 6 leaves the seat, the player 6 cannot be tracked. However, the strange situation where the amount of betting chips at the lose time at the specified play position 7 of one game table 4 is small and the state that the amount of betting chips at the win time is large continues for several games can be detected. Next, in the case where such a play position 7 is detected, it is suspected that there is fraud or error at the play position 7. Next, by verifying the video obtained by capturing an image of the play position 7, the fraud or error can be found.

More specifically, the camera 2 is installed to capture at least an image of the chips 9 placed on the betting area 8 of the gaming table 4. The image analyzing apparatus 12 analyzes the image captured by the camera 2 to detect which of the positions “player”, “banker”, and “tie” of the betting area 8 the chips are placed on for each user position 7 and the amount of the placed chips. In addition, the card distribution device 3 also functions as a win/lose result determining apparatus to determine the win or lose result of the game. The control device 14 records (surveils) the history of win and lose and the amount of the acquired chips (acquired amount of chips) for each play position 7 based on the position (player, banker, or tie) of the betting area 8 on which the chips 9 are placed and the win or lose result of the game. In addition, any one of the history of win and lose and the acquired amount of chips may be recorded. In the case of a strange situation (set by the casino side) that the history of win and lose and/or the history of the acquired amount of chips are strange in comparison with the statistical data of a large number of previous games (big data), the control device 14 specifies the player position 7 as a play position where fraud is suspected to occur.

In the case where fraud is suspected to occur at a certain player position 7, the fraud detection system may generate alarm (light, sound, or vibration) so that at least dealer can perceive at this time. Therefore, at least at this moment, by stopping the subsequent game or the like, it is possible to prevent the fraud from continuously occurring. In addition, information indicating that fraud is suspected to occur may be added to the image captured and recorded by the camera 2. Therefore, by checking video, it is possible to find a cause of the suspicion of the fraud.

The fraud detection system in the casino having the gaming table according to the embodiment further has a function of performing inspection at the time of exchange of cash and chips which is frequently performed in the gaming table 4. In the casino such as a casino, before a game, the player 6 exchanges money (cash or the like) and gaming chips at a predetermined cashier cage. When the player 6 spends all chips, the player may exchange cash and chips 9 on the gaming table (baccarat table or the like) to continuously do the game without leaving the seat from the gaming table 4. However, at the point, there is a chance of fraud between the dealer 5 and the player. On the gaming table (baccarat table or the like), the exchange of the cash and the chip 9 needs to be performed when the game is not in progress. In order to determine the win or lose of the game, the card distribution device 3 can detect card dealing start and dealing end (time of determining the win or lose). Therefore, the card distribution device 3 detects a situation other than card distributing (dealing), and the control device 14 detects the exchange of the cash and the chips 9 in the gaming table 4 in the situation other than the card dealing (illustrated in FIG. 6). The card dealing (or the situation other than the card dealing) can be detected by the card distribution device 3 or based on the information obtained from the behavior of the dealer 5.

Figure 6:
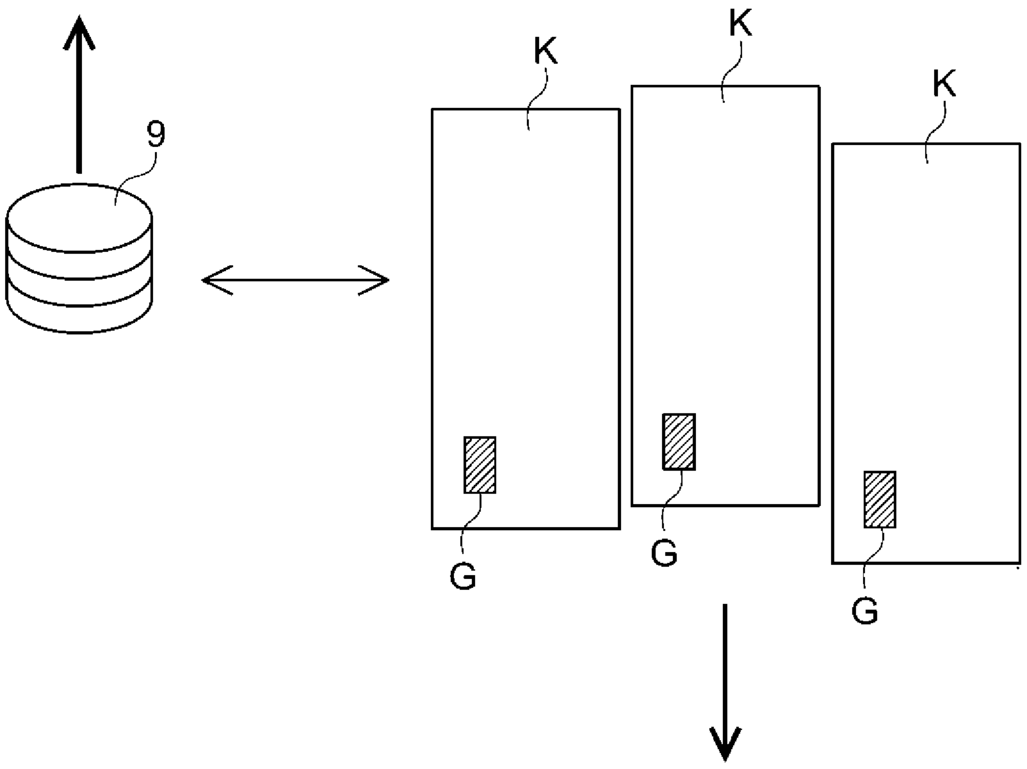
FIG. 6 is a diagram illustrating a simplified image of a state of exchange of cash and chips recognized in the first embodiment of the invention.

The control device 14 can recognize the number and amount of cash K by performing the image analysis on the surface of the cash. In addition, in the gaming table 4, whether or not the cash K in exchange for the chips 9 is genuine is performed by irradiating the cash with black light to detect a genuine mark G of the cash. As illustrated in FIG. 6, the control device 14 has an artificial intelligence utilizing type structure or a deep learning structure capable of verifying the genuine mark G through the image analysis, recognizing the total amount of the genuine cash, recognizing the total amount of the chips even in the state that a plurality of chips as an exchange object placed on the gaming table are concealed due to a blind spot of the camera 2, and comparing the total amount of the cash K placed on the gaming table 4 by the player and the total amount of the chips 9 placed by the dealer 5 to determine whether or not the two amounts match with each other.

The control device 14 has an artificial intelligence utilizing type structure or a deep learning structure capable of performing comparison calculation as to whether or not the total amount of the chips 9 in the chip tray 17 of the dealer 5 of the gaming table 4 is increased or decreased according to the paid amount of the chips corresponding to the exchanged cash after the exchange of cash and chips and the settlement. The case where the total amount of the chips 9 in the chip tray 17 of the dealer 5 is always checked by the RFID or the like of the chips 9 in advance may be considered. In addition, the total amount of the chips 9 contained in the chip tray 17 can be detected by capturing an image of the chip tray 17 containing the chips 9 by using the camera 2 and analyzing the image by using the image analyzing apparatus 12.

In addition, the control device 14 verifies match between the increase or decrease of the amount of the chips 9 in the chip tray 17 and the exchanged amount of the chips according to the result of the image analysis of the gaming table 4 before and after the exchange of cash and chips. The paid amount of the cash may be input to the control device 14 by the dealer 5 through key input or the like. The paid amount of the cash may be specified by the camera 2 capturing an image of the gaming table 4 where the cash is being paid and by the image analyzing apparatus 12 analyzing the image.

As described above, the control device 14 determines whether or not the decreased amount of the chips 9 in the chip tray 17 due to the exchange of cash and chips matches with the amount of the cash paid to the dealer 5 by the player 6. In addition, the control device 14 is an intelligence control device and has an artificial intelligence utilizing type structure or a deep learning structure capable of performing comparison calculation of match or mismatch between the input amount (typically, obtained by key input or the like) of the cash by the dealer 5 and the calculated amount of the cash obtained from the result of the image analysis by the image analyzing apparatus 12 after the exchange of cash and chips and the settlement.

In addition, the control device 14 has an artificial intelligence utilizing type structure or a deep learning structure capable of performing comparison calculation of match or mismatch between the total input amount of the cash according to the input by the dealer in the gaming table 4 for which the dealer is responsible and the total amount of the cash according to the result of the image analysis by the image analyzing apparatus 12.

The control device 14 performs comparison determination as to whether or not the recognized amount of the chips 9 in the chip tray 17 of the dealer 5 of the gaming table 4 is increased or decreased according to the paid amount of the chips 9 corresponding to the exchanged cash or the paid amount of the cash corresponding to the exchanged chips 9 after the exchange of the cash and the chips 9.

Among many table games played in a casino such as a casino, there are baccarat and blackjack. In such a game, a standard deck of 52 playing cards is used, the playing cards are distributed on the game table from a card distribution device including a plurality of decks (six to nine decks or ten decks) which are shuffled in advance, and win or lose is determined according to the number of distributed cards and a game rule.

The distribution of the cards from the card distribution device and the settlement of betting money to a player (game participant) are performed by a dealer or the like who is responsible for the gaming table. In a casino such as a casino, prevention of error or fraud in the settlement of the betting money for the player (game participant) is attempted.

WO 2015/107902 discloses a card game monitoring system of reading movement of chips by using a surveillance camera and checking whether or not betting money is paid to a winner.

In a baccarat or a blackjack, there are problems in that, in the betting by a player or in the settlement for betting money to the player (game participant) by the dealer, timing of performing the betting and the settlement, who places the chips, or who takes the chips cannot be detected, and thus, whether or not these are correct cannot be recognized.

In order to solve the above-described problems, according to the second embodiment, a fraud detection system in a casino including a gaming table includes: a game monitoring device which monitors a progress of a game played on the gaming table by using a camera, an image analyzing apparatus which performs image analysis on an image obtained from the camera, a card distribution device which determines a win or lose result of each game in the game table, and a control device which specifies positions of chips placed on the gaming table by game participants by using a result of the analysis of the image analyzing apparatus in each game and determines a winner and losers among the participants of each game by using the win or lose result, and the control device further includes a function of determining at least one of: 1) whether or not there is movement of chips during the time interval from the start of extraction of cards or from the game start operation of the dealer before the win or lose result of the game is displayed by the card distribution device in each game; 2) whether or not there is movement of chips by a person other than the dealer during the time interval when the dealer collects chips wagered by the losers among the game participants after the end of each game; 3) whether or not a chip is added during the time interval when the dealer collects chips wagered by the losers among the game participants after the end of each game; 4) whether or not the dealer performs payment for a position of chips wagered by the winner among the game participants after the end of each game; and 5) whether or not the winner among the game participants receives wagered chips and paid chips after the end of each game.

In addition, the control device may be configured so as to determine at least one of the aforementioned 1) to 5) by detecting movement of hands of the dealer and the game participants, movement of the chips, or the movement of hands and the movement of chips by using the result of the analysis of the image analyzing apparatus.

In addition, the control device may be configured so as to determine whether or not the amount of chips paid to the winner by the dealer is correct in accordance with the amount wagered by the winner among the game participants.

In addition, the fraud detection system of the game may be further provided with a monitor or lamp which receives the determination result and performs caution or display.

According to the fraud detection system of the embodiment, in a baccarat or a blackjack, in the betting by the player or in the settlement for betting money to the player (game participant) by the dealer, timing of performing the betting and the settlement, who places the chips, or who takes the chips can be detected, so that such an error or fraud is detected, a caution of the error or fraud is issued or the error or fraud is displayed, and the recurrence there can be prevented.

Before the embodiment is described in detail, a flow of a baccarat game played in a casino such as a casino will be described. In addition, in the second embodiment, the same components as those of the first embodiment are denoted by the same reference numerals.

Figure 7:
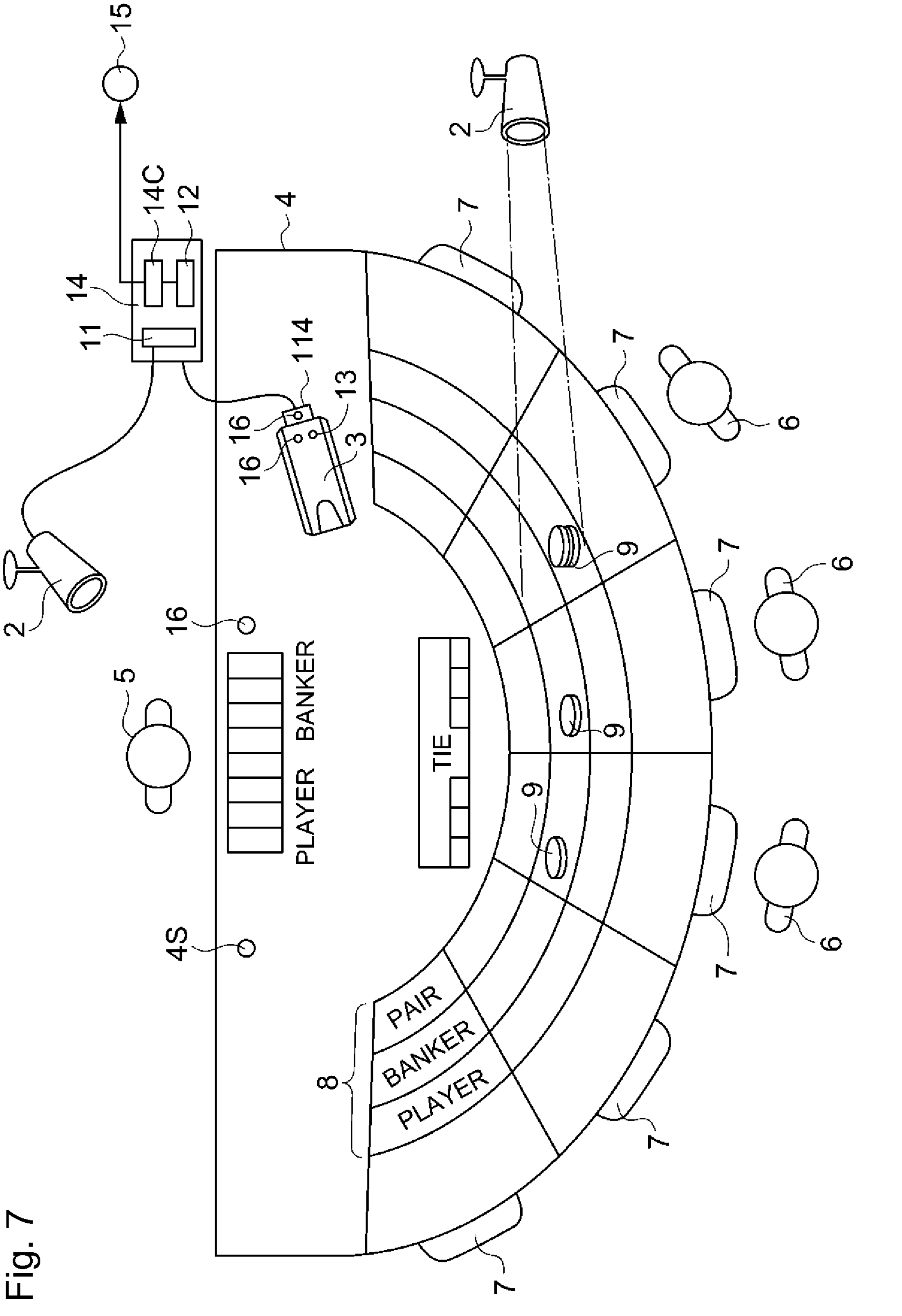
FIG. 7 is a plan diagram illustrating an overview of a fraud detection system in a baccarat game according to a second embodiment of the invention.

As described in FIG. 7, in the gaming table 4, the players (game participants) 6 take seats at the play positions 7 to face the dealer 5. The player (game participant) 6 performs wagering (hereinafter, referred to "betting") as to who of the player and the banker wins or whether the player and the banker ties as a win or lose result of the baccarat game by placing the chips 9 on the betting area 8 in front of the player's eyes. The dealer 5 counts time in order to end the betting by the players (game participants) 6 and calls "No More Bet (end of receiving the betting)" while moving the hand in the transverse direction (the state illustrated in FIG. 7). In the baccarat game, during the time interval from the time when the "No More Bet (end of receiving the betting)" is called and card extraction is started or the dealer 5 performs the game start operation before the win or lose result of the game is displayed by the card distribution device 3, the players (game participants) 6 are cannot operate chips, wager additional chips, or recover the chips which have been wagered once.

After that, the playing cards 1 are extracted one by one from the card distribution device 3 on the gaming table 4 in the state that the back side is faced up. First, four cards are extracted, as illustrated in (1) to (4) of FIG. 7, the first card goes to the hand of "player", the second card goes to the hand of "banker", the third card goes to the hand of "player", and the fourth card goes to the hand of "banker". These cards are arranged to be distributed to areas 10 (player area 10P and banker area 10B) on the gaming table 4 in the front side as viewed from the dealer 5. Next, according to the ranks (numbers) of the first to fourth cards 1 and the condition in the detailed rule of the baccarat game, the fifth card 1 and the sixth card 1 are extracted by the dealer 5, and these cards go to the hand of "player" or "banker". Next, according to the ranks (numbers) of the first to fourth cards 1 (in some case, the fifth and sixth cards are combined) and the detailed rule of the baccarat game, the win or lose of the game is determined. Herein, a game rule is programmed in the card distribution device 3, and the card distribution device has a structure where the win or lose of the game can be determined by reading information (ranks (numbers) or suits) of the cards 1 distributed. It is determined whether or not the win/lose determination result (win or lose result) determined by the card distribution device 3 matches with the win or lose result determined by the dealer or the like as described above.

Hereinafter, an overview of the fraud detection system for the game in the embodiment of the invention will be described. FIG. 7 is a diagram illustrating the overview of the system. The fraud detection system for the game in the casino is configured to include a game recording apparatus 11 which records a progress of the game played in the gaming table 4 including a player (game participant) 6 and the dealer 5 as an image through cameras 2, an image analyzing apparatus 12 which performs image analysis on the recorded image of the progress of the game, and a card distribution device 3 which has a function of determining a win or lose result of each game in the gaming table 4 and displaying the win or lose result. The card distribution device 3 is a so-called electronic shoe used by the skilled in the art and has a structure where a game rule is programmed in advance, the timing that the cards 1 are distributed by the dealer 5 at the initial time of each game is sensed, and the win or lose of the game can be determined by reading information (rank (number) or suit) of each card 1 distributed. For example, in a baccarat game, banker win, player win, or tie is basically determined by a rank of two or three cards, and a determination result (win or lose result) is displayed by a display lamp 13.

The control device 14 of the fraud detection system has a chip detecting function of specifying which of the betting areas 8 of the player side and the banker side on the gaming table 4 the players 6 (game participants) wager the chips 9 on by using the result of the analysis of the image analyzing apparatus 12 in each game. It is assumed that, when the chips 9 are overlapped in a deviated manner or are in a blind spot from the position of the camera 2, the position and total amount of the chips 9 (which of the betting areas 8 of the player side and the banker side the chips 9 are wagered on) cannot be read normally. The control device 14 is configured to be capable of recognizing concealing or the like (including concealing of a portion of one chip and concealing of the entire chip) of the chip 9 caused by the blind spot, so that the number of chips or the like can be accurately recognized by using a self-learning function or the like according to an existing artificial intelligence utilizing type computer or control system and deep learning (structure) technique. In addition, the structure of detecting the position and type of the chip 9 in the betting area 8 is not limited thereto, but for example, the structure may be configured so that the position and the type can be detected by reading the ID buried in the chip.

As described heretofore, the control device 14 can recognize, through the camera 2 and the image analyzing apparatus 12, the position (position of player, banker, or pair wagered) on which each player 6 wagers the chips 9 and the type (different amount values are designated to different colors of the chips 9) and number of the chips 9, and the control device can detect who is the player 6 betting on the "player" (in the case where there are a plurality of the players 6 betting on the "player", who is the player 6 wagering the highest amount) and who is the player 6 betting on the "banker" (in the case where there are a plurality of the players 6 betting on the "banker", who is the player 6 wagering the highest amount). In this fraud detection system, each of the image analyzing apparatus 12 and the control device 14 has a structure including a computer configured with an integrated or plural components, a program, and a memory in a complex manner.

The control device 14 has a structure capable of determining match or mismatch by checking information on rank and suit obtained from the image (captured by using the camera 2) of each card 1 distributed in the gaming table 4 by the image analyzing apparatus 12 and information on rank and suit read by the card distribution device 3. The control device 14 determines by image analysis of a progress of the game through the image analyzing apparatus 12 according to the win or lose result of the game determined by the card distribution device 3 for each game whether or not the collection of the lost chips 9 wagered by the players (game participants) 6 and the redemption of the winning chips to the winning player (game participant) 6 are correctly performed in accordance with the win or lose result.

Figure 8:
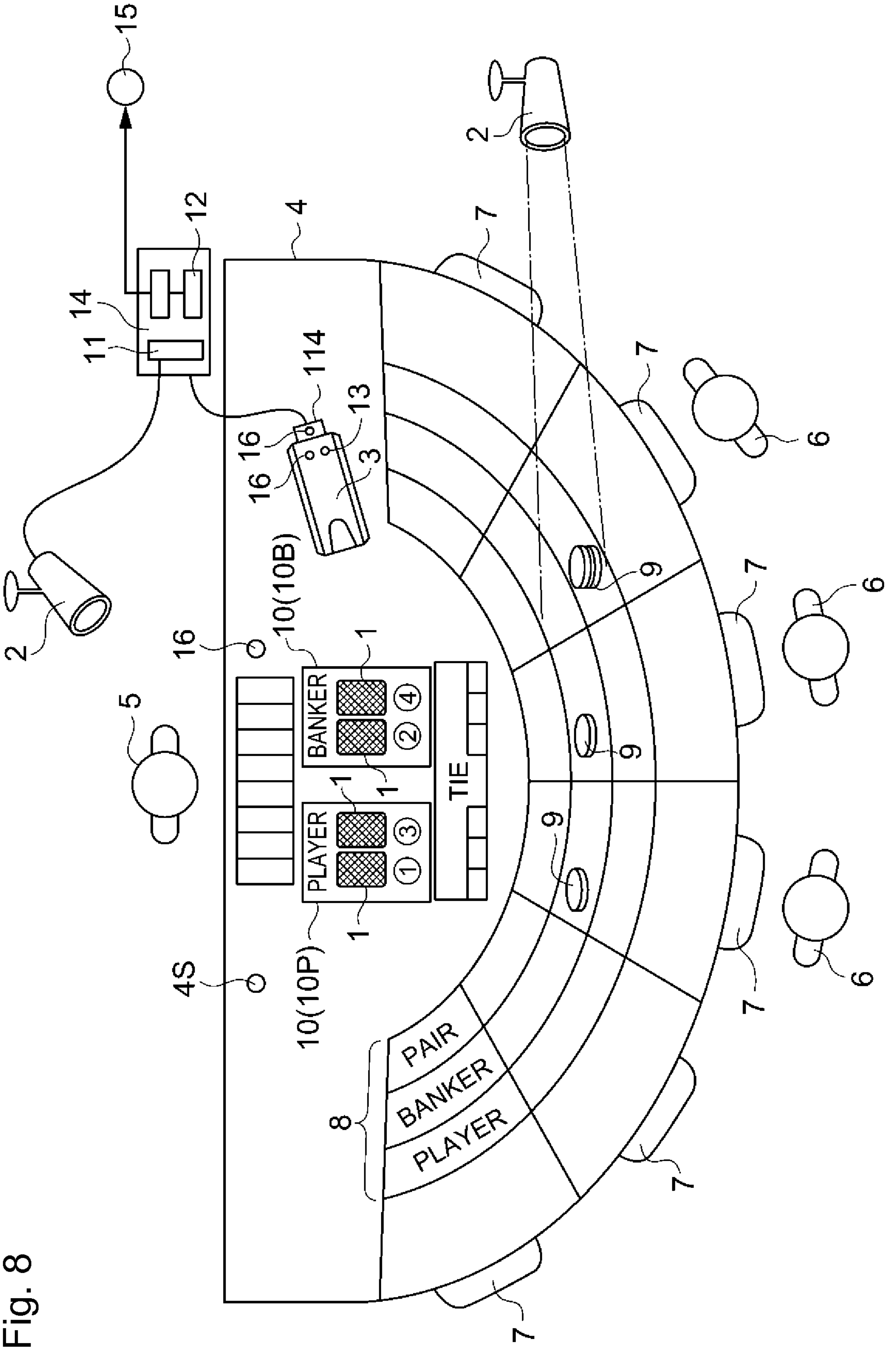
FIG. 8 is a plan diagram illustrating an overview of a progress of a baccarat game in the fraud detection system according to the second embodiment of the invention.
Figure 9:
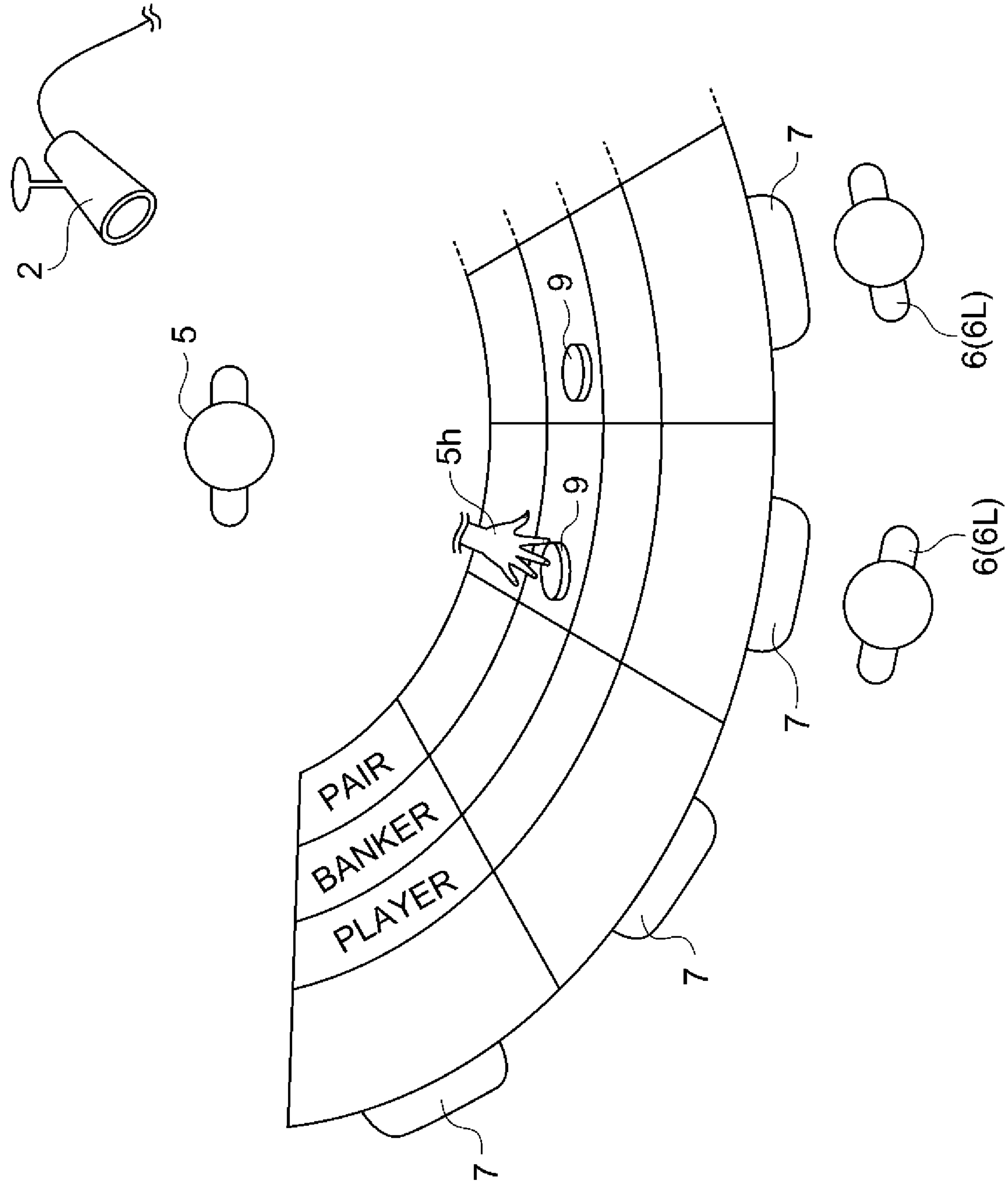
FIG. 9 is a diagram illustrating a situation that a dealer in a baccarat game collects chips which a casino side wins.
Figure 10:
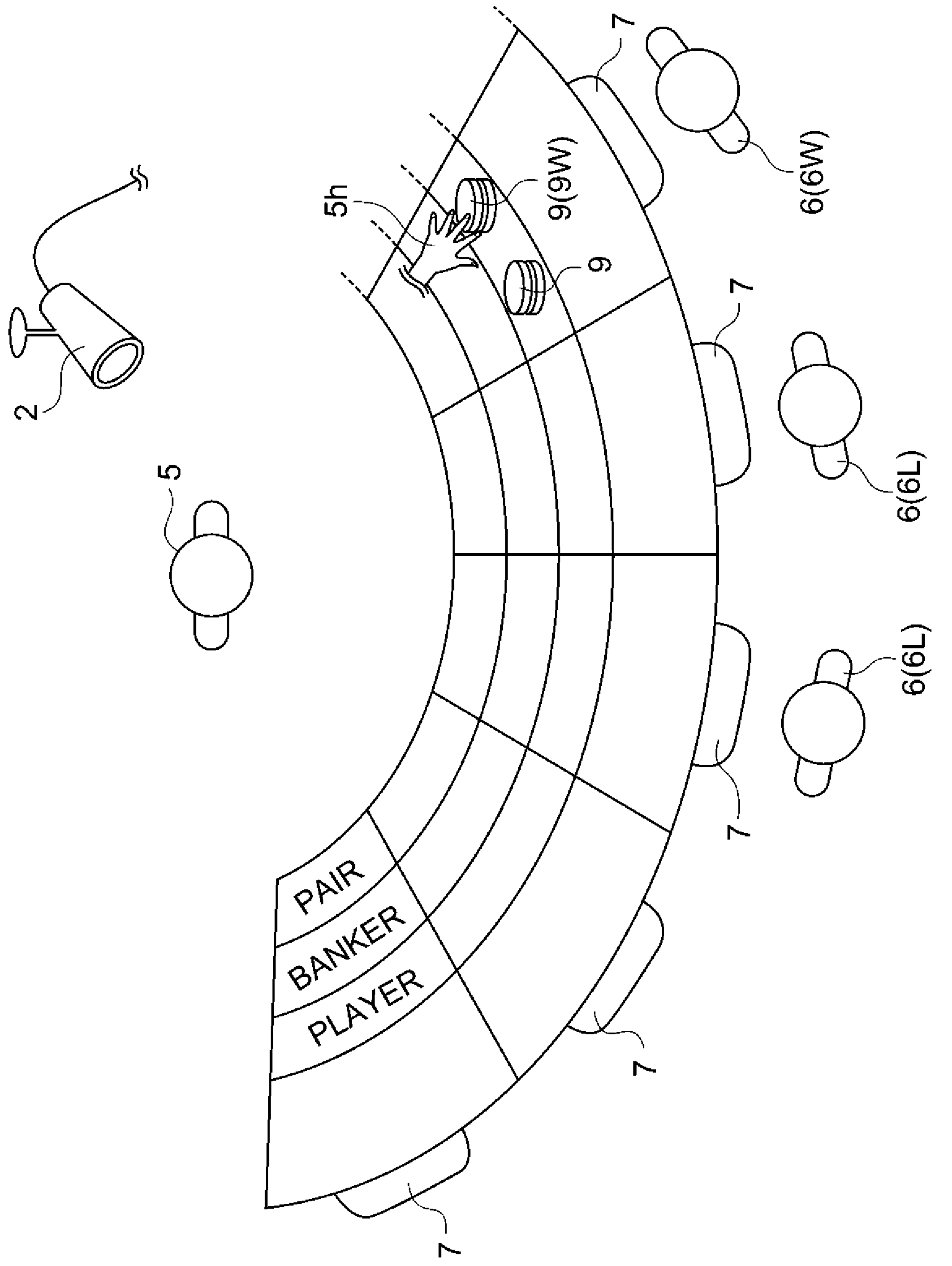
FIG. 10 is a diagram illustrating a situation in the second embodiment of the invention that a dealer in a baccarat game pays for a wining player (game participant).

As remarkable functions of the invention, the control device 14 has functions described in the following 1) to 5) according to the rule of the baccarat game and determines whether or not fraud in discordance with the rule is performed. Namely, the functions are as follows: 1) whether or not there is movement of the chips 9 is surveilled by the information obtained the image analyzing apparatus 12 using the camera 2 during the time interval from the signal starting the card extraction obtained from the card distribution device 3 or from the game start operation of the dealer 5 pushing a start button 4*s* before the win or lose result of the game is displayed by the card distribution device 3 in each game (illustrated in FIG. 8); 2) whether or not the loser 6 takes the chips 9 fraudulently is surveilled by the information obtained the image analyzing apparatus 12 using the camera 2 during the time interval when the dealer 5 collects the chips 9 wagered by the loser among the game participants 6 after the end of each game (illustrated in FIG. 9); 3) whether or not a person (winner or loser) other than the dealer 5 adds the winning chips 9W or newly places the chips 9 on the winning side which the person did not wager chips on is surveilled by the information obtained the image analyzing apparatus 12 using the camera 2 during the time interval when the dealer 5 collects the chips 9 wagered by the loser among the game participants 6 after the end of each game; 4) whether or not the dealer 5 correctly places the paid chips 9W on the position of the chips 9 wagered by the winner among the game participants 6 (illustrated in FIG. 10) is surveilled by the information obtained the image analyzing apparatus 12 using the camera 2 after the end of each game; and 5) whether or not the winner 6W among the game participants 6 takes the wagered chips 9 and the paid chips 9W (illustrated in FIG. 11) is surveilled by the information obtained the image analyzing apparatus 12 using the camera 2 after the end of each game (the dealer 5 manipulates the card distribution device 3 to allow the display lamp 13 to display the win or lose result).

The control device 14 performs analysis of the information obtained by using the camera 2 by the image analyzing apparatus 12. Namely, although the above-described surveillance of from 1) to 5) is performed by detecting the movement of the hands of the dealer 5 and the game participant 6, the movement of the chips, or the movement of the hands and the movement of the chips by the using the analysis result of the image analyzing apparatus 12, in a fundamental analysis, it needs to be found at least who the chips 9 is taken to. Hereinafter, a method of the analysis will be described with reference to FIGS. 12A to 12C and 13.

The chips 9 wagered by the game participant 6L losing the game are collected by the dealer 5. Whether or not the collection is accurately performed is surveilled by analyzing the information obtained by using the camera 2 in the image analyzing apparatus 12. First, a change from the state (FIG. 12A) that the betting chips 9 exist to the state (FIG. 12C) that the chips do not exist is detected by the image analysis. Next, an image (FIG. 12B) between the state that the chips 9 exist and the state that the chips do not exist is analyzed. In the image (FIG. 12B) between the state that the chips 9 exist and the state that the chips do not exist, which side the hand 5*h* reaches from (from the top side of FIG. 12 or the others) is analyzed. Fraud is detected in accordance with a rule, that is, in the case where the hand reaches from the top side (the hand movement, that is, the hand appears from the top side or the hand leaves toward the top side), the hand 5*h* is determined as the hand of the dealer 5, and in the case where the hand reaches from the other directions, the hand movement is determined as fraud.

Figure 11:
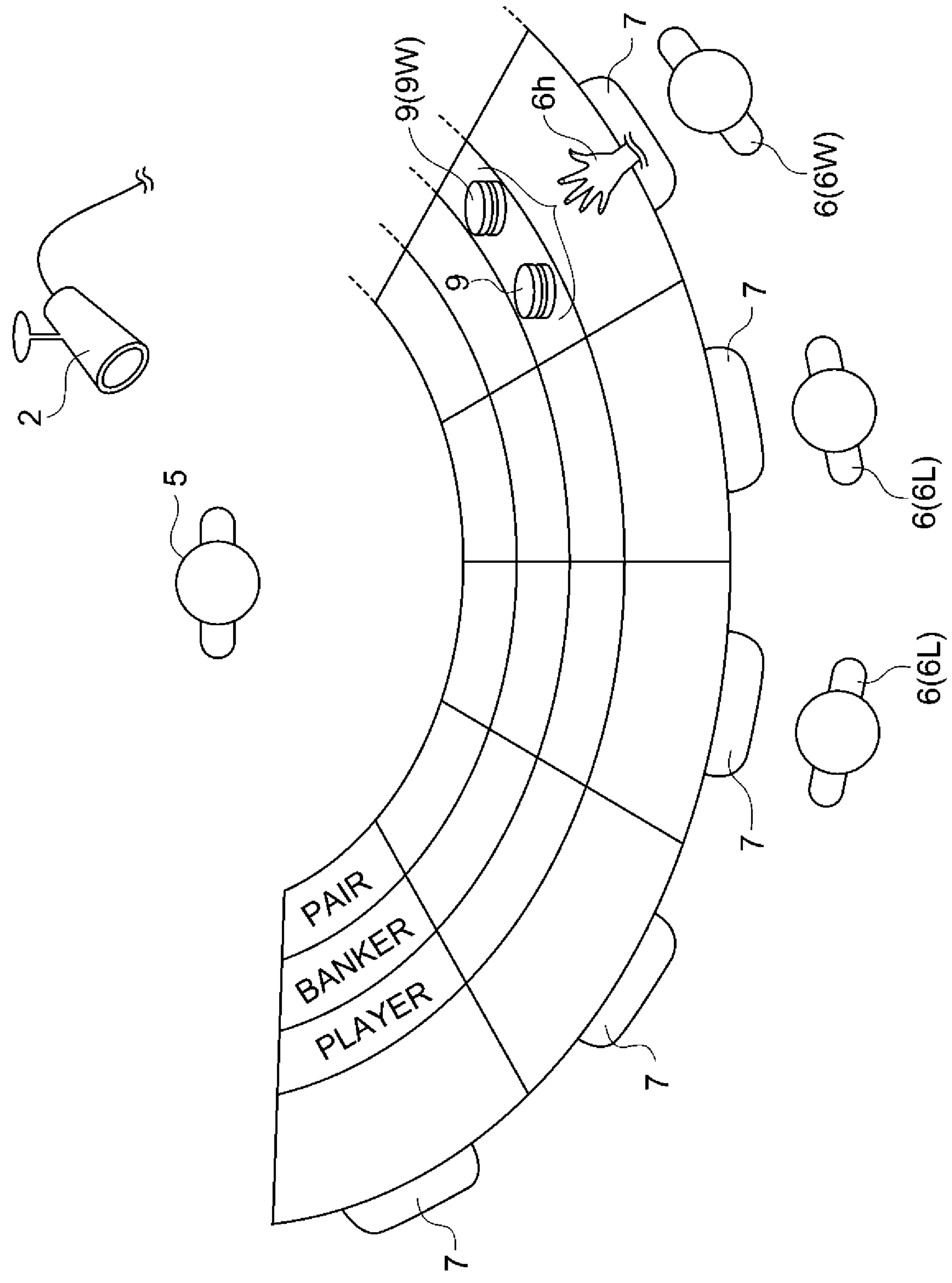
FIG. 11 is a diagram illustrating a situation in the second embodiment of the invention that a wining player (game participant) in a baccarat game collects chips and receives payout.
Figure 12A:
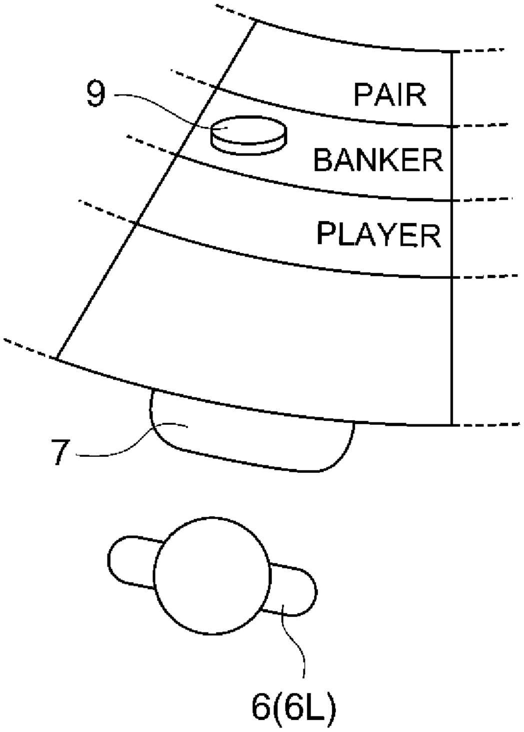
FIG. 12A is a diagram illustrating an image as an object of image analysis for collection of chips which a casino side wins by a dealer in the fraud detection system according to the second embodiment of the invention.
Figure 12B:
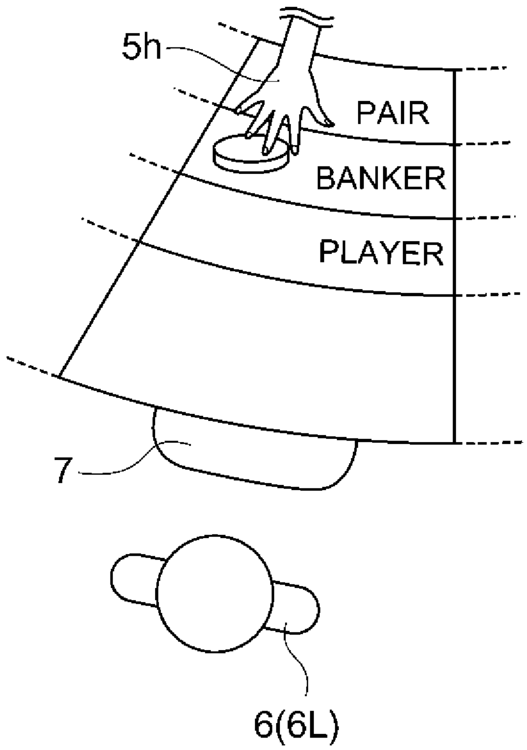
FIG. 12B is a diagram illustrating an image as an object of image analysis for collection of chips which a casino side wins by a dealer in the fraud detection system according to the second embodiment of the invention.
Figure 12C:
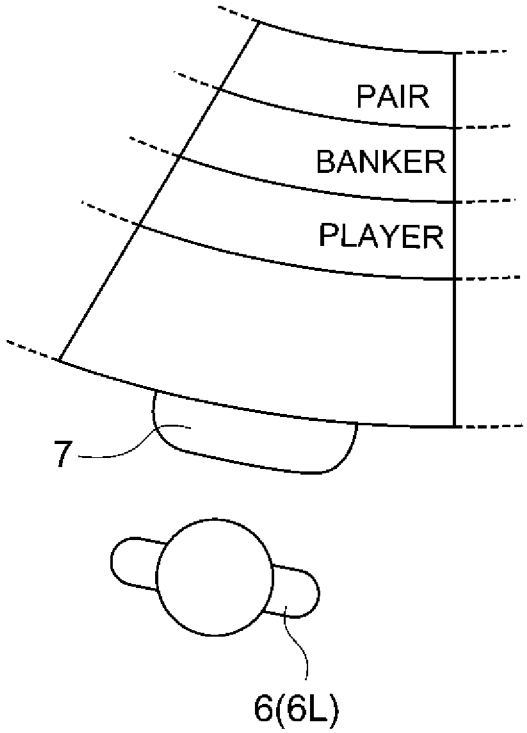
FIG. 12C is a diagram illustrating an image as an object of image analysis for collection of chips which a casino side wins by a dealer in the fraud detection system according to the second embodiment of the invention.
Figure 13:
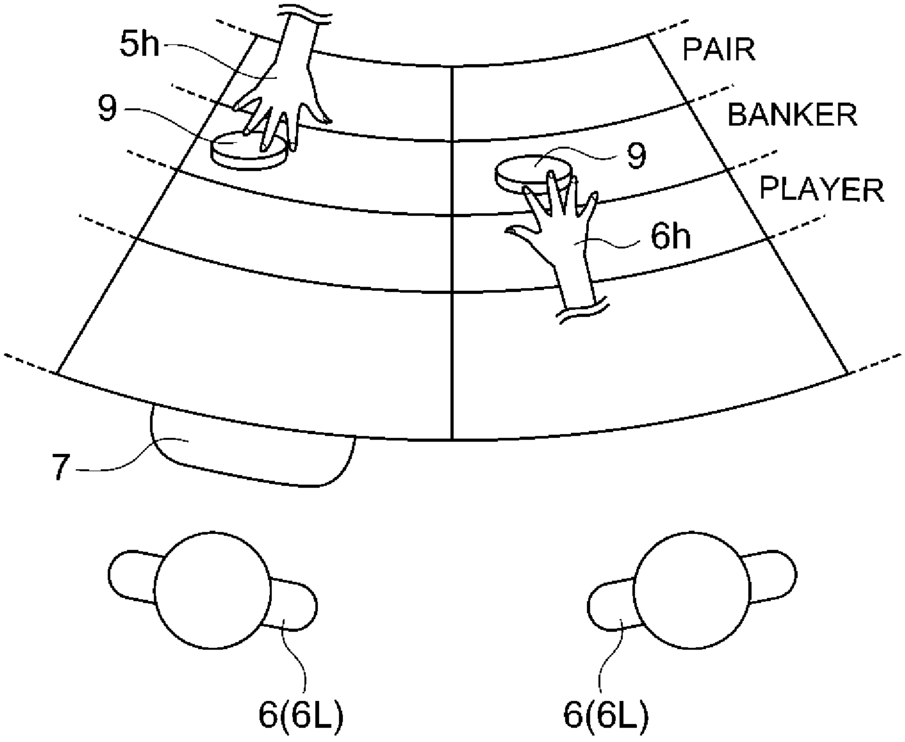
FIG. 13 is a diagram illustrating an image as an object of image analysis for fraudulent collection of chips in the fraud detection system according to the second embodiment of the invention.

While the dealer 5 collects the chips 9 wagered by the game participant 6L losing the game, it is surveilled whether or not another person takes the lost chips 9 fraudulently (FIGS. 12 and 11). In the image between the state that the chips 9 exist and the state that the chips do not exist, as illustrated in FIG. 12, through analyzing the movement of the loser 6L and the like among the game participants 6, it is detected by the image analysis that the hand 6*h* reaches or moves from the bottom side of FIG. 12 (actually, from the top side), and the movement is determined that the hand 6*h* or the like other than the hand of the dealer 5 takes the chips 9, so that it is determined that fraud occurs.

Figure 14A:
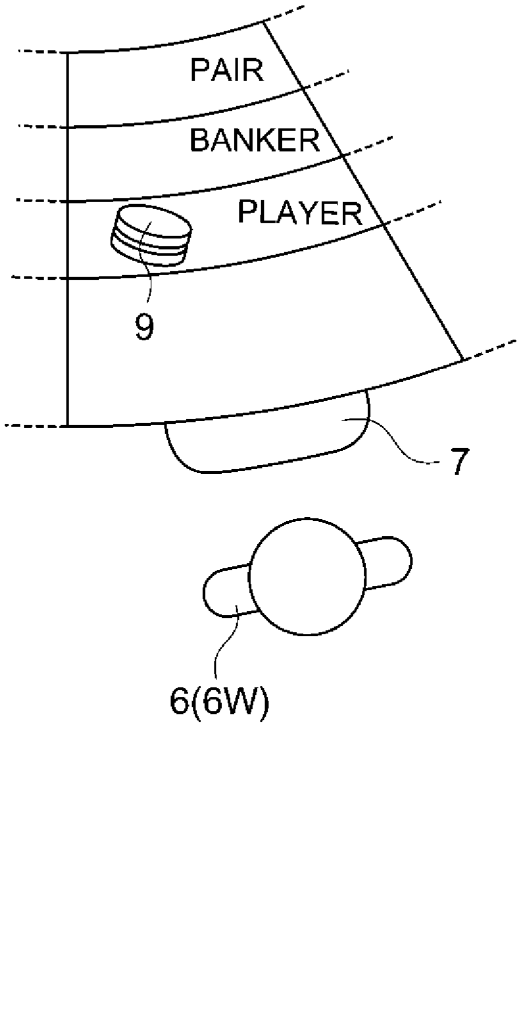
FIG. 14A is a diagram illustrating an image as an object of image analysis for collection of chips which a game participant side wins in the fraud detection system according to the second embodiment of the invention.
Figure 14B:
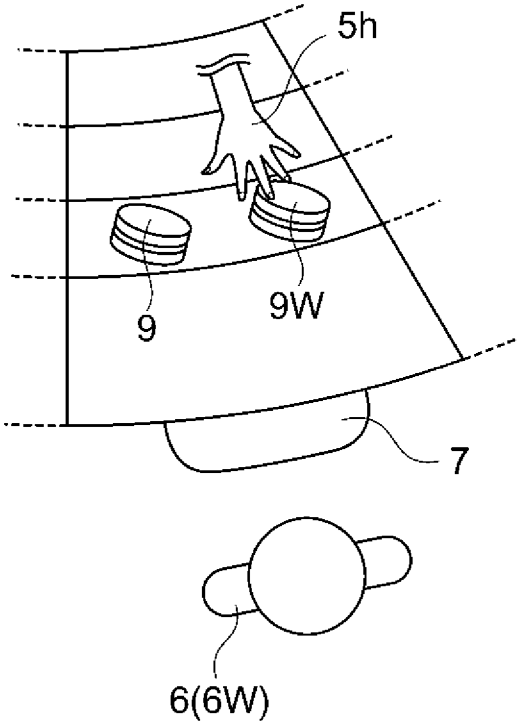
FIG. 14B is a diagram illustrating an image as an object of image analysis for collection of chips which a game participant side wins in the fraud detection system according to the second embodiment of the invention.
Figure 14C:
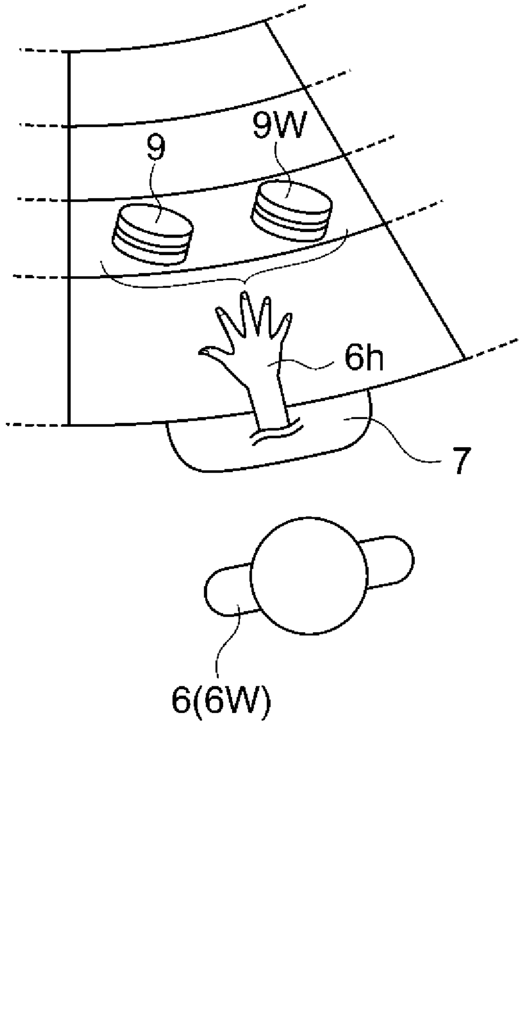
FIG. 14C is a diagram illustrating an image as an object of image analysis for collection of chips which a game participant side wins in the fraud detection system according to the second embodiment of the invention.
Figure 14D:
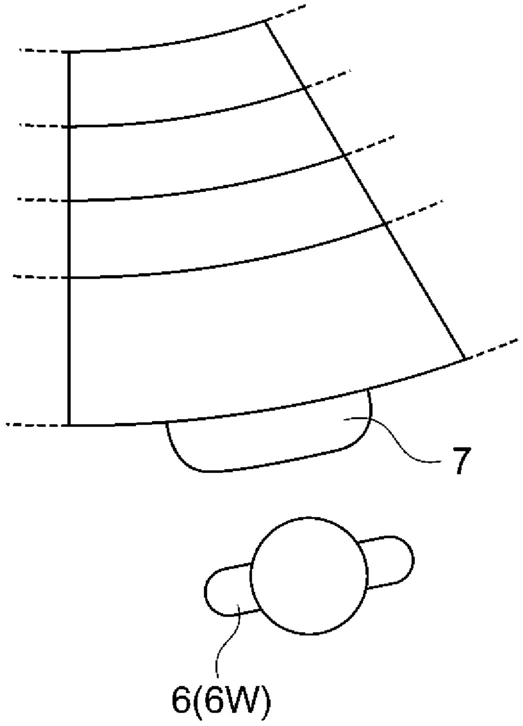
FIG. 14D is a diagram illustrating an image as an object of image analysis for collection of chips which a game participant side wins in the fraud detection system according to the second embodiment of the invention.
Figure 15:
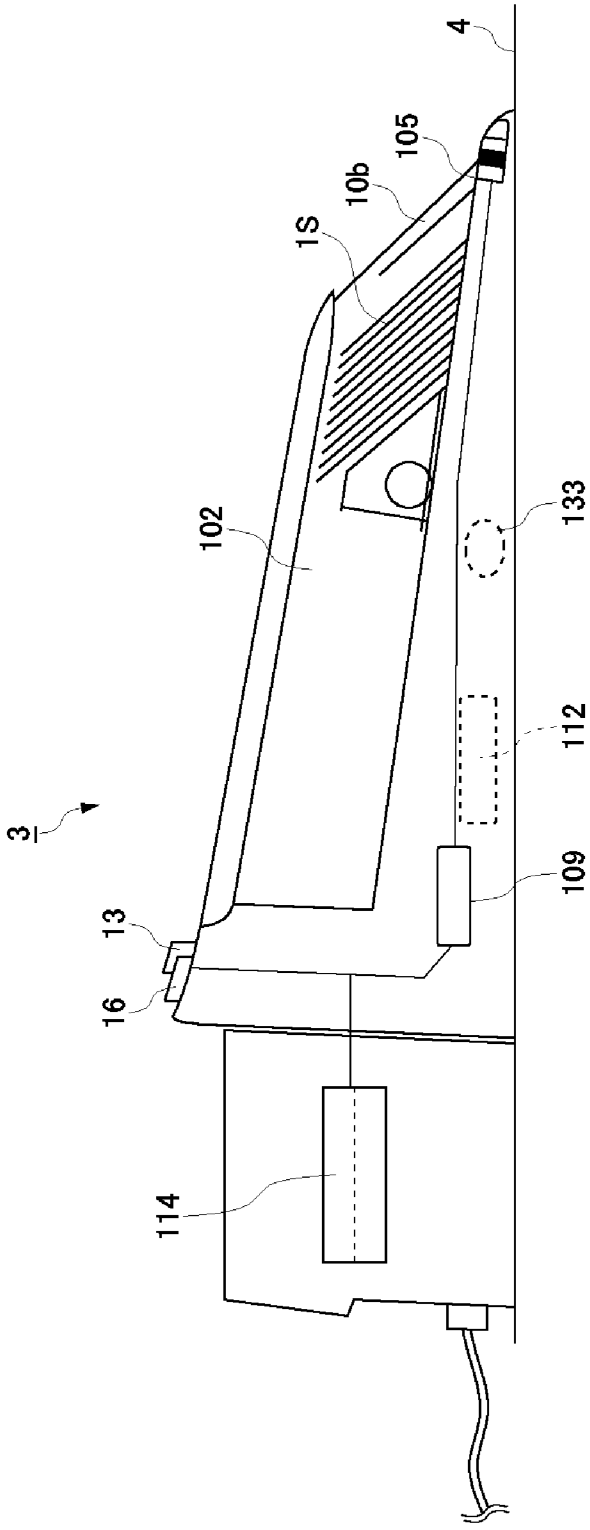
FIG. 15 is a side cross-sectional diagram illustrating a card distribution device in the second embodiment of the invention.

First, with respect to the winning chips illustrated in FIG. 14A, the chips 9W are redeemed in accordance with the game rule as illustrated in FIG. 14B. A change from the state illustrated in FIG. 14A to the state illustrated in FIG. 14B is detected, and at the same time, whether or not the hand is the hand 5*h* of the dealer 5 is detected by the image analysis. After that, as illustrated in FIG. 14C, now, whether or not the hand 6*h* of the winner 6W among the game participants 6 reaches (moves) the same betting area and, after that, all the chips 9 do not exist (state of FIG. 14D) is verified from the image analysis result in accordance with the game rule by the control device 14, so that it is determined whether or not fraud occurs.

In addition, the control device 14 is configured to determine whether or not the amount of chips redeemed to the winner by the dealer 5 is correct according to the amount wagered by the winner 6W among the game participants 6. Hereinafter, a specific example thereof is described. It is assumed that, when the chips 9 are overlapped in a deviated manner or are in a blind spot from the position of the camera 2, the position and total amount of the chips 9 (which of the betting areas 8 of the player side and the banker side the chips 9 are wagered on) cannot be read normally. The control device 14 is configured to be capable of recognizing concealing or the like (including concealing of a portion of one chip and concealing of the entire chip) of the chip 9 caused by the blind spot, so that the number of chips or the like can be accurately recognized by using a self-learning function or the like according to an existing artificial intelligence utilizing type computer or control system and deep learning (structure) technique. In addition, the structure of detecting the position and type of the chip 9 in the betting area 8 is not limited thereto, but for example, the structure may be configured so that the position and the type can be detected by reading the ID buried in the chip.

As described heretofore, the control device 14 can recognize, through the camera 2 and the image analyzing apparatus 12, the position 8 (position of player, banker, or pair wagered) on which each player 6 wagers the chips 9 and the type (different amount values are designated to different colors of the chips 9) and the number of the chips, and the control device can detect who is the player 6 betting on the "player" (in the case where there are a plurality of the players 6 betting on the "player", who is the player 6 wagering the highest amount) and who is the player 6 betting on the "banker" (in the case where there are a plurality of the players 6 betting on the "banker", who is the player 6 wagering the highest amount).

In addition, the control device 14 of the fraud detection system in the game analyze the information obtained by the image analyzing apparatus 12 using the camera 2 by the above-described method in accordance with the rule of the baccarat game and performs surveillance. By performing the surveillance illustrated in the above-described 1) to 5), it is determined whether or not fraud in discordance with the rule is performed. When fraud is detected, a card distribution sensing device 14C turns on abnormality display lamps 16 provided to both of the card distribution device 3 and the gaming table 4 and outputs 15 the fraud detection to a casino management department or the like in a wireless or wired manner. A monitor or a lamp which receives the determination result to perform caution or display may be further provided to another site.

As described heretofore, the fraud is detected by the control device 14, and, at the detecting time or a proper timing, a display signal is output to the display lamp 13 of the card distribution device 3 or the abnormality display lamp 16. However, besides the performing of caution, after the time when the fraud or error is detected, a card distribution preventing function of the card distribution device 3 may be performed to prevent the distribution of the cards 1.

Hereinafter, an embodiment of the card distribution device 3 used in a table game system according to the invention will be described with reference to FIGS. 15 to 19. The card distribution device 3 is configured to include a card containing portion 102 which contains a plurality of shuffle playing cards 1*s*, a card guiding portion 105 which guides the shuffle playing card 1 when the dealer 5 or the like manually extracts the shuffle playing card 1 one by one from the card containing portion 102 toward the gaming table 4, an opening portion 106 for taking the card 1 guided from the card guiding portion 105, a card detecting unit (card detecting sensors 22 and 23) which detects that the shuffle playing card 1 is extracted when the shuffle playing card 1 is extracted, a card reading unit 108 which reads information representing at least the number (rank) of the shuffle playing card 1, a control unit 109 which determines the win or lose of the card game based on the numbers (ranks) of the shuffle playing cards 1 sequentially read by the card reading unit 108, a result display lamp 13 which displays the win or lose result determined by the control unit 109, a distribution restricting device 30 which is provided to the opening portion 106 and restricts entering and exiting of the card 1 from the card containing portion 102, and a management control unit 114 having functions equivalent to the control device 14, and these components are integrated. The card distribution device has a function where, in the case where error or fraud of the dealer in the game is detected by the control device 14, the further extraction of the card from the card distribution device 3 is stopped after the time of the detection or at a predetermined timing.

Figure 16:
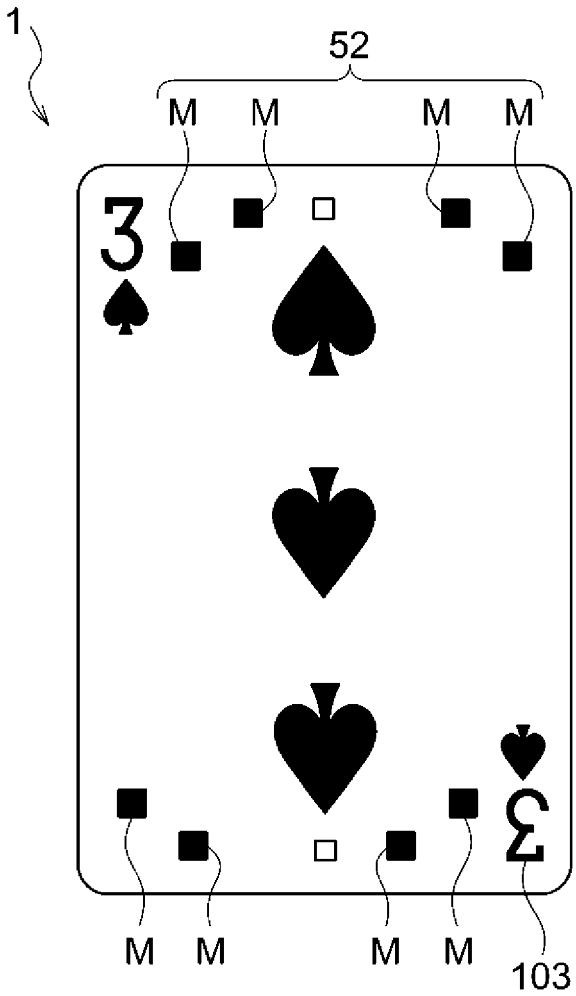
FIG. 16 is a diagram illustrating an example of a card in the second embodiment of the invention.
Figure 17:
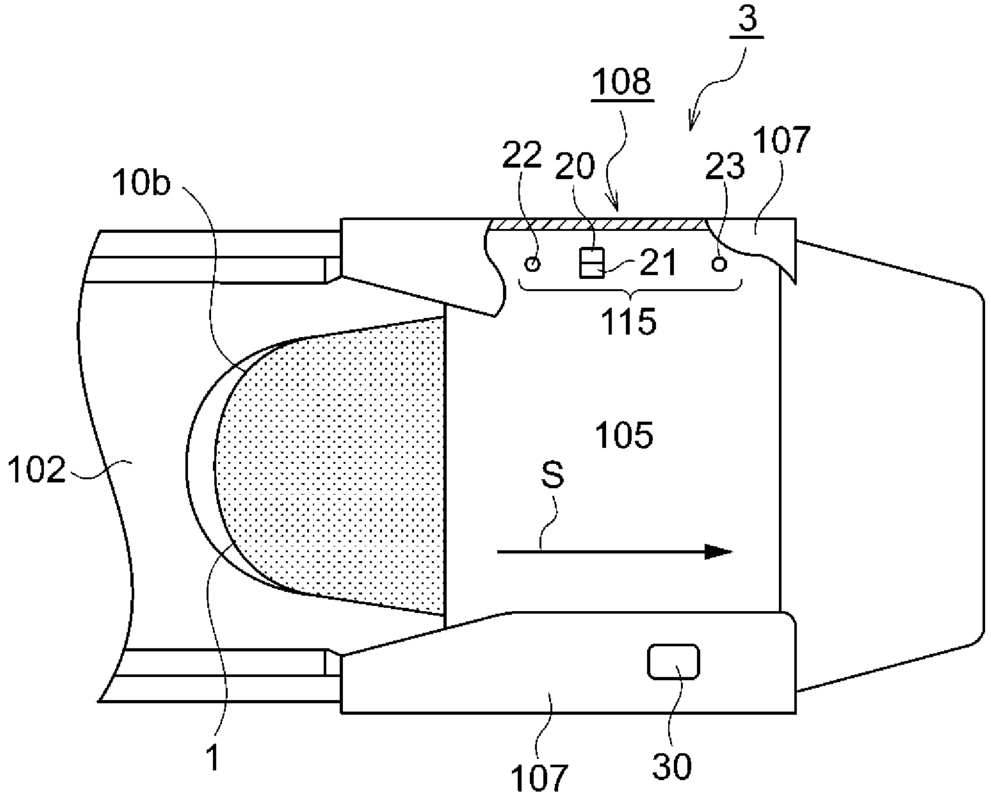
FIG. 17 is a partial cutaway plan diagram illustrating main components of a card guiding portion of the card distribution device in the second embodiment of the invention.

Next, the distribution restricting device 30 which restricts the entering and exiting of the cards 1 from the card containing portion 102 will be described with reference to FIGS. 16 and 17. The distribution restricting device 30 is provided to a card guide 107 of the card guiding portion 105 which guides the card 1 extracted one by one from the opening portion 106 in the front side of the card containing portion 102 onto the gaming table 4. The distribution restricting device 30 has a structure where, when the card 1 passes through a slot 33 between the card guiding portion 105 and the guide cover of the card guide 107, a lock member 34 presses the card 1 to prevent the entering and exiting of the card 1 in the slot 33. The lock member 34 is moved by a driving unit 35 such as an electronic solenoid or a piezoelectric device as illustrated by an arrow m so as to take two states of a position (limiting position) of pressing the card 1 and a pass enabling position of enabling the card 1 to pass. The driving unit 35 is controlled by a control unit 109 which is directly or indirectly connected to the control device 14 in a wired or wireless manner to move the lock member 34 to the two states of the position of pressing the card 1 and the pass enabling position of enabling the card 1 to pass. The rule of the baccarat game is programed and stored in advance in the control unit 109.

Figure 18A:
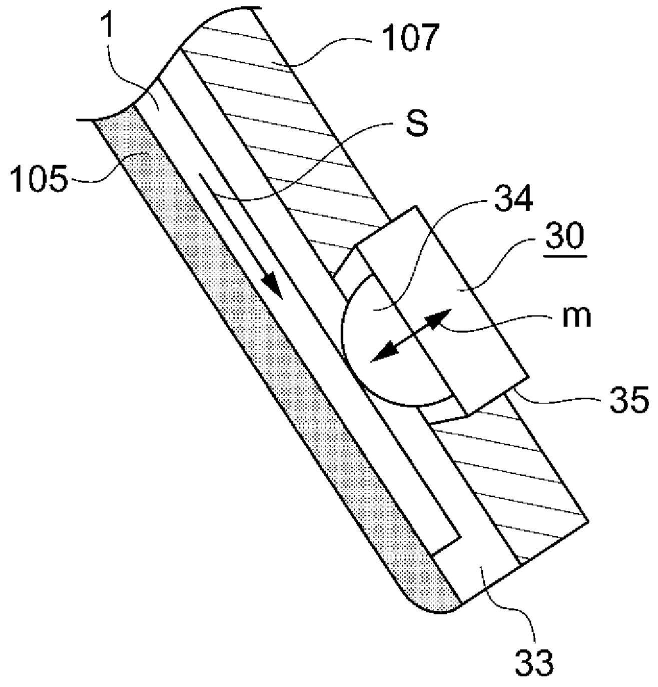
FIG. 18A is a side cross-sectional diagram illustrating main components of a modified example of the distribution restricting device which restricts entering and exiting of cards from a card containing portion of the card distribution device in the second embodiment of the invention.
Figure 18B:
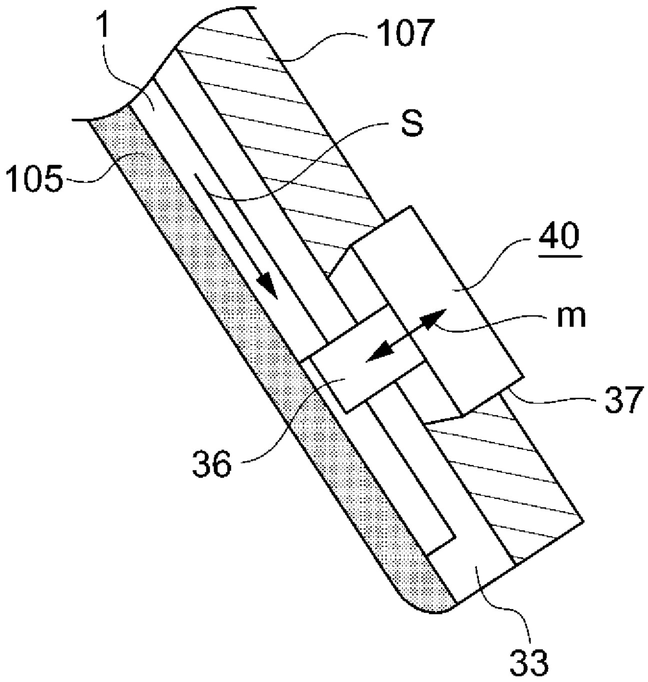
FIG. 18B is a side cross-sectional diagram illustrating main components of a distribution restricting device which restricts entering and exiting of cards from a card containing portion of the card distribution device in the second embodiment of the invention.

Next, a modified example of the distribution restricting device 30 will be described with reference to FIG. 18B. In the modified example, the distribution restricting device 40 has a structure where, when the card 1 passes through the slot 33 between the card guiding portion 105 and the card guide 107 (guide cover), the lock member 36 projects into the slot 33 to prevent the movement of the card 1. The lock member 36 is moved by a driving unit 37 such as an electronic solenoid or a piezoelectric device as illustrated by an arrow m so as to take two states of a position (limiting position) of preventing the movement of the card 1 and a pass enabling position of enabling the card 1 to pass. The driving unit 37 is controlled by the control unit 109 which is connected to the control device 14 to move the lock member 36 to the two states of the position of preventing the movement of the card 1 and the pass enabling position of enabling the card 1 to pass.

Next, details of the code reading unit 108 which reads a code 52 representing a digit (number, rank) of the card 1 from the card 1 when the card 1 is manually extracted from the card containing portion 102 will be described. FIG. 17 is a plan diagram illustrating main components of the card distribution device 3. In the figure, the code reading unit 108 is provided to the card guiding portion 105 which guides the card 1 manually extracted one by one from the opening portion 106 in the front side of the card containing portion 102 onto the gaming table 4. The card guiding portion 105 is formed to have a slanted surface, and the card guides 107 functioning as a sensor cover are provided to two edges of the card guiding portion. In addition, each of the two card guides 107 is formed detachable by using a screw or the like (not shown). If the card guides 107 are detached, sensor groups 115 of the code reading unit 108 are exposed. The sensor group 115 is configured with four sensors including two UV-ray sensitive sensors (UV sensors) 20 and 21 and object detection sensors 22 and 23.

The object detection sensors 22 and 23 are optical-fiber type sensors of detecting the existence of the card 1 and can detect the movement of the card 1. One object detection sensor 22 is located at the upstream side of the card guiding portion 105 in the card 1 flowing direction, and the other object detection sensor 23 is located at the downstream side. As illustrated in the figure, the two object detection sensors 22 and 23 are provided at the respective upstream and downstream sides to interpose the UV sensors 20 and 21. The UV sensors 20 and 21 have LEDs (UV LEDs) emitting a UV ray and sensors. A mark M of the code 52 is printed on the card 1 by using UV ray emitting ink which exhibits color if the ink is hit by the UV ray. By irradiating the card 1 with the UV ray (black light), reflected light of the mark M of the code 52 of the card 1 is sensed by the sensor. The UV sensors 20 and 21 are connected to the code reading unit 108 and the control unit 109 through cables. In the code reading unit 108, a combination of the marks M is determined and the number (rank) corresponding to each code 52 is determined from the output signal of the sensors, that is, the UV sensors 20 and 21.

Figure 19:
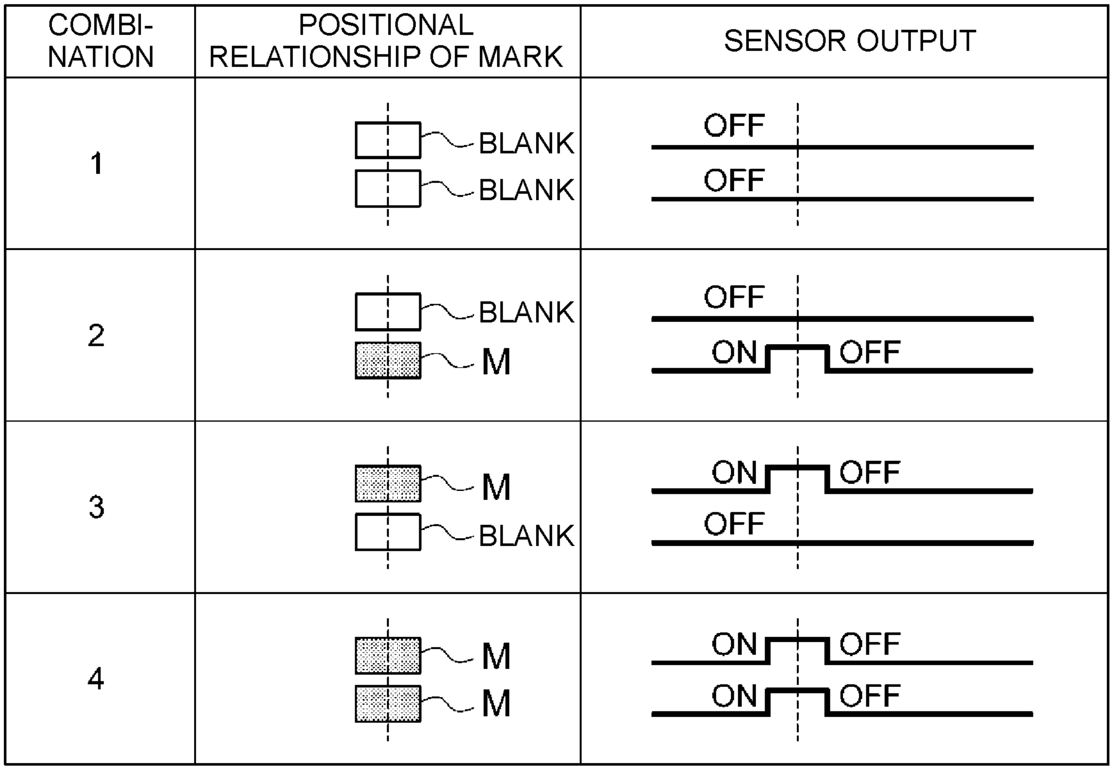
FIG. 19 is a diagram illustrating a relationship between output wave forms of sensors and marks in the card distribution device in the second embodiment of the invention.

In the code reading unit 108, starting and ending of the UV sensors 20 and 21 are controlled by the control unit 109 based on the detection signals of the object detection sensors 22 and 23. In addition, the control unit 109 determines based on the detection signals of the object detection sensors 22 and 23 whether or not the card 1 passes through the card guiding portion 105 normally. As illustrated in FIG. 19, two rows and four columns of the rectangular marks M representing the rank (number) and suit (heart, spade, or the like) of the card are arranged in the edge of the card 1. If the UV sensors 20 and 21 sense the mark M, the sensors output “on” signals. The code reading unit 108 determines a relative relationship between the two signals input from the two UV sensors 20 and 21. Therefore, the code reading unit 108 specifies the code according to a relative difference between the two marks M sensed by the two UV sensors 20 and 21 to specify the number (rank) and type (suit) of the corresponding card 1.

The relationship between the code 52 and the outputs of the “on” signals of the two UV sensors 20 and 21 is illustrated in FIG. 19. Based on the result of comparison of the relative change of the outputs of the “on” signals of the UV sensors 20 and 21, a predetermined combination of the marks M can be specified. As a result, four combinations of the marks M of the up and down two columns are obtained, and if the four combinations are printed in four columns, 4 to the 4th power, that is, 256 types of codes can be configured. By assigning 52 types of cards of the playing cards to 256 types of the codes, details of the assignment is stored as a comparison table in a memory or as a program, and the code reading unit 108 is configured so that, by specifying each code 52, the number (rank) and type (suit) of the card 1 is specified from a predefined comparison table (not shown). In addition, since the 256 types of the codes are stored in the comparison table in a manner that the codes are freely combined to be in association with the 52 types of the cards, the combinations may be complicated, and thus, the combinations of the 256 types of the codes and the 52 types of the card can be changed according to time and location. It is preferable that the code is printed by using a paint which is visualized by being irradiated with UV light and the code is printed at a position where the codes do not overlap a type indicator or index 103 of the card.

In addition, in the above-described embodiment, although the image analyzing apparatus 12 or the control device 14 is a device having an artificial intelligence utilizing type structure or a deep learning structure, specifically, the image analyzing apparatus 12 or the control device 14 may perform image analysis or the above-described various controls by using scale-invariant feature transform (SIFT) algorithm, convolution neutral network (CNN), deep learning, machine learning, or the like. Such a technique is a technique of performing image recognition on a captured image to recognize an object included in the image. Particularly, in recent years, object recognition at high accuracy is performed by using a deep learning technique utilizing a multilayered neutral network. In the deep learning technique, generally, layers covering multiple stages are overlapped in intermediate layers between an input layer and an output layer of the neutral network, so that the object is recognized at high accuracy. In the deep learning technique, particularly, a convolution neutral network has drawn attention because the convolution neutral network has higher performance than the object recognition based on image feature amounts in the related art.

In the convolution neutral network, recognition object images attached with label are learned, and main objects included in the recognition object image are recognized. In the case where a plurality of the main objects exist in the learned image, an area rectangle is specified, and the image corresponding to the specified area is attached with a label and the learning is performed. In addition, in the convolution neutral network, the main objects in the image and the positions of the objects can also be determined.

As the convolution neutral network is described more in detail, in the object recognition process, edge extraction process and the like is performed on the recognition object image, candidate areas are extracted based on localized features, the candidate areas are input to the convolution neutral network to extract feature vectors, classification is performed, and the candidate area having the highest degree of certainty among the classified candidate areas is acquired as a result of the recognition. The degree of certainty is a quantity representing how higher a degree of similarity between a certain image area and a subject of the image learned together with the label is than the degree of similarity of another class.

In addition, devices having an artificial intelligence utilizing type structure or a deep learning structure are disclosed in U.S. Pat. No. 9,361,577; US 2016/0171336; US 2015/0036920, JP 2016-110232, and these disclosures are incorporated into this specification by reference.

Heretofore, although various embodiments of the invention are described, the above-described embodiments can be modified within the scope of the invention by the skilled in the art, and if needed in a game to which the embodiment is applied, the apparatus according to the embodiment may be appropriately modified.

The following inventions are disclosed by the above first and second embodiments.

(1) A fraud detection system in a casino having a plurality of gaming tables, comprising: a game recording apparatus which records a progress of a game played in the gaming table as an image; an image analyzing apparatus which performs image analysis on the image of the recorded progress of the game; a win/lose result determining apparatus which determines a win or lose result of each game in the gaming table; and a control device which detects fraud practiced in the gaming table by using a result of the image analysis by the image analyzing apparatus and the win or lose result determined by the win/lose result determining apparatus, wherein the control device recognizes a position, type, and number of the chips wagered by each player through the image analyzing apparatus and recognizes a total amount of chips in a chip tray of a dealer of the gaming table, performs addition/subtraction calculation of an increased/decreased amount of the chips in the game calculated from the position, type, and number of the chips wagered by all the players in the game and the win or lose result of the game obtained from the win/lose result determining apparatus from the total amount of the chips in the chip tray before the settlement of each game and compares a correct total amount of the chips in the chip tray after end of the game and settlement and an actual total amount of the chips in the chip tray at the time of the end of the game obtained through the image analyzing apparatus to determine whether or not there is difference between the correct total amount and the actual total amount.

(2) The fraud detection system according to (1), wherein the control device recognizes the position, type, and number of the chips wagered by each player through the image analyzing apparatus, recognizes the actual total amount of the chips in the chip tray at the time when the collection of all the amount of the lost chips wagered by each player is ended, and compares the correct total amount of the chips in the chip tray added with the increased amount of the chips in the chip tray in the game from the position, type, and number of the chips wagered by the lost player from the total amount of the chips in the chip tray before the settlement of each game and the actual total amount of the chips in the chip tray to determine whether or not there is difference between the correct total amount and the actual total amount.

(3) The fraud detection system according to (2), wherein, in the case where the control device compares the correct total amount of the chips in the chip tray added with the increased amount of the chips in the chip tray in the game from the position, type, and number of the chips wagered by the lost player from the total amount of the chips in the chip tray before the settlement of each game and the actual total amount of the chips in the chip tray and determines that there is no difference between the correct total amount and the actual total amount and the control device compares the correct total amount of the chips in the chip tray after the end of the game and the settlement and the actual total amount of the chips in the chip tray obtained through the image analyzing apparatus at the time of the end of the game and determines that there is difference between the correct total amount and the actual total amount, the control device determines a mistake in payment and generates a payment mistake signal indicating the mistake in payment.

(4) The fraud detection system according to (2), wherein the chip tray is provided with a collection chip tray where the chips wagered by the lost player are collected and temporarily stored, and the image analyzing apparatus and the control device compare the correct amount of chips in the collection chip tray calculated from the position, type, and number of the chips wagered by the lost player and the actual total amount of the chips in the collection chip tray to determine whether or not there is difference between the correct total amount in the collection chip tray and the actual total amount.

(5) The fraud detection system according to (1), wherein acquisition of the actual total amount of the chips in the chip tray after the end of the game and the settlement through the image analyzing apparatus is performed any one of: 1) the time when redemption for the winning chips is ended; 2) the time when the cards used in the game are collected to be discarded into a discard area of the table; 3) the time when a predetermined button attached to the win/lose result determining apparatus is pushed; and 4) the time when a marker representing win or lose is returned to an initial state.

(6) The fraud detection system according to any one of (1) to (3), wherein, when the control device determines that there is difference that the recognized actual total amount of the chips in the chip tray of the dealer of the gaming table does not match with the increased/decreased amount of the chips calculated from the amount of the chips wagered by all the players and the win or lose result of the game, the game recording apparatus is configured to be capable of allocating indexes or time points to the acquired images or reproducing the images specified with a collection scene or a redemption scene of the chips so that the record of the game where the difference occurs can be analyzed in the game recording apparatus.

(7) The fraud detection system according to any one of (1) to (3), wherein the image analyzing apparatus or the control device has a structure where, although a portion of or the entire chips among a plurality of the chips placed on the gaming table is concealed due to a blind spot of the camera, information on the type, number, and position of the wagered chips can be obtained.

(8) The fraud detection system according to (1), wherein the control device has a structure capable of: 1) recognizing the position, type and number of the chips wagered in each play position of the game table and comparing the history of win and lose of each player obtained from the win or lose result of each game and the amount of the acquired chips and the statistical data of previous games to extract a strange situation; and 2) comparing a state that, at a play position of a certain gaming table, the amount of betting chips at the lost time is smaller than the amount of betting chips at the win time and the statistical data of previous games to extract a strange situation.

(9) The fraud detection system according to any one of claims 1 to 3, wherein the control device performs comparison determination as to whether or not the recognized amount of chips in the chip tray of the dealer of the gaming table is increased or decreased according to the paid amount of the chips corresponding to the exchanged cash or the paid amount of the cash corresponding to the exchanged chips after the exchange of cash and chips.

(10) The fraud detection system according to claim 9, wherein the control device is further provided with database storing history of exchange of cash and the chips, and by referring to the database in unit of a predetermined time or a day, and the control device is capable of performing comparison determination as to whether or not the recognized amount of the chips in the chip tray of the dealer of the gaming table is increased or decreased according to the paid amount of the chips corresponding to the exchanged cash or the total amount of the paid amount of the cash corresponding to the exchanged chips.

(11) The fraud detection system according to claim 1 or 8, wherein the control device is capable of specifying a player of the play position extracted as the difference or the strange situation through the image analyzing apparatus.

(12) The fraud detection system according to claim 11, wherein the control device has a caution function of informing about the existence of the specified player in another gaming table when the specified player departs and arrives at the other gaming table.

(13) The fraud detection system according to any one of claims 1 to 3, wherein the control device has at least one of functions of determining as to: 1) whether or not there is movement of chips during the time interval from the start of extraction of cards or from the game start operation of the dealer before the win or lose result of the game is displayed by the card distribution device in each game; 2) whether or not there is movement of chips by a person other than the dealer during the time interval when the dealer collects chips wagered by the losers among the game participants after the end of each game; 3) whether or not a chip is added during the time interval when the dealer collects chips wagered by the losers among the game participants after the end of each game; 4) whether or not the dealer performs payment for a position of chips wagered by the winner among the game participants after the end of each game; and 5) whether or not the winner among the game participants receives wagered chips and paid chips after the end of each game.

(14) The fraud detection system according to any one of claims 1 to 3, wherein the win/lose result determining apparatus is a card distribution device which distributes the cards in the gaming table or a control device which determines the win or lose result of each game from information of the image analyzing apparatus reading the cards distributed in the gaming table by using a camera.

Real "sales" of a casino manager in casino facilities (a casino) are the total amount of chips bet by a player. In addition, an amount obtained by subtracting a paid amount from the sales is a profit (a gross profit) of the casino manager. However, in the current casino, the sales or the profit are not capable of being managed. In addition, a transition of the sales or the profit for each table or each pit is not capable of being recognized in detail.

Therefore, an object of this embodiment is to recognize the sales or the profit in all of the casinos, or the profit or the profit for each table or each pit.

In order to attain the object described above, one aspect of this embodiment is a game management system managing a casino game performed in a plurality of tables in casino facilities, the system including: a camera obtaining an image by capturing bet gaming tokens; an information processing device specifying a betting amount on the basis of the type and the number of gaming tokens in the image by specifying a betting target on the basis of a position of the gaming token in the image; a game result determination device determining a game result of the casino game; a calculation device calculating a profit of a casino manager for each table and each game of the plurality of tables, on the basis of the betting target, the betting amount, and the game result; and a recording apparatus recording the profit.

The game result determination device may be an electronic shoe including a containing portion containing playing cards, an extraction mechanism for extracting the playing cards one by one from the containing portion, a detection unit detecting contents of the playing cards extracted by the extraction mechanism, and a determination unit determining a game result of a baccarat game according to a rule of the baccarat game, on the basis of the contents of the playing cards detected by the detection unit.

In addition, another aspect of this embodiment is a game management system managing a casino game performed in casino facilities, the system including: a betting detection section detecting betting contents including a betting target and a betting amount of the casino game; a game result determination section determining a game result of the casino game; and a calculation section calculating a profit of a casino manager on the basis of the betting contents and the game result.

The betting detection section may include a capturing section obtaining an image by capturing the casino game, and an information processing section specifying the betting contents on the basis of the image.

The information processing section may specify the betting contents on the basis of the position, the type, and the number of gaming tokens in the image.

The information processing section may specify the betting contents on the basis of the image, according to image recognition using a machine learning model.

The casino game may be a game using playing cards, and the game result determination section may include an electronic shoe including a containing portion containing the playing cards, an extraction mechanism for extracting the playing cards one by one from the containing portion, and a detection unit detecting contents of the playing cards extracted by the extraction mechanism, and a determination section determining a game result of the casino game according to a rule of the casino game, on the basis of the contents of the playing cards detected by the detection unit.

The game management system may further include a dealer amount detection section detecting a total amount of gaming tokens of a dealer, and the calculation section may further calculate the profit, on the basis of the total amount.

An RF tag storing information of being capable of specifying at least a value of the gaming token may be built in the gaming token, and the dealer amount detection section may include an RF reader reading out the RF tag.

The betting detection section may detect the betting contents for each game, the game result determination section may determine the game result for each game, and the calculation section may calculate a profit for each game on the basis of the betting contents and the game result of the same game.

The game management system may further include a table creation section creating a table indicating the profit for each game.

The casino facilities may include a plurality of tables in which the casino game is performed, the betting detection section and the game result determination section may be disposed on each table, and the calculation section may calculate the profit for each table, with respect to the plurality of tables.

The game management system may further include a table creation section creating a table indicating the profit for each table.

The calculation section may further calculate a total betting amount on the basis of the betting contents.

The calculation section may further calculate a profit rate on the basis of the profit and the total betting amount.

The game management system may further include an alarming section generating an alarm with respect to the profit rate of less than or equal to a predetermined threshold value.

The game management system may further include an alarming section generating an alarm with respect to the profit rate of greater than or equal to a predetermined threshold value.

Still another aspect of this embodiment is a game management system managing a casino game performed in a plurality of tables in casino facilities, the system including: a camera obtaining an image by capturing bet gaming tokens, an information processing device specifying a betting amount on the basis of the type and the number of gaming tokens in the image; a calculation device calculating a total betting amount for each table with respect to the plurality of tables; and a recording apparatus recording the total betting amount for each table.

Still another aspect of this embodiment is a game management system managing a casino game performed in a table of casino facilities, the system including: a camera obtaining an image by capturing bet gaming tokens; an information processing device specifying a betting amount on the basis of the type and the number of gaming tokens in the image; a calculation device calculating a total betting amount for each game; and a recording apparatus recording a transition of the total betting amount for each game.

The game management system of this embodiment is capable of recognizing the sales (the total betting amount) or the profit for each of all or a part (the table) of the casino facilities according to the configuration described above.

Figure 20:
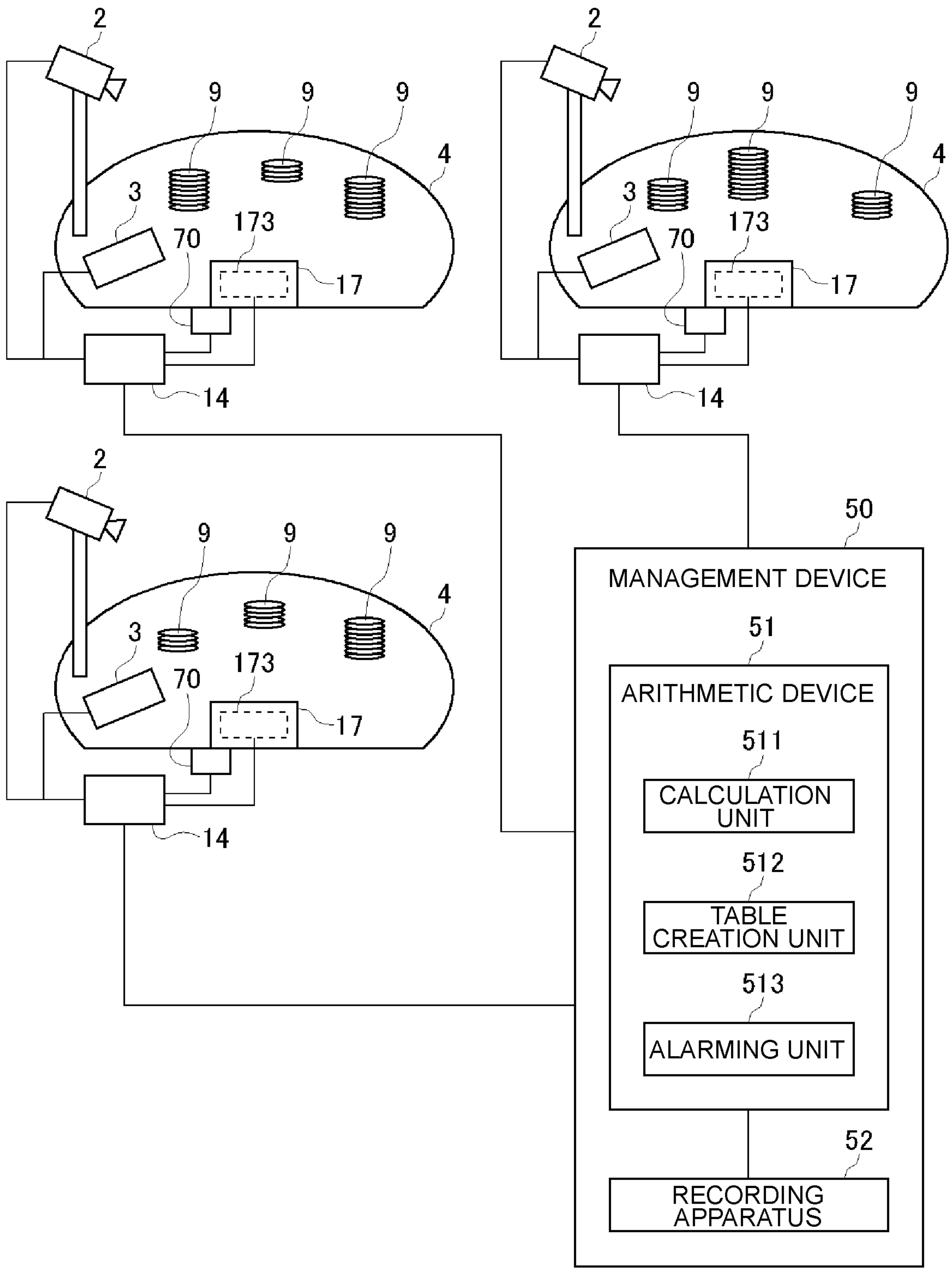
FIG. 20 is a schematic view of casino facilities to which a game management system of a third embodiment of the invention is introduced.

Hereinafter, the game management system of this embodiment will be described with reference to the drawings. FIG. 20 is a schematic view of casino facilities to which a game management system 100 of this embodiment is introduced. As illustrated in FIG. 20, a plurality of gaming tables 4 are disposed in the casino facilities, and a casino game is performed in each of the gaming tables 4. In the gaming table 4, one side is a dealer side on which a dealer is positioned, and the other side is a player side on which a player is positioned. In the example of FIG. 20, an upper side of each of the gaming tables 4 is the player side, and a lower side is the dealer side.

Betting is performed on the gaming table 4 by using chips 9. In each game, the player places the type and the number of chips 9 to be bet by himself in an area corresponding to a betting target on the gaming table 4, and thus, performs betting.

In gaming tokens (hereinafter, referred to as "chips") 9, the design of a front surface and a side surface is different for each type, and any one of the front surface and the side surface is observed, and thus, the type can be specified. In this embodiment, a value different for each type (for example, 1000 dollars, 100 dollars, 10 dollars, or the like) is applied to the chips 9. Accordingly, the type is specified, and thus, the value of the chip 9 is specified.

An RF tag recording information of being capable of specifying at least the type is built in the chips 9. The information recorded in the RF tag (RF tag information) may include information indicating the type of chip 9, or may include identification information uniquely specifying the chips 9. In a case where the RF tag information is the identification information, a database is prepared in which information of a type corresponding to the identification information is stored, and thus, it is possible to specify the type corresponding to the identification information read out from the chips 9, with reference to the database. In this embodiment, both of the information indicating the type and the identification information are recorded in the RF tag of the chip 9, and the value can be specified by the information indicating the type.

A chip tray 17 is disposed on a dealer side of the gaming table 4. The chips 9 of the dealer are contained in the chip tray 17. An antenna 173 for reading out the RF tag information of the RF tag built in the chips 9 is disposed on the inside or the outside of the chip tray 17. The antenna 173 receives an electrical wave from the RF tag of the chips 9 contained in the chip tray 17.

A card distribution device 3 which also functions as a win or lose determination device is disposed on the gaming table 4 to be used. The configuration of the card distribution device 3 is identical to the card distribution device 3 of the first embodiment or the second embodiment, and thus, the detailed description will be omitted. In this embodiment, the card distribution device 3 determines a win or lose result of any one of for each game, according to a rule of a baccarat game the winning of the player, the winning of a banker, and a tie. That is, as illustrated in FIG. 15 to FIG. 19, the card distribution device 3 is an electronic shoe including a card containing portion 102 containing playing cards 1*s*, a card guiding portion 105 and an opening portion 106 configuring an extraction mechanism for extracting the playing cards 1*s* one by one from the card containing portion 102, card detection sensors 22 and 23 and a card reading unit 108 configuring a detection unit detecting the contents of the playing cards 1 extracted by the extraction mechanism, and a control unit 109 as a determination unit determining a game result of the baccarat game on the basis of the contents of the playing cards detected by the card reading unit 108, according to the rule of the baccarat game.

A camera 2 is disposed on each of the gaming tables 4. The camera 2 is attached to a tip end of a pole extending towards the upper side, and is disposed on a high portion of the gaming table 4. A capturing direction and an angular field of the camera 2 are set such that the camera 2 is capable of capturing a range including at least a betting area of the gaming table 4 (an area where the player places the chips 9 in order for betting), the card distribution device 3, and the chip tray 17. The camera 2 is capable of obtaining an image by capturing the bet chips.

Furthermore, in the example of FIG. 20, one camera 2 is disposed on each of the gaming tables 4, but a plurality of cameras 2 of which at least one of the dispose positions, the capturing directions, or the angular fields are different from each other, may be disposed on each of the gaming tables 4 to capture different ranges. For example, the camera 2 capturing the betting area and the camera 2 capturing the chip tray 17 may be separately disposed, or the same betting area may be captured by a plurality of cameras of which the disposition heights are different from each other, and the capturing directions are different from each other.

A control device 14 is further disposed on each of the gaming tables 4. The control device 14 is connected to the camera 2 of the gaming table 4 (in a case where the number of cameras 2 is plural, a plurality of cameras 2), the card distribution device 3, and the RF antenna 173. The control device 14 has a plurality of functions as an information processing device.

First, the control device 14 has a function as an RF reader, which specifies the type of all of the chips 9 contained in the chip tray 17, on the basis of the electrical wave received by the antenna 173, calculates the total amount of the chips 9 contained in the chip tray 17, and records the total amount. In addition, the control device 14 has a function of receiving the win or lose result of each of the games from the card distribution device 3, and of recording the result. Further, the control device 14 has a function as an image recognition device, which acquires a captured image from the camera 2, performs image recognition using a machine learning model, with respect to the captured image, and recognizes betting contents, that is, how much the player bets on the betting target, which player bets, which betting target the player bets on, as with the first embodiment and the second embodiment. The machine learning model may be a neural network of a deep learning structure. Specifically, the control device 14 specifies the player and the betting target on the basis of the positions of the chips 9 in the captured image, and specifies the betting amount on the basis of the type and the number of chips 9 in the captured image.

Thus, the control device 14 recognizes the total amount of the chips 9 contained in the chip tray 17 (hereinafter, also referred to as a "dealer amount") by using the antenna 173, recognizes the win or lose result of the game (hereinafter, also referred to as a "game result") by using the card distribution device 3, and recognizes the betting contents by using the image from the camera 2, for each game, on each of the gaming tables 4. It is possible to calculate the sales and the profit of the casino manager in each of the games, on the basis of such information (the chip tray total amount, the game result, and the betting contents).

The game management system 100 includes a management device 50 connected to the control device 14 of the plurality of gaming tables 4. The management device 50 is configured of a general-purpose computer. The management device 50 includes an arithmetic device 51 and a recording apparatus 52. The general-purpose processor executes a computer program of this embodiment, and thus, the arithmetic device 51, for example, is realized. The arithmetic device 51 includes a calculation unit 511, a table creation unit 512, and an alarming unit 513.

The calculation unit 511 acquires the information of the dealer amount, the game result, and the betting contents for each game, from the plurality of control devices 14, and calculates the sales, the profit (the gross), and the profit rate (a gross rate) for each gaming table 4. The table creation unit 512 creates a table and a graph in which the sales and the profits calculated by the calculation unit 511 are arranged in time series for each table.

Furthermore, the calculation unit 511 may calculate the sales, the profit, and the profit rate for each position of the player on each of the gaming tables 4, and the table creation unit 512 may create the table and the graph in which the sales, the profits, and the profit rates are arranged in time series for each position of the player on each of the gaming tables 4. In addition, in a case where the game management system 100 includes a section recognizing the player, the sales according to the betting of the player and the profit obtained from the player may be calculated, and the table and the graph may be created, for each player.

The recording apparatus 52 records the sales, the profit, and the profit rate calculated by the calculation unit 511, in the form of the table and the graph created by the table creation unit 512.

Specifically, the calculation unit 511 calculates the total amount (the sales) of the betting amount for each of the plurality of gaming tables 4 and each game, obtains the degree of collection or the redemption with respect to which betting target, on the basis of the betting target, the betting amount, and the game result, and calculates the profit of the casino manager. In addition, the calculation unit 511 obtains a difference in the dealer amount before and after the table game, for each of the plurality of gaming tables 4 and each game, and thus, calculates the profit of the casino manager. The profit of the former is a so-called theoretical value, and the profit of the latter is a so-called result value, and it is necessary that the theoretical value and the result value are coincident with each other. The calculation unit 511 determines whether or not the theoretical value and the result value are coincident with each other, and in a case where the theoretical value and the result value are coincident with each other, the profit is adopted, and in a case where the theoretical value and the result value are not coincident with each other, a warning to that effect may be generated.

The calculation unit 511 further calculates the total amount (the sales) of the betting amount for each of the plurality of tables 4 and each game. In addition, the calculation unit 511 calculates the profit rate (the gross rate) (=Profit/Sales) on the basis of the sales and the profit (the gross) of a predetermined period or a predetermined number of games.

In addition, the calculation unit 511 recognizes the sales (the total betting amount) and the profit amount for each gaming table 4, and different tax rates are applied to the profit amount of the gaming table 4 for each area, and thus, it is possible to calculate the tax to be paid in the casino facilities. The calculation unit 511, for example, is capable of setting different tax rates such that 10% of the profit amount is paid in a VIP area, and 20% of the profit amount is paid in a Mass area. Further, in this case, in the casino facilities, in order to induce the casino guest to the VIP area where the tax rate of the tax to be paid is low, the casino facilities are capable of fulfilling the service of the VIP area, or of applying a special game rule.

In addition, the calculation unit 511 is capable of comparing the sales (the total betting amount), the profit amount, and the profit rate, with the sales in the past (for example, yesterday, last year, or the like).

The table creation unit 512 adds up the sales, the profit, and the profit rate calculated by the calculation unit 511, and creates various tables and graphs. FIG. 21 is an example of a table indicating the sales (the total amount of the betting amount) for each gaming table 4, created by the table creation unit 512. As illustrated in FIG. 21, the table creation unit 512 creates a table indicating the number of bet chips 9 of each type for each gaming table 4. The number of respective chips 9, for example, may be an added-up number for each predetermined time such as a time period from 0 hours to 0 hours on the next day. In a case where the casino facilities are not in 24-hour operations, the number of respective chips 9 may be an added-up number for each business hour for one day. Further, the number of respective chips 9 may be an added-up result within a predetermined time in the past, on the basis of a creation time. The table further includes the total amount of chips (the sales) in each of the gaming tables 4. According to the table, it is possible to compare the sales in the same time zone for each gaming table, and to know the total sales of the all of the casino facilities in the time zone.

FIG. 22 is an example of a table indicating the sales for each game in each of the gaming tables 4, created by the table creation unit 512. FIG. 22 is a table illustrating the sales with respect to Table 1. As illustrated in FIG. 22, the table creation unit 512 creates a table indicating the number of various bet chips 9 for each game. The table creation unit 512 may create one table by separating the table for certain period of time (for example, 24 hours or one business day), or may create a table for each predetermined number of games (for example, 80 games). In addition, the table creation unit 512 may create a table within a predetermined time in the past or for a predetermined number of games, at a table creation time point.

FIG. 23 is an example of a table indicating the total amount of the betting amount (the sales), the profit (the gross), and the profit rate for each gaming table 4, created by the table creation unit 512. As illustrated in FIG. 23, the table creation unit 512 creates a table indicating the total amount of the betting amount (the sales) (the total betting amount), the profit (the gross) (the gross profit), the profit rate (the gross rate) (=Profit/Sales) (a profit ratio) for each gaming table 4. The table creation unit 512 may create one table by separating the table for a certain period of time (for example, 24 hours, one week, one month, or the like), or may create a table for each predetermined number of games (for example, 100 games, 1000 games, or the like). In addition, the table creation unit 512 may create a table within a predetermined time in the past or for a predetermined number of games, at a table creation time point.

Figure 24:
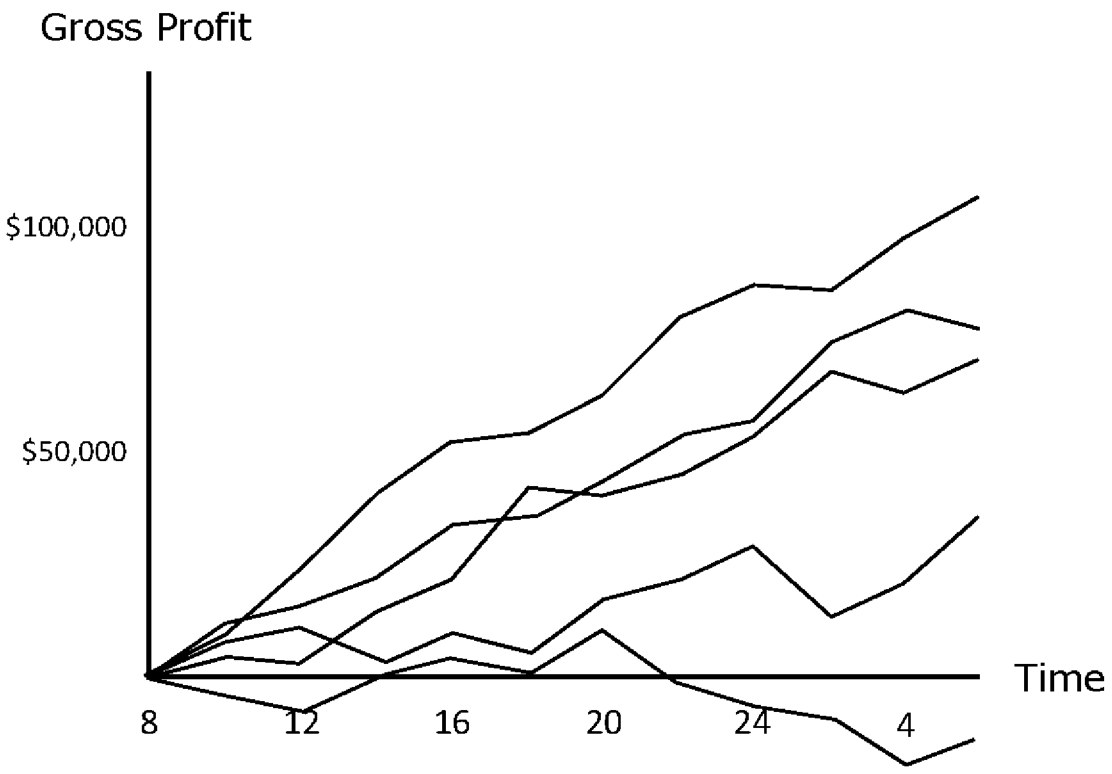
FIG. 24 is an example of a polygonal line graph illustrating a transition of the profit in each of the gaming tables of the third embodiment of the invention.
Figure 25:
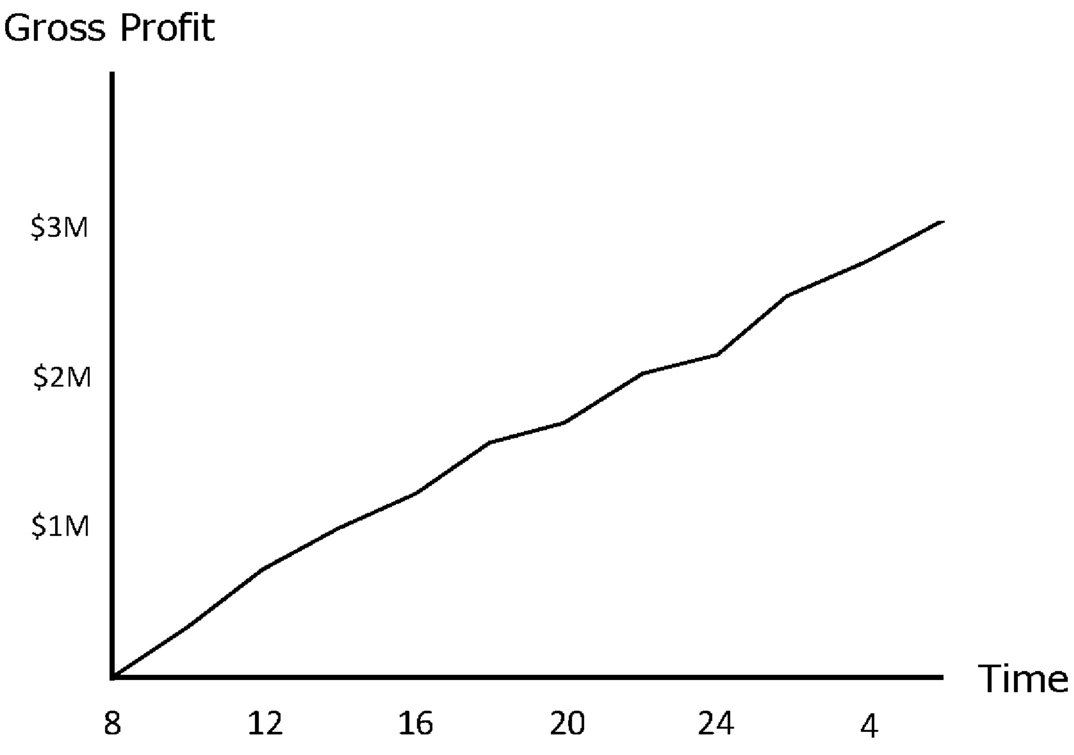
FIG. 25 is an example of a graph indicating a transition of a profit in all of the casino facilities of the third embodiment of the invention.

FIG. 24 is an example of a polygonal line graph illustrating a transition of the profit in each of the gaming tables 4, created by the table creation unit 512, and FIG. 25 is an example of a graph illustrating a transition of the profit of all of the casino facilities. In case where the casino facilities are operated from 8 a.m. to 6 a.m. on the next day, the transition of the profit for one business day is illustrated in the examples of FIG. 24 and FIG. 25. According to the graph as illustrated in FIG. 24 or FIG. 25, the transition of the profit is easily understood, and thus, it is possible to perform business analysis of the casino facilities. In addition, the transition of the profit for each table is indicated as illustrated in FIG. 24, and thus, a table having a peculiar transition of the profit is easily found.

Figure 26:
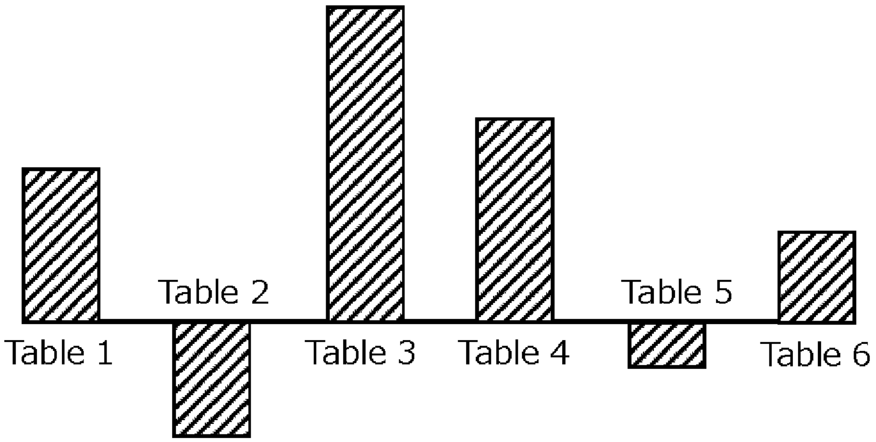
FIG. 26 is an example of a bar graph indicating a profit rate for each gaming table of the third embodiment of the invention.

FIG. 26 is an example of a bar graph illustrating a profit rate for each gaming table 4, created by the table creation unit 512. According to the bar graph, the quantity of the profit obtained in each of the gaming tables 4 becomes obvious.

Furthermore, in the examples described above, the calculation unit 511 and the table creation unit 512 calculate the sales, the profit, and the profit rate for each gaming table 4, and create the table or the graph, but instead thereof or in addition thereto, may calculate the sales, the profit, and the profit rate for each pit in which the plurality of gaming tables 4 are collected, and may create a table or a graph.

The calculation unit 511 may calculate the sales, the profit, and the profit rate whenever the information of the dealer amount, the game result, and the betting contents is acquired for each game, or may calculate the sales, the profit, and the profit rate at a timing when the table creation unit 512 creates a table.

The table creation unit 512 may create a table for each period targeted by the table or the graph. For example, in a case where the table creation unit 512 creates a graph illustrating a transition of the sales for one day (for 24 hours) on each of the gaming tables 4, the table may be automatically created every 24 hours (as soon as the data is collected). Alternatively, the table creation unit 512 may create the table or the graph at a manually indicated timing, regardless of the period targeted by the table or the graph. Alternatively, the table creation unit 512 may automatically create the table or the graph at an interval shorter than the period targeted by the table or the graph. For example, adding-up for 24 hours in the past may be performed every 6 hours, and thus, the table or the graph may be created.

The alarming unit 513 determines that a peculiar situation occurs on the basis of the sales, the profit, and the profit rate calculated by the calculation unit 511, and the adding-up of the table creation unit 512, and generates an alarm. For example, the alarming unit 513 may compare the profit rate calculated by the calculation unit 511 or the profit rate for a predetermined period or for a predetermined number of games, added up by the table creation unit 512, with a predetermined first threshold value, and may generate an alarm when the profit rate is less than or equal to the first threshold value, or may compare the profit rate calculated by the calculation unit 511 or the profit rate for a predetermined period or for a predetermined number of games, added up by the table creation unit 512, with a predetermined second threshold value, and may generate an alarm when the profit rate is greater than or equal to the second threshold value. In addition, the alarming unit 513 may compare the profit and the sales with a predetermined threshold value, and thus, may generate an alarm.

The alarming unit 513 may perform more complicated analysis with respect to the sales or the profit, and may find a peculiar situation. For example, the alarming unit 513 may generate an alarm on the basis of the transition of the profit rate in the table or graph created by the table creation unit 512. In this case, the peculiar situation may be determined by using the machine learning model. The machine learning model may be a model of outputting a probability of being peculiar by using the transition of the profit rate obtained by the adding-up of the table creation unit 512 as input, and in a case where the probability is less than or equal to a predetermined threshold value, the alarming unit 513 may determine that it is the peculiar situation, and may generate an alarm.

The alarm may be realized by a section of attaching a mark to an element which is determined as being peculiar in the table or the graph created by the table creation unit 512, and in addition, in a case where such a peculiar situation occurs, the alarm may be realized by generating and outputting an image, a sound, a driving signal of an alarm device (a lamp, a buzzer, or the like), and the like. In the example of FIG. 23, the alarm is realized by hatching Table 3 in which the profit rate is less than 0%.

Figure 27:
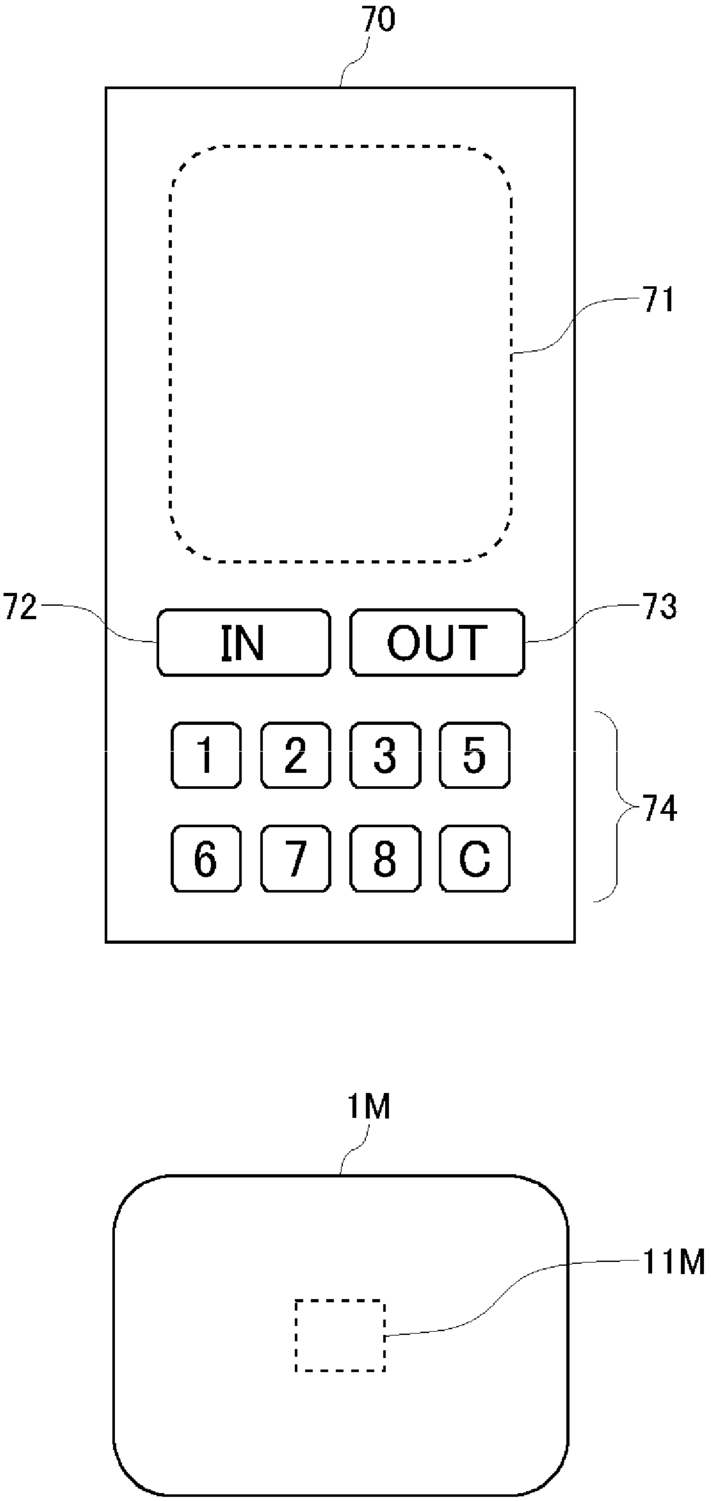
FIG. 27 is a diagram illustrating the reader/writer and a membership card of the third embodiment of the invention.

As illustrated in FIG. 20, a reader/writer 70 for performing reading-out and writing-in with respect to a membership card possessed by the player who is registered as a member, is disposed on the dealer side of each of the gaming tables 4. FIG. 27 is a diagram illustrating the reader/writer and the membership card. A membership card 1M is a plastic card, and an RF tag 11M is built in the card. The RF tag 11M stores a member ID applied to the player (the member) according to the member registration, a point retained by the player (a retained point), and the like. The RF tag 11M includes an antenna, and the information can be written in and read out by the reader/writer 70, in a non-contact manner.

The reader/writer 70 includes a wireless unit 71, a seating button 72, a leaving button 73, and a position designation button 74. The wireless unit 71 writes in and reads out the information with respect to an RF tag 11MM built in the membership card 1M, in an RFID manner. The position designation button 74 includes buttons of "1", "2", "3", "5", "6", "7", and "8" respectively corresponding to seven positions of the gaming table 4, and a button "C" of cancelling the designation.

FIG. 28 is a diagram illustrating the information stored in the membership card 1M. The member ID, the retained point, the recent balance, an acquisition point for the last three days, an acquisition point for the last one month, and an acquisition point for the last one year are recorded in the membership card 1M. A total value of an amount (plus) paid between the previous seating and the previous leaving, and a collected amount (minus) is recorded as the recent balance.

In a case where a player P arrives at a player position in the gaming table 4, a dealer D keeps the membership card 1M from the player P, and allows the reader/writer 70 to read out the membership card 1M. Specifically, the dealer D presses the position designation button 74 of the corresponding player position, presses the seating button 72, holds the membership card 1M in the wireless unit 71, and reads out the information recorded in the membership card 1M. Accordingly, the reader/writer 70 is capable of specifying the player P in each player position with the member ID, and the reader/writer 70 functions as a player specification section.

The reader/writer 70 outputs (transmits) information read out by the wireless unit 71, a seating signal according to the press of the seating button 72, and information of the player position where the player corresponding to the member ID is seated, to the control device 14. The control device 14 records the information received from the reader/writer 70, and records time of receiving the seating signal as a start time. The start time is recorded in the form of date and time. In addition, the control device 14 transmits the information of the start time and the member ID received from the reader/writer 70, to the management device 50.

The control device 14 recognizes in which player position the player P of which member ID plays, on the basis of the member ID received from the reader/writer 70 and the information of the player position. That is, the control device 14 is capable of associating each player position of the gaming table 4 with the player P to be specified in the gaming table 4. The control device 14 may obtain the betting amount, a paying amount, and a collection amount with respect to each of the members ID, and may record the amount, while the player P plays a game a plurality of times.

The dealer D allows the reader/writer 70 to read out the kept membership card 1M from the player P when the player P is separated from the gaming table 4. In this case, the dealer D presses the leaving button 73, holds the membership card 1M in the wireless unit 71, and reads out the member ID from the membership card 1M.

The reader/writer 70 outputs (transmits) the member ID and a leaving signal to the control device 14. In a case where the member ID and the leaving signal are received from the reader/writer 70, the control device 14 records time of receiving the leaving signal as an end time. The end time is recorded in the form of date and time. In addition, the control device 14 obtains a cumulative betting amount and a cumulative balance with respect to the member ID, from the start time to the end time. Further, the control device 14 calculates an acquisition point on the basis of the cumulative betting amount from the start time to the end time.

The control device 14 adds the calculated acquisition point to the retained point read out from the membership card 1M at the time of seating, and updates the retained point. In addition, all of the acquisition point for the last three days, the acquisition point for the last one month, and the acquisition point for the last one year are updated on the basis of the calculated acquisition point. The control device 14 outputs the updated retained point, the updated acquisition point for the last three days, the updated acquisition point for the last one month, and the updated acquisition point for the last one year, and the cumulative balance from the start time to the end time, to the reader/writer 70. The reader/writer 70 replaces the information of the membership card 1M with the information described above. Furthermore, the cumulative balance from the start time to the end time is recorded as the recent balance.

According to the function of the control device 14 and the reader/writer 70, it is possible to apply a point corresponding to the actual betting amount to the membership card 1M, and it is possible for the player P to store the retained point in the membership card 1M.

A display 15 (see FIG. 37) is a liquid crystal display. Further, in the display 15, lamps may be two-dimensionally arranged. The display 15 is installed at a position and an orientation that is visible from a player P who is at a player position and guests around the player P.

The display 15 displays various kinds of information. For example, when a game table 4 is closed, an indication (for example, the character of "CLOSED") indicating that the game table 4 is closed is displayed, and when the game table 4 is opened, game conditions such as a minimum bet amount (for example, the character of "MIN. $100") and a maximum bet amount (for example, the character of "MAX. $100,000") are displayed.

Figure 29:
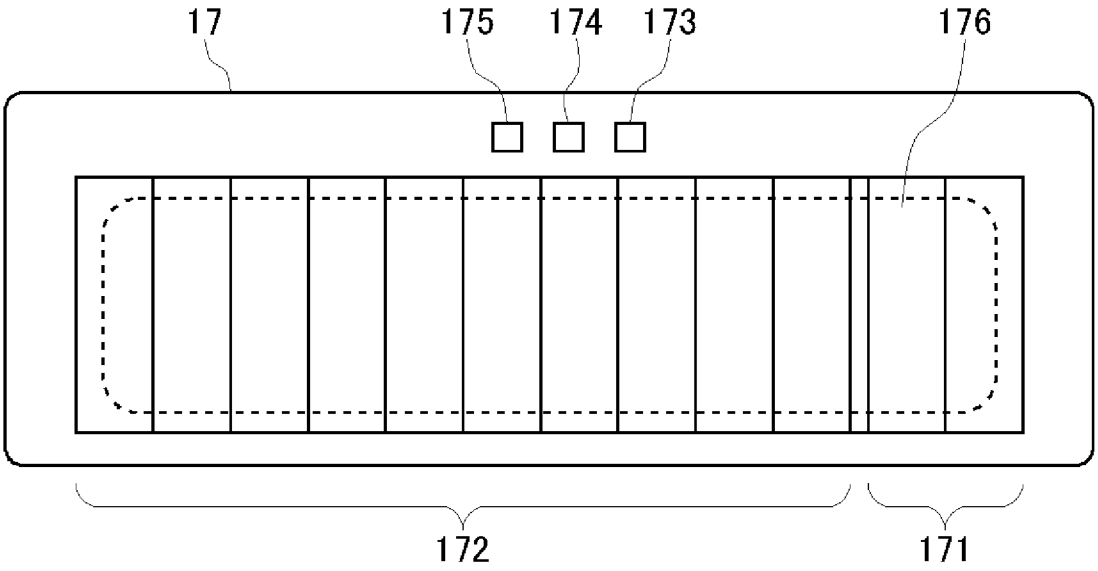
FIG. 29 is a plan view of a dealer chip tray.

FIG. 29 is a plan view of a dealer chip tray. In the chip tray 17, a plurality of vertically oriented grooves is installed by side. Each groove is inclined so that a dealer D side is slightly lower. As a result, chips 9 accommodated in the grooves move to a front side of the dealer D by their own weight and are stacked sequentially from the front side of the dealer D.

Two right grooves include a collection float 171 for temporarily accommodating the chips 9 collected from a losing player P at the time of liquidation and an accommodation float 172 for accommodating the chips 9 for each value. The dealer D temporarily accommodates the chips 9 collected from the game table 4 in the collection float 171, and then withdraws the chips 9 from the accommodation float 172 to a winning player P, and finally accommodates the chips 9 accommodated in the collection float 171 in the accommodation float 172 corresponding to each value.

On the upper side of the chip tray 17, there are three confirmation lamps including a bet confirmation lamp 173, a collection confirmation lamp 174, and a withdrawal confirmation lamp 175. The bet confirmation lamp 173 is turned on according to the result of confirming whether there is no variation (late betting or unbetting) in the chips 9 betted between the game start time and the game end time. The collection confirmation lamp 174 is turned on in accordance with a confirmation result of whether or not a collection amount and the collected chips 9 are authentic. The withdrawal confirmation lamp 175 is turned on in accordance with a confirmation result as to whether a withdrawal amount is correct.

An RFID reader 176 for reading an RFID tag built in the chip 9 is provided inside the chip tray 17. RFID tags of the chips 9 accommodated in all grooves including the collection float 171 and the accommodation float 172 may be read by the RFID reader 176. Since information indicating the value of the chip 9 is recorded in the RFID tag of each chip 9 as described above, the RFID reader 176 reads the RFID tags of all the chips 9 in the chip tray 17, so that a total amount of the chips 9 in the chip tray 17 may be determined.

Moreover, the RFID reader 176 may read and sort the RFID tag of the chip 9 accommodated in the collection float 171 and the RFID tag of the chip 9 accommodated in the accommodation float 172. That is, when reading the RFID tag, the RFID 176 may distinguish whether the RFID tag is the RFID tag of the chip 9 accommodated in the collection float 171 or the RFID tag of the chip 9 accommodated in the accommodation float 172. Moreover, in order to perform such reading and sorting, the RFID reader 176 may separately include an antenna for reading the RFID tag of the chip 9 accommodated in the collection float 171 and an antenna for reading the RFID tag of the chip 9 accommodated in the accommodation float 172 or may include the antenna for each groove.

Figure 30:
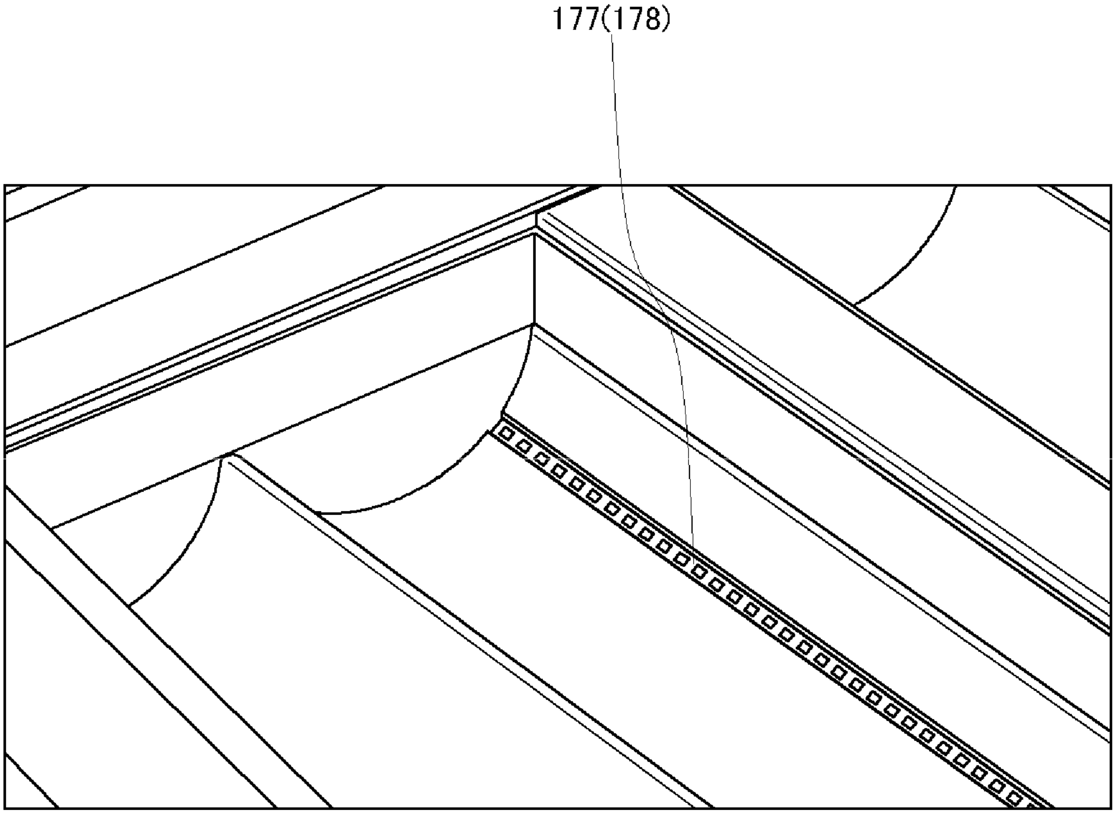
FIG. 30 is an enlarged perspective view of a collection float of the dealer chip tray.

FIG. 30 is an enlarged perspective view of the collection float of the dealer chip tray. A slit 177 is formed in a longitudinal direction of the collection float 171 at a portion formed on a curved surface along the side surface of the chip 9 accommodated in the collection float 171. A linear optical sensor (line sensor) 178 is provided in the slit 177. By the optical sensor 178, it may be determined which height of the collection float 171 the chip 9 is accommodated or how many chips 9 are accommodated. Moreover, the same slits and optical sensors may also be provided in the accommodation float 172. Further, a series of slits are formed in the groove, the slit is imaged by a camera (for example, an infrared camera) from the back side, and recognition processing is performed on the obtained image, thereby determining the number of chips 9 accommodated in the groove.

Figure 31:
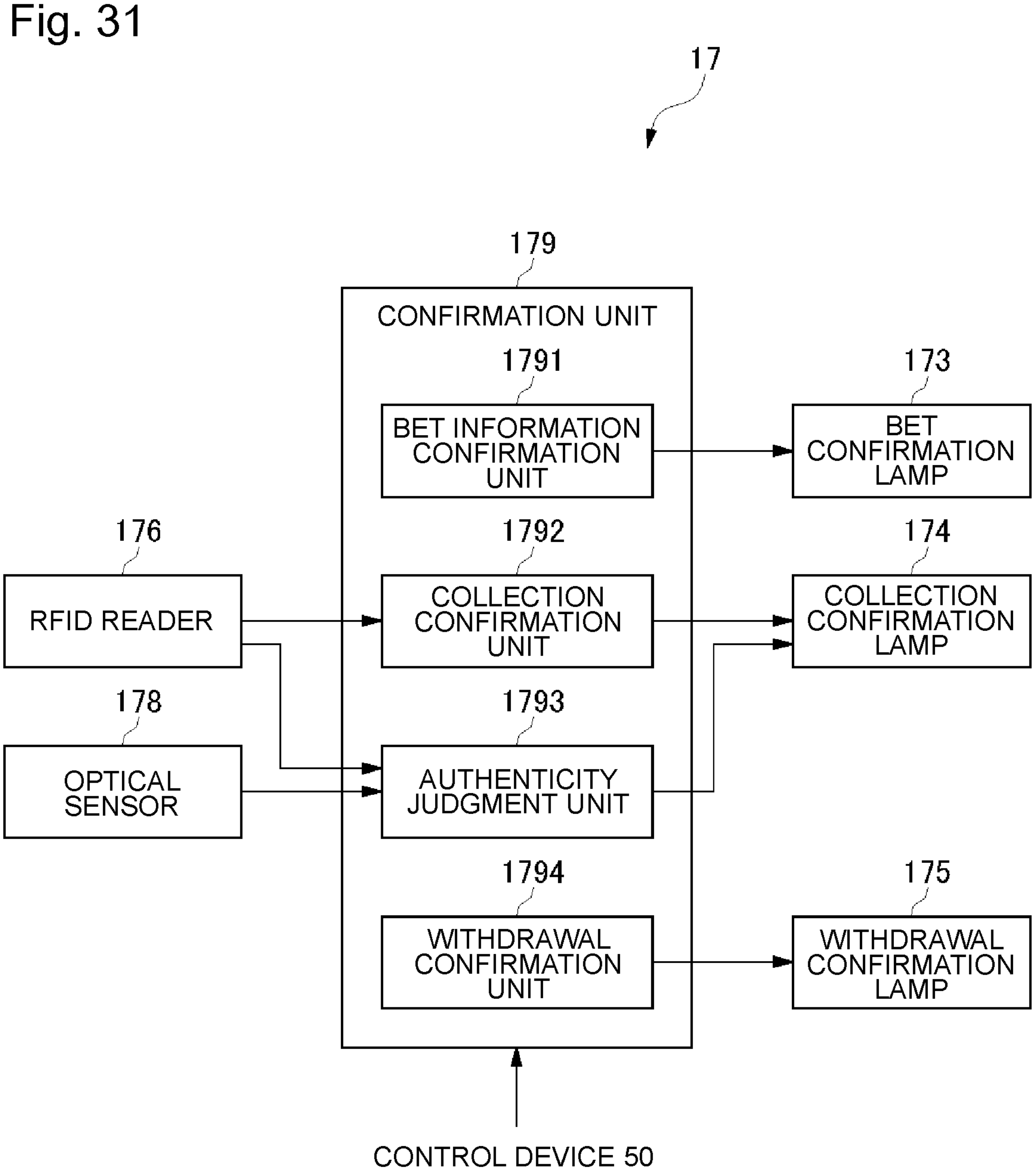
FIG. 31 is a block diagram showing a configuration of the dealer chip tray.

FIG. 31 is a block diagram showing a configuration of the dealer chip tray. The chip tray 17 is provided with a confirmation unit 179 in addition to the above-described configuration. The confirmation unit 179 which is configured by a computer to execute a predetermined program is constituted by a bet information determination and confirmation unit 1791, a collection confirmation unit 1792, an authenticity judgment unit 1793, and a withdrawal confirmation unit 1794. Various data and commands are input from a control device 14 into the confirmation unit 179.

Further, the confirmation unit 179 is connected to the bet confirmation lamp 173, the collection confirmation lamp 174, and the withdrawal confirmation lamp 175 to control the lamps. Specifically, the confirmation unit 179 controls lighting on, blinking, and lighting off of the bet confirmation lamp 173, the collection confirmation lamp 174, and the withdrawal confirmation lamp 175 and controls emission colors thereof. An operation of the confirmation unit 179 will be described later.

As described above, information for detecting fraud or mistake (hereinafter, simply referred to as "fraud") is input into the control device 14 from each of a camera 2, a card distribution device 3, and a chip tray 17. Hereinafter, a method for detecting the fraud for each game will be described.

Figure 32:
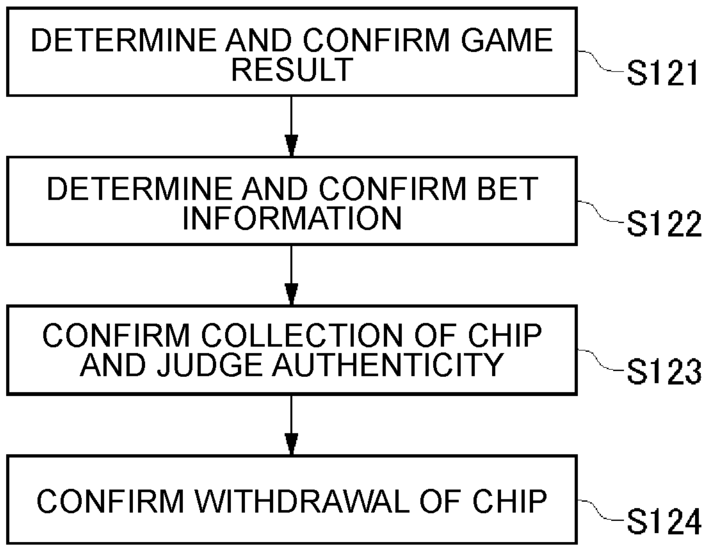
FIG. 32 is a flowchart of management of a table game.

FIG. 32 is a flowchart of management of a table game according to an embodiment of the present invention. Fraud detection in the present embodiment may be divided into four steps of determination and confirmation of a game result (step S121), determination and confirmation of bet information of the chip 9 (step S122), confirmation of collection of the chip 9 and judgment of authenticity (step S123), and confirmation of withdrawal of the chip 9 (step S124).

Among the steps, the determination and confirmation of the bet information of the chip 9 (step S122), the confirmation of collection of the chip 9 and the judgment of authenticity (step S123), and the confirmation of withdrawal of the chip 9 (step S124) are executed by the bet information determination and confirmation unit 1791, the collection confirmation unit 1792, the authenticity judgment unit 1793, and the withdrawal confirmation unit 1794 of the confirmation unit 179 of the chip tray 17, respectively.

A monitor is connected to the control device 14, and a screen for confirmation is displayed on the monitor with respect to the determination and confirmation of the bet information of the chip 9 (step S122), the confirmation of the collection and the judgment of authenticity (step S123), and the confirmation of the withdrawal of the chip 9 (step S124). The monitor is connected to the control device 14, installed in a backyard, and visually checked by an observer. Moreover, the monitor may be installed in the game table 4 instead of the backyard or in addition to the backyard.

Figure 33:
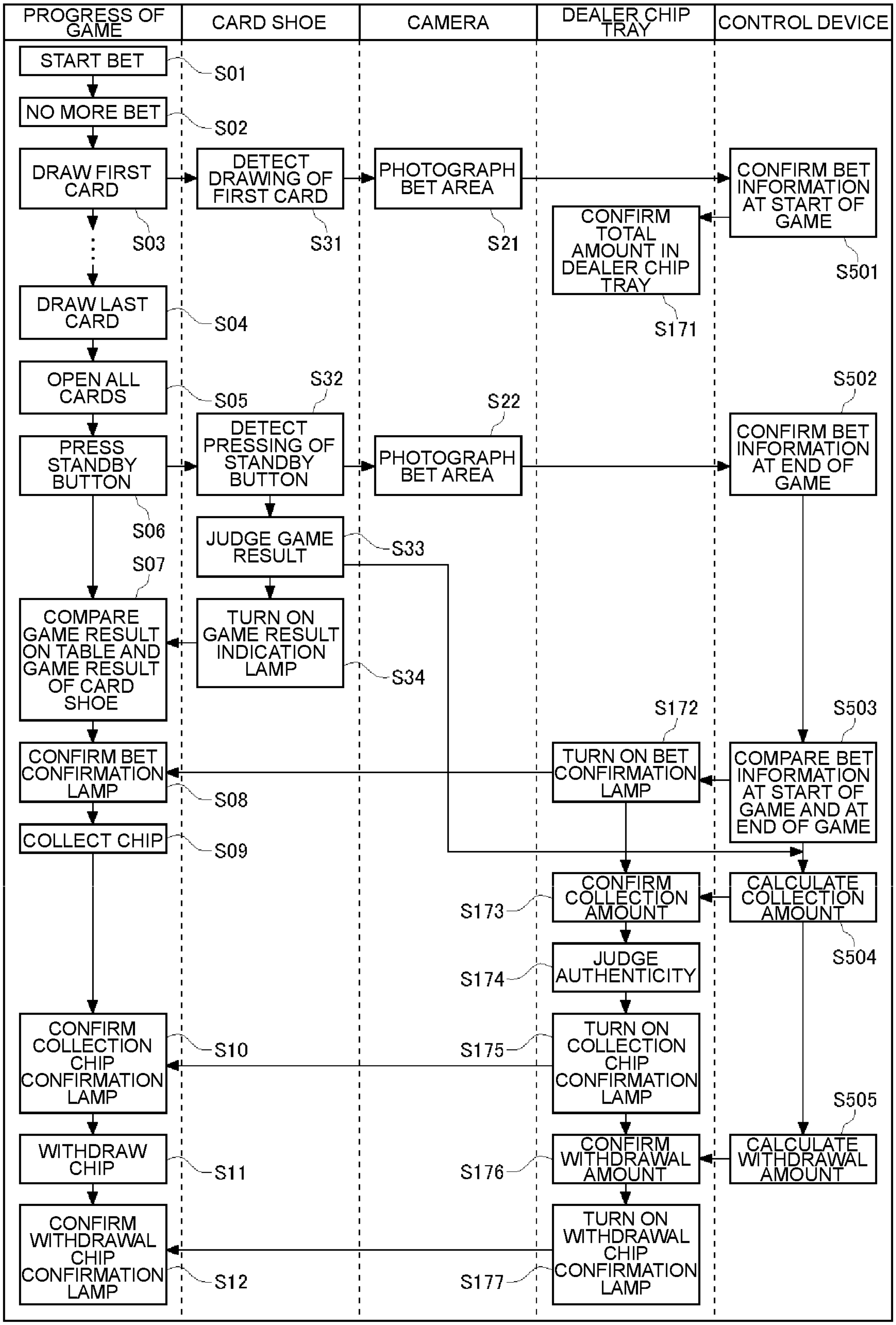
FIG. 33 is a flowchart showing a role of each constituent element in four-step of fraud detection.

FIG. 33 is a flowchart showing a role of each constituent element in four-step fraud detection. The leftmost column is a flow of a progress of the game and the operation of a dealer in the game table 4. In regard to the flow of FIG. 33, coordination between the card distribution device 3, the camera 2, the chip tray 17, and the control device 14 is performed under the control of the control device 14.

First, a bet by the player P is started by an instruction of the dealer D (step S01). The player P makes a bet by placing the chip 9 in each of the bet areas. When all of the players P finish betting, the dealer D signs "no more bet" (step S02) and thereafter, the player P is not allowed to change a bet target and a bet amount.

When the bet ends, the dealer D draws a first card from the card distribution device 3 (step S03). When the card distribution device 3 detects that the first card is drawn (step S31) when the card draw is detected for the first time after a standby button 133 of the previous game is pressed, and the time when a punching unit 40 performs punching, is recorded in a recording unit 41, and reported to the control device 14.

The control device 14 controls the camera 2 to photograph the bet area (step S21). The camera 2 transmits the photographed image to the control device 14 and the control device 14 performs image recognition on the image and recognizes bet information at the start of the game (step S501). Further, the control device 14 controls the chip tray 17 to read all the chips 9 in the chip tray 17 by the RFID reader 176 and confirms the total amount of all the chips 9 in the chip tray 17 (step S171).

Moreover, the camera 2 may continuously photograph the bet area at predetermined time intervals and transmit the image to the control device 14. In this case, the control device 14 receives a report of detection of drawing of the first card from the card distribution device 3 and thereafter, performs the image recognition on the image acquired from the camera 2 for the first time to recognize the bet information at the start of the game. Here, the bet information is information indicating which player performs betting, to which bet target (PLAYER, BANKER, TIE, PLAYER PAIR, and BANKER PAIR) betting is performed, which value of chip 9 is bet, and how many chips are bet. The control device 14 stores the bet information at the start of the game.

The dealer D draws out the cards in order and draws the last card (step S04), and when all of the cards through a squeeze by the player P is opened (step S05), the game result is determined on the game table 4. Moreover, as described above, when the dealer D draws out the cards in order, the card distribution device 3 reads a rank and a suit of the card to be drawn.

When all of the cards are opened, the dealer D presses the standby button 133 of the card distribution device 3 (step S06). When the card distribution device 3 detects the pressing of the standby button 133 (step S32), the game result is judged based on the ranks and the suits of the cards read up to that time and a rule of a baccarat (step S33), and a display lamp 13 is turned on according to the game result (step S34).

The dealer D compares the game result judged from the opened card on the game table 4 with the game result indicated by the display lamp 13 of the card distribution device 3 and confirms that both game results match each other (step S07). The confirmation corresponds to determination and confirmation (step S121) of the game result of the flow of FIG. 32.

Meanwhile, when the card distribution device 3 detects pressing of the standby button 133 (step S32), the card distribution device 3 reports the detected pressing to the control device 14. The control device 14 controls the camera 2 to photograph a bet area 44 (step S22). The camera 2 transmits the photographed image to the control device 14 and the control device 14 performs image recognition on the image and recognizes the bet information at the end of the game (step S502).

Since the player P is not permitted to change bet contents (bet target and bet amount) from the start of the game (end of the bet) to the end of the game, when there is no fraud, the bet information (step S501) at the start of the game and the bet information (step S502) at the end of the game recognized by the control device 5 may match each other. Herein, the control device 14 compares both bet information (step S503).

The control device 14 reports a match or a mismatch to the chip tray 17 as a comparison result. A case where the comparison result is the mismatch includes a case where the total number or the total amount of chips 9 at the end of the game is larger than that at the start of the game (late betting tried by the winning player P) and a case where the total number or the total amount of chips 9 at the end of the game is smaller than that at the start of the game (unbetting tried by the losing player P).

The bet information determination and confirmation unit 1791 of the chip tray 17 turns on the bet confirmation lamp 173 according to the comparison result from the control device 14 (step S172). Herein, the bet information determination and confirmation unit 1791 turns on the bet confirmation lamp 173 in green when the comparison result is the match and turns on the bet confirmation lamp 173 in yellow when the comparison result is not mismatch.

The dealer D confirms that the bet confirmation lamp 173 is turned on in green (step S08) and collects the chips 9 from the losing player P and stores the collected chips 9 in the collection float 171 (step S09). The control device 14 calculates the amount (collection amount) of the chip 9 to be collected based on the recognized bet information and the game result judged by the card distribution device 3 (step S504). The collection amount is calculated from the values and the number of the chips 9 to be collected. The control device 14 notifies the calculated collection amount to the chip tray 17.

When the chip 9 collected by the dealer D is put in the collection float 171 of the chip tray 17, the collection confirmation unit 1792 of the chip tray 17 acquires the read information from the RFID reader 176, determines the collection amount of the chips 9 accommodated in the collection float 171, and compares the determined collection amount with the calculated collection amount notified from the control device 14 to confirm whether the collection amount (the number of chips for each value) is correct (step S173). Moreover, since the RFID reader 176 may obtain information on the number of chips for each value as the read information as a result of reading the chip 9, the control device 14 also calculates the collection amount as the number of chips for each value. Therefore, even in the comparison, it is judged whether the number of chips for each value matches.

Further, in this case, the authenticity judgment unit 1793 performs the authenticity judgment of the collected chips 9 by judging whether the number of chips 9 recognized by the RFID reader 176 and the number of chips 9 detected by the optical sensor 178 match each other (step S174). In the case where an illegal chip 9 not containing the RFID tag is collected from the player P, the illegal chip 9 is detected by the optical sensor 178, but the illegal chip 9 is not detected by the RFID reader 176, and as a result, there is the mismatch between the both sides, thereby detecting the existence of the illegal chip 9.

The collection confirmation unit 1792 and the authenticity judgment unit 1793 turn on the collection confirmation lamp 174 according to the results of the confirmation of the collection amount and the authenticity judgment (step S175). Specifically, the chip tray 17 turns on the collection confirmation lamp 174 in green when the collection amount detected by the RFID reader 176 matches the calculated collection amount acquired from the control device 14 and the collected chip 9 is authentic and makes the collection confirmation lamp 174 blink in yellow when both the collection amounts do not match each other or the illegal chip 9 exists.

The dealer D confirms that the collection confirmation lamp 174 is turned on in green (step S10) and withdraws the chip 9 to the winning player (step S12). The control device 14 calculates the withdrawal amount of the chip 9 based on the recognized bet information and the game result judged by the card distribution device 3 (step S505). The control device 14 notifies the chip tray 17 of the calculated withdrawal amount. Herein, the withdrawal amount is also calculated as information on the number of chips for each value.

When the dealer D withdraws the chip 9 from the chip tray 17 onto the game table 4, the chip tray 17 calculates the withdrawal amount of the chip 9 accommodated in the chip tray 17 by using the RFID reader 176 and compares the calculated withdrawal amount with the calculated withdrawal amount notified from the control device 14 to confirm whether the withdrawal amount is correct (step S176). The withdrawal amount may be obtained as the information on the number of chips for each value by the RFID reader 176.

Herein, the confirmation of the withdrawal amount in the chip tray 17 will be described. The chip tray 17 confirms the total amount of the chip tray 17 when the game starts (step S171). In addition, notification of the calculated collection amount and withdrawal amount is received from the control device 14 (steps S504 and S505). An increase/decrease amount is calculated from the collection amount and the withdrawal amount. By adding the calculated increase/decrease amount to the total amount of the chips 9 in the chip tray 17 at the start of the game confirmed in step S171, the total amount of the chips 9 to be in the chip tray 17 after the liquidation is calculated. Herein, the total amount of the chips 9 is also calculated as the number of chips for each value.

When the calculated total amount matches the total amount of the chips 9 read by the RFID reader 176 after withdrawal, it is regarded that the collection and the withdrawal are performed accurately. Since it is confirmed that collection is performed correctly in step S173, this means that the withdrawal is correctly performed. Accordingly, the withdrawal confirmation unit 1794 of the chip tray 17 judges whether the withdrawal amount is correct by comparing the total amount (the number of chips for each value) (acquired from the control device 14) of the chips 9 to be in the chip tray 17 after the liquidation which may be obtained by the calculation and the total amount (the number of chips for each value) of the chips 9 read by the RFID reader 176 (step S176).

Moreover, in place of the above, the confirmation of the withdrawal may be made by the following method. That is, after confirming that the collection is correctly performed, the RFID reader 176 of the chip tray 17 reads the RFID tags of all of the chips 9 in the chip tray 17 and determines an actual total amount (the number of chips for each value) before withdrawal after collection in the chip tray 17, and the RFID reader 176 reads the RFID tags of all of the chips 9 in the chip tray 17 again after the withdrawal and determines the actual total amount in the chip tray 17 (the number of chips for each value) after the withdrawal and as a result, calculates an amount actually withdrawn from the chip tray 17 and compares the actual withdrawal amount and the withdrawal amount calculated by the control device 14, thereby confirming whether the withdrawal is correctly performed.

The chip tray 17 turns on the withdrawal confirmation lamp 175 according to the confirmation result of the withdrawal amount (step S177). Specifically, the chip tray 17 turns on the withdrawal confirmation lamp 175 in green when the actual withdrawal amount matches the calculated withdrawal amount and makes the withdrawal confirmation lamp 175 blink in yellow when the actual withdrawal amount does not match the calculated withdrawal amount. The dealer confirms that the withdrawal confirmation lamp 175 is turned on in green (step S12) and ends the game.

Moreover, in the embodiment, an example in which the confirmation unit 179 is provided in the chip tray 17 is described, but some or all functions of the confirmation unit 179 may be provided in the control device 14. In this case, after the control device 14 performs processing by the confirmation unit 179, the control device 14 instructs the bet confirmation lamp 173, the collection confirmation lamp 174, and the withdrawal confirmation lamp 175 of the chip tray 17 to be turned on, blink, and be turned off.

Figure 34:
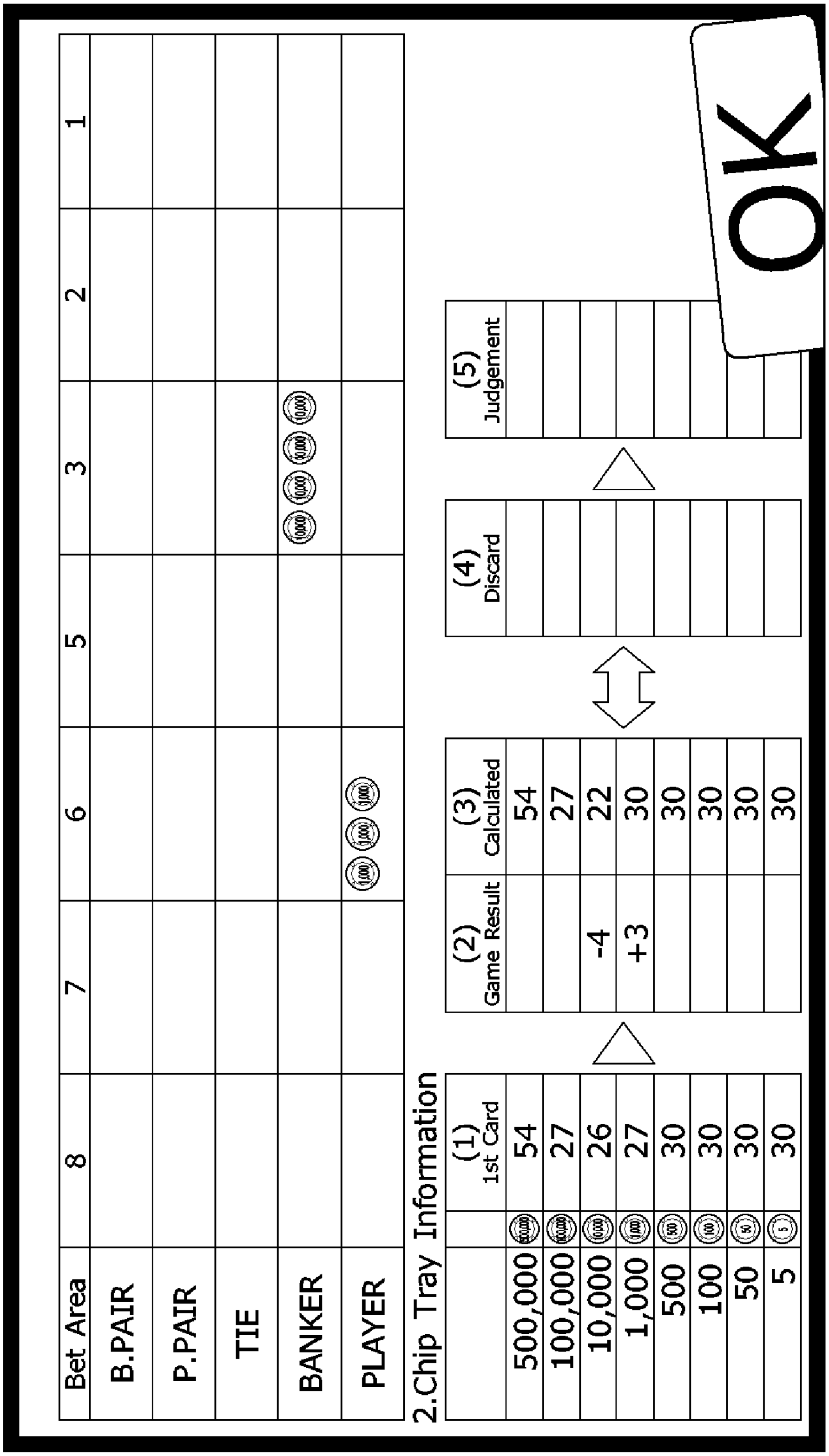
FIG. 34 shows an example of a monitor screen showing a result of comparison between bet information at the start of a game and bet information at the end of the game.

FIG. 34 shows an example of a monitor screen showing a result of comparison between bet information at the start of the game and bet information at the end of the game. Bet information is shown in a table form on an upper end of the screen and information in the dealer chip tray 17 is shown in a lower end of the screen. The bet information indicates to which bet target betting is performed, which value of the chip is bet, and how many chips 9 are bet for each player position. In the example of FIG. 34, four 10,000-dollar chips are bet on BANKER at No. 3 player position and three 1,000-dollar chips are bet on PLAYER at No. 6 player position. Such a situation is determined as image recognition on the image of the camera 2 with respect to the measurement device 21 as described above.

"(1) 1st Card" at the lower end indicates the number of chips 9 accommodated in the chip tray 17 for each value of the chip 9 at the start of the game (when the first card is drawn). "(2) Game Result" indicates a balance according to the result of the game by the number of chips 9 for each value. In this example, it is shown that four 10,000-dollar chips decrease and three 1,000-dollar chips increase in the chip tray 17 by liquidating the game.

"(3) Calculated" indicates the result of calculating the balance of (2) for (1), that is, the number of chips 9 for each value to be in the chip tray 17 after liquidation. "(4) Discard" indicates the actual number of chips 9 in the chip tray 17 read by the RFID reader 176 by triggering discarding of cards in a discard box. "(5) Judgment" outputs the comparison result between (3) and (4). That is, (5) Judgment indicates the comparison result between the number of chips 9 calculated in (3) and the actual number of chips 9 read by the RFID reader 176 in (4).

Figure 35:
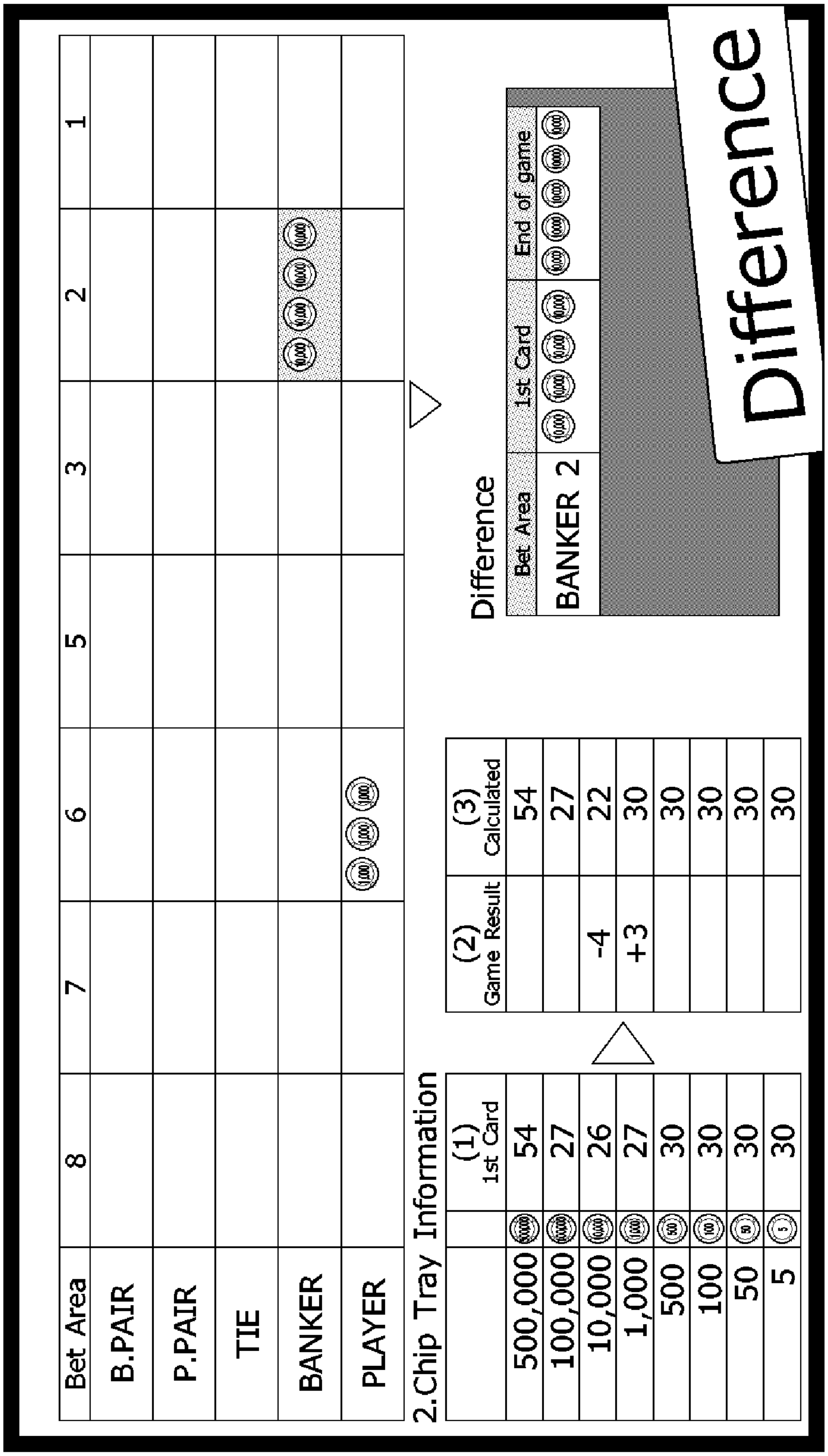
FIG. 35 shows an example of a monitor screen when late betting is performed.

FIG. 35 shows an example of a monitor screen when late betting is performed. In the example of FIG. 35, there are four 1,000-dollar chips bet on BANKER at No. 2 player position at the start of the game, but the four 1,000-dollar chips increase to five 1,000-dollar chips at the end of the game. On the monitor screen, the existence of such a difference is displayed as "Difference" at a lower right end of the screen. Further, in the table of the bet information at the upper end, a cell in which the late betting is detected (in the example of FIG. 35, the BANKER of No. 2 player position) is highlighted.

Figure 36:
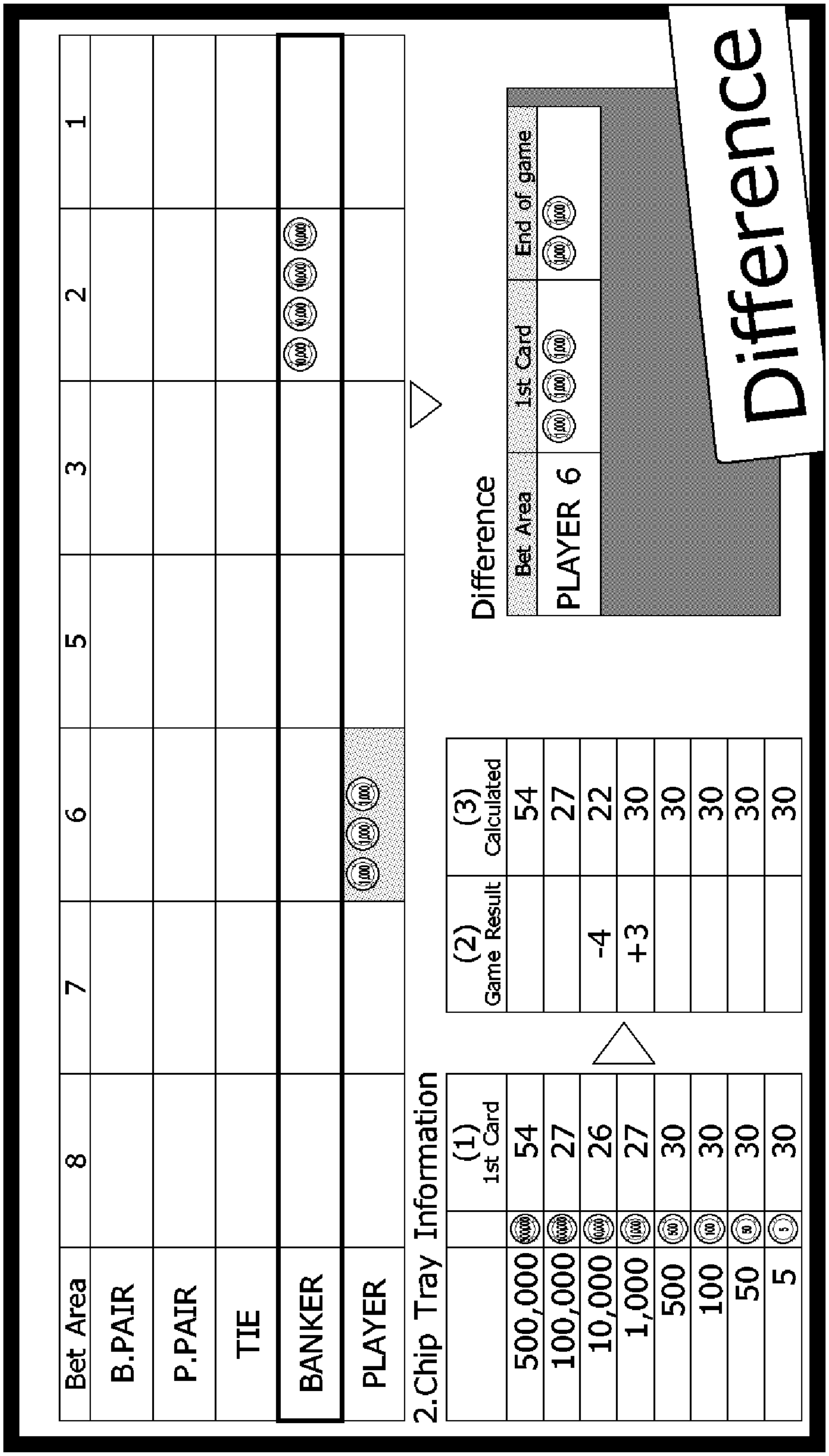
FIG. 36 shows an example of a monitor screen when unbetting is performed.

FIG. 36 shows an example of a monitor screen when unbetting is performed. In the example of FIG. 36, there are three 1,000-dollar chips bet on PLAYER at No. 6 player position at the start of the game, but the three 1,000-dollar chips decrease to two 1,000-dollar chips at the end of the game. On the monitor screen, the existence of such a difference is displayed as "Difference" at the lower right end of the screen. Further, in the table of the bet information at the upper end, a cell in which the unbetting is detected (in the example of FIG. 36, the PLAYER of No. 6 player position) is highlighted.

Moreover, even though the monitor screens as shown in FIGS. 34, 35, and 36 may not be generated, the unbetting may be generated, but may be only saved but not displayed. Further, the monitor screen as described above may be displayed in response to a specific instruction by the observer or the monitor screen is generated when abnormality such as the above-mentioned late-betting or unbetting is detected, and as a result, the abnormality may be displayed or saved.

As described above, in a game table system of the embodiment, the fraud in each stage of the game is detected by using various sensing techniques and image recognition techniques. A management system including the game table system and a plurality of game table systems of the embodiment uses the results of the sensing and image recognition not only as fraud discovery for each game but also as management information of a casino. Moreover, the casino business information also includes advanced fraud detection that may not be discovered only by fraud detection for each game. To this end, the control device 14 of each game table system is connected to a management device 60 to transmit various information to the management device 60.

Figure 37:
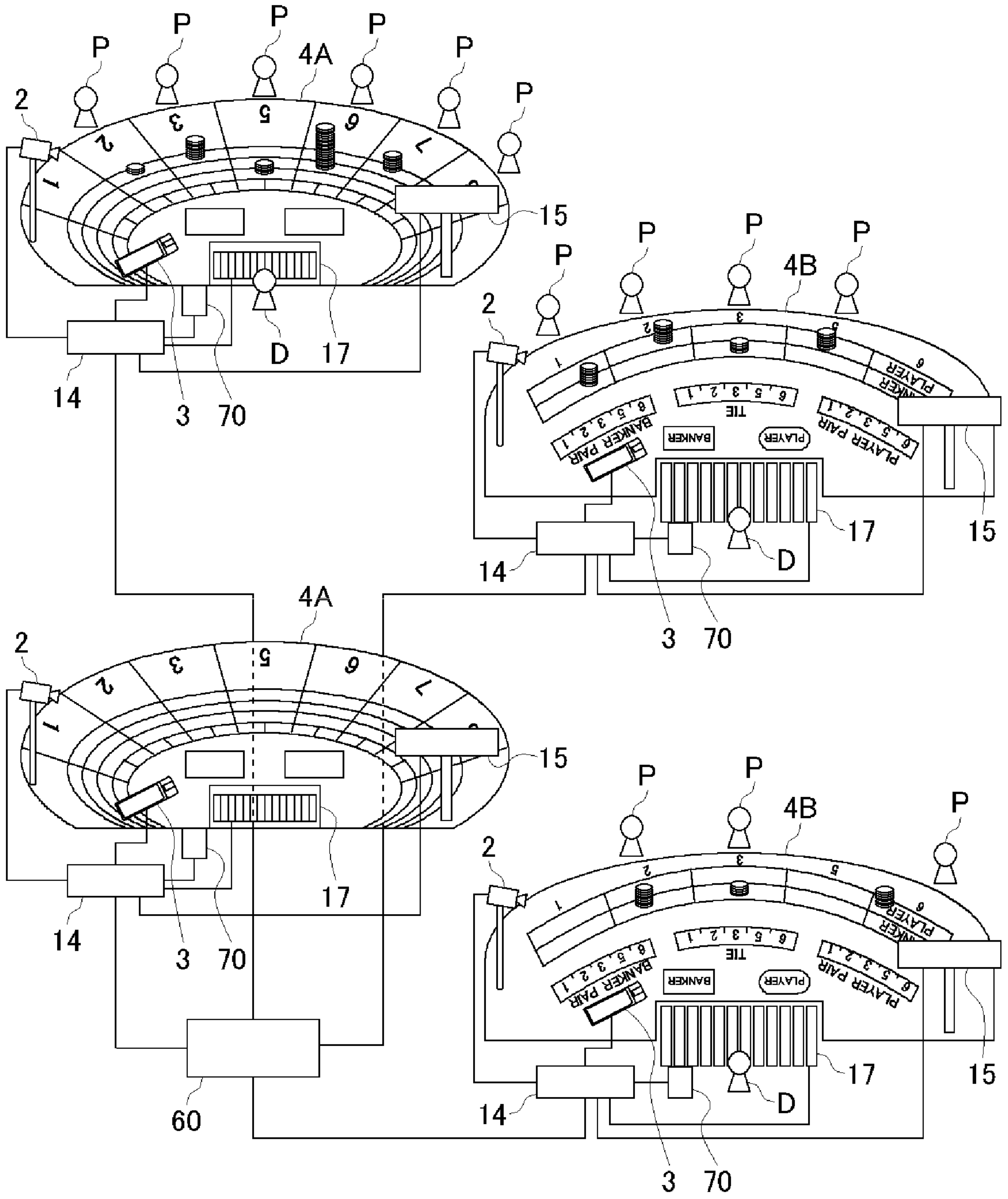
FIG. 37 is a diagram showing an example of a configuration of a casino game arcade.

FIG. 37 is a diagram showing an example of a configuration of a casino game arcade. In the casino game arcade, a plurality of game tables 4 is provided. In the example of FIG. 37, four game tables 4 are shown. Further, the game table 4 of FIG. 37 is a table for baccarat. Hereinafter, a case where the baccarat is played on the game table will be described.

There are two kinds of table surface layouts (hereinafter, simply referred to as "layout") in four game tables. In a game table 4A of a first type layout (Type-a), positions (player positions 1, 2, 3, 5, 6, 7, and 8) for seven players are prepared and in a game table 4B of a second type layout (Type-b), positions (player positions 1, 2, 3, 5, and 6) for five players are prepared.

In the game table 4A of the first type, bet areas of PLAYER, BANKER, TIE, PLAYER PAIR, and BANKER PAIR as the bet targets are provided at positions corresponding to the respective player positions. Meanwhile, in the game table 4B of the second type, only the bet areas of PLAYER and BANKER as the bet targets are provided at the positions corresponding to the respective player positions and the bet areas of TIE, PLAYER PAIR, and BANKER PAIR are respectively decided and arranged.

FIG. 38 is a diagram showing a configuration of a game record generated for each game. The game record is generated by the control device 14 and transmitted to the management device 60 at appropriate timing. The game record includes respective information of "date and time", "table ID", "layout", "minimum bet amount", "dealer ID", "bet time", "gaming time", "chip collection time", "chip withdrawal time", "game result", "dealer chip amount at the time of start", "dealer chip amount after liquidation", and "verification result".

The "date and time" is the start date and time of the game. Moreover, as the "date and time", in addition to or in place of the game start date and time, the end date and time of the game may be recorded. The "table ID" is an ID uniquely given to each table. The table may be identified by the table ID. The "layout" represents a layout type of a table surface. In the example of FIG. 37, there are two types of layouts (Type-a and Type-b), but the "layout" indicates which type the layout is.

The "minimum bet amount" is a minimum bet amount set in the game. Players who participate in the game need to bet chips whose amount is equal to or more than the minimum bet amount in each game. Moreover, the minimum bet amount may be appropriately changed at the timing between the game and the game. Further, in addition to the minimum bet amount, a maximum bet amount which is a maximum bet amount may be set and recorded in one game of the game table 4.

The "dealer ID" is an ID for identifying the dealer D in charge of dealing in the game table 4. Each dealer D is provided with a dealer card incorporating an IC tag storing a dealer ID so that when the dealer D arrives at the game table 4, a reader/writer 5 reads the IC tag of the dealer card and outputs a dealer ID read by the reader/writer 5 to the control device 14. Alternatively, the control device 14 may have an input device and the dealer D arriving at the game table 4 may input the dealer ID thereof from the input device.

The "bet time" is a time from the start of betting up to the end of the betting. When the control device 14 determines that withdrawal of the previous game is normally completed in the chip tray 17, the control device 14 recognizes that the betting starts. Further, the control device 14 recognizes that the betting ends when the card distribution device 3 detects the drawing of the first card. When the first card is drawn, the card distribution device 3 punches the time and reports the time to the control device 14, so that the control device 14 determines the bet end time based on the report.

Moreover, the discard box for discarding the used card may be provided in the game table 4 and a sensor may be provided in the discard box and in this case, when the control device 14 detects the discard of the card by the sensor, the control device 14 may recognize that the betting of the next game starts. Further, an operation member may be provided to instruct the card distribution device 3 or the like to start a predetermined bet and the dealer may operate the operation member immediately before the start of betting and in that case, the control device 14 may recognize that the betting starts when detecting the operation of the operation member. In addition, the control device 14 may recognize the start of the betting by detecting the bet chip 9 by recognizing the image of the camera 2.

The "gaming time" is the time until the dealer D draws the first card from the card distribution device 3 and then the standby button 133 is pressed. That is, the game time includes the time until the last card is withdrawn from the card distribution device 3, all cards are opened through squeezing by the player P, the game result is made clear on the game table 4, and then the dealer D presses the standby button 133 according to the game result.

The "chip collection time" is a time until the game ends and then the collection of the chip 9 from the losing player P is completed. As described above, a time at which the dealer D presses the standby button 133 immediately after the result of the game is confirmed is set as the end time of the game. Further, the control device 14 sets a time at which collection confirmation is reported from the chip tray 17 as the collection end time.

The "chip withdrawal time" is a time from completion of the collection of the chip 9 from the losing player P until the withdrawal of the chip 9 to the winning player P is completed. The control device 14 sets a time at which withdrawal confirmation is reported from the chip tray 17 as the withdrawal end time. Alternatively, the control device 14 may determine the chip collection time and the chip withdrawal time by analyzing the image of the camera 2. Alternatively, the time when the discard of the card in the discard box is detected may be the end of "chip withdrawal time".

The "game result" is PLAYER, BANKER, or TIE and the presence or absence of PLAYER PAIR and BANKER PAIR. As described above, by determining the game result by reading the rank and the suit of the card withdrawn from the card distribution device 3, the control device 14 receives the information on the game result from the card distribution device 3.

The "dealer chip amount at the start" is the total amount of chips 9 accommodated in the dealer tray 17 at the start of the game, and is acquired at the chip tray 17 in step S171 of FIG. 33 and reported to the control device 14. The "dealer chip amount after liquidation" is the total amount of chips 9 accommodated in the dealer tray 17 after the liquidation of the game ends and is determined in step S176 of FIG. 33 and reported to the control device 14.

The "verification result" is a result of verifying whether a theoretical dealer chip amount after liquidation and an actual dealer chip amount after liquidation match each other and is indicated by either OK or NG. A table management control device 50 calculates a theoretical balance based on the actual total amount after liquidation ("post-liquidation dealer chip amount" described above) of the chips 9 of the chip tray 17 read by the chip tray 17 and the game result determined by the reading of the card by the card distribution device 3 and adds the balance to the actual total amount ("start dealer chip amount" described above) of the chips 9 in the chip tray 17 at the start, which is read by the chip tray 17 and calculates the theoretical total amount (theoretical post-liquidation dealer chip amount) of the chip tray 17 after liquidation to compare the actual total amount and the theoretical total amount (corresponding to step S176 in FIG. 33).

The control device 14 compares the theoretical post-liquidation dealer chip amount with the actual post-liquidation dealer chip amount for each game, and sets the verification result to "OK" in the case of the match and to "NG" in the case of the mismatch.

Moreover, the game record includes, for each "player position", "member ID", "bet amount", "bet target", "withdrawal (−)/collection (+)", "sales", and "net profit". As "player position", as shown in FIG. 3, numbers are assigned according to the player positions of the table. The player P is registered as a member in advance. The member ID is given to the player P who is registered as the member and membership card 1 storing the member ID is given. In membership card 1, in addition to the member ID, points acquired by the member are also recorded.

"Bet amount" is a bet amount for each player position and is indicated by the number of chips for each value of the chip 9 at each player position. In addition thereto or in place thereof, information on the bet amount may be displayed for each stack of the chips 9 when image recognition is performed by the camera 2 and the measurement device 21 as the information of "bet amount". In this case, "bet amount" includes information on the number of stacks and the value and the number of chips 9 for each stack for each player position.

The "withdrawal (−)/collection (+)" is the amount of withdrawal or collection for each player position. The control device 14 records an amount paid out from the dealer D separately from the bet amount by writing a minus sign for the winning player P and records a plus sign to the bet amount for the losing player P, as the "withdrawal (−)/collection (+)".

The "sales" is a total bet amount acquired by adding the bet amounts of all players P in the game. The control device 14 calculates and records "sales" by adding the bet amounts of all of the players P. The "net profit" is an amount acquired by adding the withdrawal amounts (−) and the collection amounts (+) of all of the players in the game and is a profit of a game organizer (house) in the game. The control device 14 calculates and records the "net profit" by adding the withdrawal amounts and the collection amounts of all of the players P. Moreover, the sales (total bet amount) are recorded as the number of chips 9 for each value.

As described above, the control device 14 outputs a net profit Y which is a winning or losing amount of the game organizer and a total bet amount (sales) B which is a total amount of chips 9 placed by the player P for each game table 4. In particular, the camera 2 and the measurement device 21 detect the total bet amount B for each player position on the game table 4 and the control device 14 outputs information of the total bet amount B for each player P as the game record and for each player position.

The control device 14 generates the game record for each game. The control device 14 of each game table 4 is connected to the management device 60 and the game record generated by the control device 14 is transmitted from the control device 14 to the management device 60. Moreover, the management device 60 is connected to the control device 14 to be communicable by a wired or wireless way. The management device 60 counts the game records obtained from the plurality of control devices 14 and performs the following processing.

Figure 39:
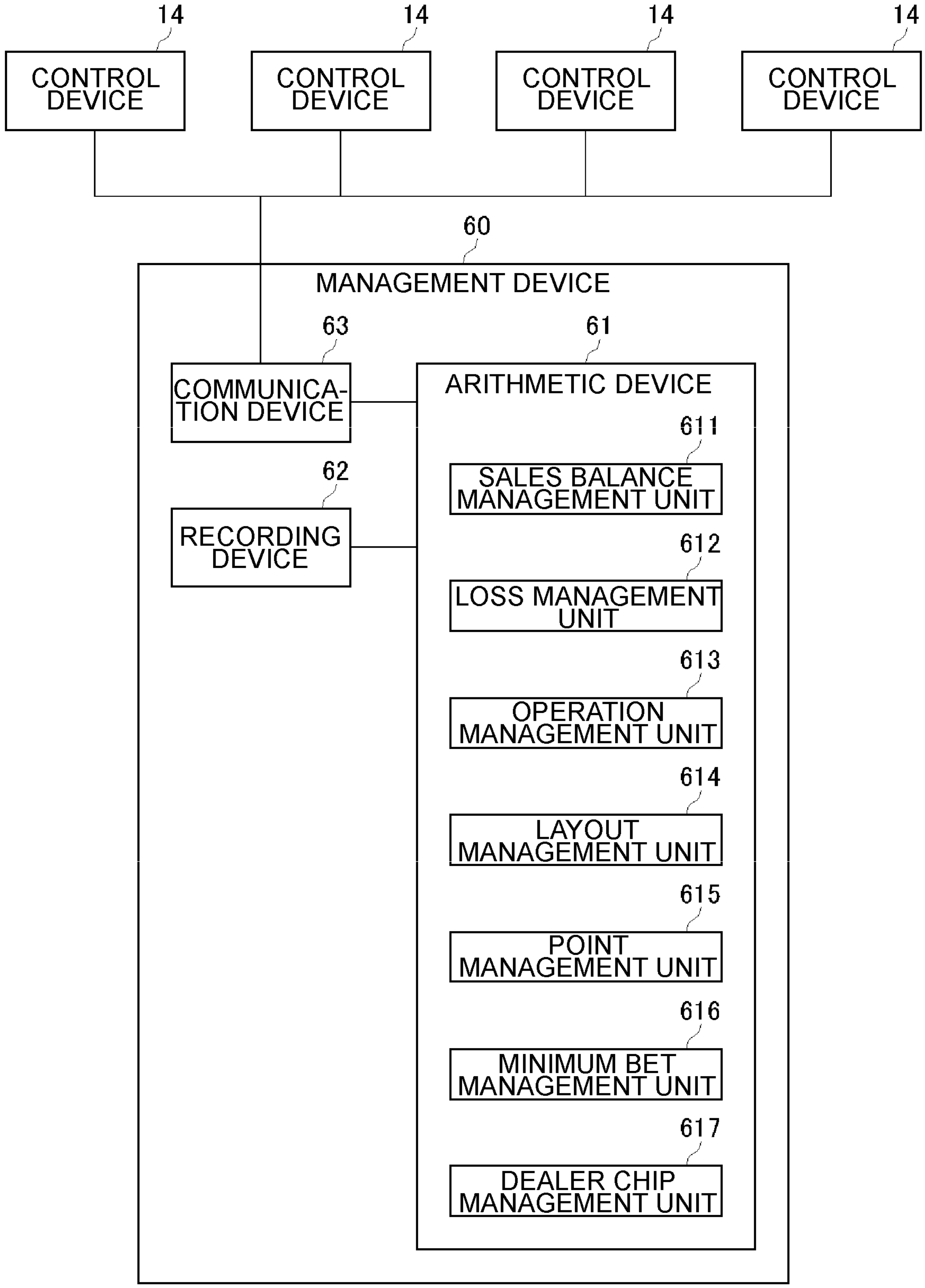
FIG. 39 is a block diagram showing a configuration of an overall management device.

FIG. 39 is a block diagram showing a modified example of the configuration of the management device. The management device 60 includes an arithmetic device 61, a recording device 62, and a communication device 63. The arithmetic device 61 includes a sales balance management unit 611, a loss management unit 612, an operation management unit 613, a layout management unit 614, a point management unit 615, a minimum bet management unit 616, and a dealer chip management unit 617.

The management device 60 is a computer having a processor and a memory, and the arithmetic device 61, which operates in accordance with a management control program of the embodiment, includes the sales balance management unit 611, the loss management unit 612, the operation management unit 613, the layout management unit 614, the point management unit 615, the minimum bet management unit 616, and the dealer chip management unit 617. The management device 60 also further includes a recording device such as a hard disk. Further, the management device 60 has a communication function for communication with the control device 14.

FIG. 41 is a diagram showing an example of a sales table generated by the sales balance management unit 611 of the management device 60. That is, FIG. 40 is a table showing an amount of the chips 9 accommodated in the chip tray 17 for each game table 4, that is, an inventory situation of the chips 9 in a casino. The sales balance management unit 611 calculates sales for each predetermined period (for example, every hour and every 24 hours) for each game table 4. Herein, the sales are an amount (bet amount) bet by the player.

The sales balance management unit 611 manages the sales of the house in a predetermined period by the value and the number of chips 9 betted for each game table 4 and also manages the total sales amount of each game table 4. In addition, the sales balance management unit 611 also manages the sales of the house in a predetermined period by the number of chips 9 for each value. Moreover, the sales balance management unit 611 also manages the sales of the house in a predetermined period even by the total sales amount of the sum of all game tables 4. Figures managed by the sales balance management unit 611 are shown in the sales table.

FIG. 41 is a diagram showing an example of a gross profit table generated by the sales balance management unit 611 of the management device 60. The sales balance management unit 611 manages a gross profit (income) for each predetermined period (for example, every hour and every 24 hours) for each game table 4. Herein, the gross profit is an amount obtained by subtracting the amount of the chips 9 withdrawn in liquidation from the amount of the chips 9 collected in the liquidation, which is the income of the house. Moreover, a ratio (to sales profit ratio) of the gross profit for the sales becomes a gross profit ratio.

The sales balance management unit 611 manages an income (gross profit) of the house in a predetermined period for each game table 4. Further, the sales balance management unit 611 manages a total gross profit of all game tables 4 in a predetermined period. Further, the sales balance management unit 611 also manages a gross profit rate for each game table 4 in a predetermined period and a total gross profit rate of all of the game tables 4. In the gross profit table, the numerical values managed by the sales balance management unit 611 are shown together with the sales of each game table 4 and the total sales of all of the game tables 4.

As described above, the management device 60 manages the sales and the gross profit rate. The income of the house may be obtained as an amount acquired by subtracting loss due to fraud or mistake from the product of the sales and the gross profit rate. That is, Equation (1) below is established:

$$\text{Income}=\text{Sales}\times\text{Gross profit rate}-\text{Loss} \quad (1)$$

Herein, the game organizer may increase the income (gross profit) by increasing the sales, increasing the gross profit rate, and reducing the loss. Moreover, reducing the loss due to the mistake or fraud is implemented by a table system using the various sensors. Hereinafter, processing for increasing the sales and the gross profit rate will be described.

With information on the sales and the gross profit rate alone, it is difficult to link the information to a concrete management measure for increasing the sales and the gross profit rate. Herein, the management device 60 decomposes the sales and the gross profit rate into a plurality of constituent elements and calculates information useful for improving each element.

The sales is represented by the product of the number of transactions and the unit price (hereinafter, referred to as "bet unit price") of the bet amount. That is, Equation (2) below is established:

$$\text{Sales}=\text{Number of transactions}\times\text{Bet unit price} \quad (2)$$

Herein, the number of transactions means a play of one game by one player P. For example, when three players P are playing on one game table 4, the number of transactions in one game is three and when two players P are playing on each of three game tables 4, the number of transactions in one game is 2×3=6. Further, the bet unit price means an average bet amount (sales) (in one transaction) in one game of each player P. That is, in order to increase the sales, it is preferable to increase the number of transactions and increase the bet unit price.

The number of transactions is represented by the product of the number of players (number of guests) and a turnover rate. That is, Equation (3) below is established:

$$\text{Number of transactions}=\text{Number of players}\times\text{Rotation rate} \quad (3)$$

Herein, the number of players means the number of players who participate in the game (takes a bet) and the turnover rate means a reciprocal number of a time required for one game (i.e., game progress speed). Therefore, in order to increase the number of transactions, it is preferable to increase the number of players who participate in the game and the turnover rate of the game.

Further, the gross profit rate is a deduction rate (house edge) when the game result matches a theoretical probability. Therefore, the gross profit rate is represented by the product of a winning rate and the deduction rate and Equation (4) below is established:

$$\text{Gross profit rate}=\text{Winning rate}\times\text{Deduction rate} \quad (4)$$

Herein, the winning rate is a rate indicating how far a house side overcomes from a theoretical house winning rate derived from a rule of the game, and becomes 1 when a winning rate of the house matches a theoretical winning rate, larger than 1 when the winning rate of the house is higher than the theoretical winning rate, and smaller than 1 when the winning rate of the house is lower than the theoretical winning rate. Further, the winning rate becomes 1 when the winning rate of the player P matches the theoretical winning rate derived from the rule of the game, smaller than 1 when the winning rate of the player P is higher than the theoretical winning rate, and larger than 1 when the winning rate of the player P is lower than the theoretical winning rate.

Further, the reduction rate is a rate of a fee collected by the house side to the bet amount and is determined by the rule of the game including setting of odds. The deduction rate is set so that the house side may receive a benefit of, for example, 1 to 3% when the winning rate is 1, that is, the result of the game matches the theoretical result. For example, in a game that predicts a pip of a dice, the winning rate of the player is 1/6, but by setting the odds to 5.9 times instead of 6 times, the deduction rate of approximately 1.7% is set.

As the deduction rate, different values may be set for each type of layout of the game table 4 or for each bet area. For example, deduction rates are set in TIE and PAIR of the baccarat, which are different from those of BANKER and PLAYER, and as a result, different deduction rates from other red or black numbers are set even in "0" and "00" of a roulette.

From Equations (1) to (4) above, the income (gross profit) of the house may be decomposed into a plurality of elements as in Equation (5) below.

$$\text{Income}=\text{Number of players}\times\text{Turnover rate}\times\text{Bet unit price}\times\text{Winning rate}\times\text{Deduction rate}-\text{Loss} \quad (5)$$

First, by element decomposition of Equation (1), a large structure of the income may be analyzed. For example, when the income (gross profit) is 10,000 dollars, 10,000 dollars may be determined as 1% of profit on 1 million dollar sales, 10% of profit of 100,000 dollars, 0.1% of profit of 10 million dollars, or the like. Herein, the sales balance management unit 611 compares the gross profit rate with a predetermined reference gross profit rate (e.g., 2%) or a reference gross profit rate range (e.g., 1 to 3%) and when the gross profit rate is extremely low (for example, 1% or less) and when the gross profit rate is extremely high (for example, 3% or more), the sales balance management unit 611 generates a warning.

As shown in Equation (4), the gross profit rate may be decomposed into the winning rate and the deduction rate, but since the deduction rate is set by the game organizer, when the gross profit rate is extremely high or low, it is considered that the winning rate is extremely high or low. Herein, when the gross profit rate is extremely high or low, fraud such as manipulating the winning rate by the player P or dealer D is suspected.

Herein, the sales balance management unit 611 calculates the gross profit rates in a predetermined period for each player P, for each dealer D, and for each game table 4, respectively. Even in respect to the gross profit rate, the sales balance management unit 611 generates the warning when the gross profit rate is extremely low and when the gross profit rate is extremely high. The generated warning may be notified to a communication account (for example, an e-mail address) of the game organizer or may be recorded in the recording unit 62.

The sales balance management unit 611 generates statistics of each of the number of games, the number of players, and the bet unit price in a predetermined period by analyzing the game record obtained from each control device 14. When the sales is not ideal, the game organizer may know whether there is room for improvement in the number of games, the number of players, or the bet unit price and may also verify whether an effect of such improvement measures may be obtained by looking at trends of the number of games, the number of players, and the bet unit price when taking the improvement measures for increasing the number of games, the number of players, and the bet unit price.

The sales balance management unit 611 calculates and outputs a sales-versus-profit rate X which is a ratio between a net profit Y which is the winning or losing amount of the game organizer and a total bet amount (sales) B which is the total amount of chips 9 placed by the player P. Further, the sales balance management unit 611 compares the sales-versus-profit rate X with a theoretical profit rate or a past average profit rate and outputs the comparison result. The sales balance management unit 611 calculates the sales-versus-profit rate X for each game table 4, each player P, each player position, or each dealer D for every predetermined period or for each game and outputs the calculated sales-versus-profit rate X if necessary.

Further, the sales balance management unit 611 determines a relationship between the number of games and the time (betting time+gaming time+chip collection time+chip withdrawal time) required for the number of games. In addition, the sales balance management unit 611 calculates, for each player P or each game table 4, and/or for each dealer D in charge of each game table 4, the total bet amount B around a predetermined number of games, the winning or losing amount Y of the game organizer, and/or the sales-versus-profit rate X, and outputs the calculated total bet amount B around the predetermined number of games, winning or losing amount Y of the game organizer, and/or sales-versus-profit rate as necessary.

In addition, the sales balance management device 611 records 1) a bet amount B of individual games to be played on the game table 4, 2) a winning or losing result (W&L) of the individual games performed on the game table 4, and 3) a gross profit rate R % based on the rule of the game to be performed, in the recording device 62. Then, the sales balance management device 611 outputs the total profit Y by calculating Equation (6) below by using the information of 1) to 3) for each game and/or information of 1) to 3) at a predetermined time or period.

$$Y=\Sigma(B\times W\&L\times R\%) \quad (6)$$

Here, 1) the bet amount B of the individual game performed on the game table 4 is the sales in each game. 2) The winning and losing result (W & L) of individual games played on the game table 4 is synonymous with the above-mentioned winning rate. For the winning/losing result (W & L), the winning/losing result is +1 when the casino side wins (collects the chip), but —1 when the casino side loses (withdraws the chip). 3) The gross profit rate (R %) based on the rule of the game played on the game table is synonymous with the above deduction rate and is determined by the rule of the game including the setting of the odds. For example, the gross profit rate becomes 100% when betting on BANKER or PLAYER (that is, when the player wins, he/she receives withdrawal equal to the bet amount and when the player loses, the bet amount is fully collected), 800% in the case where the player wins when betting on PAIR, and 100% in the case where the dealer wins (that is, when the player wins, the player is withdrawn 8 times larger than the bet amount and when the player loses, the bet amount is fully collected).

In the case where different gross profit rates are set for each type of layout of the game table 4 or for each bet area (bet target) (for example, when the odds of TIE and PAIR increase), the sales balance management unit 611 calculates the gross profit Y by adopting the different gross profit rates (R1%, R2%, . . . ). When different gross profit rates are set for each type of layout of the game table 4 or for each bet area (bet target), the sales balance management unit 611 outputs distribution states of the total bet amount TB of the game and/or the bet amount B of the game for each of types of layouts of the different gross profit rates (R1%, R2%, . . . ) or for each bet area (bet target). Thus, for example, it is possible to determine only the bet amount to TIE.

Moreover, when different gross profit rates are set for each type of layout of the game table 4 or for each bet area (bet target), the sales balance management unit 611 outputs the distribution state of the total bet amount TB of the game and/or the bet amount B of the game for each of different gross profit rates (R1%, R2%, . . . ), for each type of layout, or for each bet area (bet target). Thus, for example, it is possible to determine the bet amount of the bet target whose gross profit rate is extremely high.

Moreover, when different gross profit rates are set for each type of layout of the game table 4 or for each bet area, the sales balance management unit 611 compares the gross profits Y or the total gross profit rates (R %) of respective game tables 4 in units of the game tables 4 having the types of layouts or bet areas (bet target) of the different gross profit rates (R1%, R2%, . . . ). As a result, the gross profit rates of the tables may be compared with each other.

The loss management unit 612 detects the fraud or the mistake by statistically analyzing records of a plurality of games in a plurality of game tables 4, rather than detecting the fraud or mistake for each game. The loss management unit 612 counts and outputs the number of times of mismatch detection of comparing whether the increase/decrease amount of the total amount of the chips 9 existing in the chip tray 17 matches the winning or losing amount Y of the game organizer side. The mismatch may be detected as the case where the "verification result" of the game record (see FIG. 38) is NG. The loss management unit 61 records count values for each game table 4, for each dealer, and for each player in the recording device 62. As a result, when there is a game table 4, a dealer D, or a player P having a high count value, it is possible to discover the fraud by further executing a new investigation.

Further, the loss management unit 612 compares the increase/decrease amount of the total amount of the chips 9 existing in the chip tray 17 and the winning or losing amount Y of the game organizer side and counts and outputs a mismatch amount L when both amounts mismatch each other. The loss management unit 612 may calculate the mismatch amount L by comparing a difference between the "start dealer chip amount" and the "post-liquidation dealer chip amount" of the game record and the "net profit". The loss management unit 61 records the count values for each game table 4, for each dealer D in charge of each game table 4, and for each player P in the recording device 62. The loss management unit 612 periodically refers to the recording device 62 to determine and outputs a cumulative amount of the mismatch amount L. As a result, when there is a game table 4, a dealer D, or a player P having a high count value, it is possible to discover the fraud by further executing a new investigation.

Further, the loss management unit 612 compares the increase/decrease amount of the total amount of the chips 9 existing in the chip tray 17 and the winning or losing amount Y of the game organizer side, and counts the mismatch amount (loss amount) L, corrects Equation (6) to Equation (7) below, and outputs a gross profit Y'.

$$Y'=\Sigma(B\times W\&L\times R\%\pm L) \quad (7)$$

As a result, it is possible to calculate the gross profit in consideration of the loss amount L.

Furthermore, at the time when a predetermined number of games end, the loss management unit 612 compares a result of a total amount of the actual winning rate and the gross profit Y and a number based on probability statistical calculation or a number based on past accumulated data for each player P, for each dealer D in charge of each game table 4, and for each game table 4 and judges whether there is a significant difference between them to specify a player P, a dealer D, and a game table 4 in which there is the significant difference. As a result, since it is possible to discover a player P or a dealer D who is extremely more likely to win or lose by comparing the number on the probability statistical calculation or the number based on the past accumulated data, it is also possible to discover the fraud which is not discovered in the game table 4.

When detecting the significant difference, the loss management unit 612 records the bet chip amount of each game table 4 in the bet area (bet position) with a different gross rate (R %) in the recording device 62 to specify whether a cause of the significant difference in a series of games in which there is the significant difference is related to the bet area (bet position) (for example, "TIE" of the baccarat) of the different gross rate (R %). As a result, for example, although the number of times of winning is standard, in the case of winning, it is possible to identify the player P who is continuously betting on a betting target of high magnification, thereby discovering the fraud.

In addition, the loss management unit 612 may determine purchase information of the chip 9 of each player P for each type of chip 9. For example, the purchase information may be acquired from a device provided in a cashier for purchasing the chip 9 and when purchasing the chip 9 with the game table 4, the purchase information may be acquired by the image recognition by the camera 2 and the measurement device 21. The purchase information includes the number of chips for each value of the purchased chip 9 and purchase date and time.

The loss management unit 612 determines the purchase information of the chip 9 of the player P in a predetermined time or period and associates the purchase information with the bet amount, the winning amount or the losing amount for each player P and records the purchase information in the recording device 62, and outputs the purchase information as necessary. As a result, it is possible to detect suspicion of money laundering due to collusion between the player P and the dealer D.

The operation management unit 613 calculates the number of games and the number of players in a predetermined period for each dealer D. Generally, as the number of players increases, it takes time to collect and withdraw the chips 9, and as a result, the turnover rate (that is, the number of games per unit time) does not become large. When the turnover rate is large despite the large number of players, it means that a progress operation of the game of the dealer D is smooth. On the contrary, when the turnover rate is small despite the small number of players, it means that there is a problem that the progress operation of the game of the dealer D is slow.

Therefore, the operation management unit 613 extracts a dealer D whose turnover rate×the number of players in a predetermined period, that is, the number of transactions is less than a predetermined threshold value. The game organizer may enhance the sales by making efforts to improve the operation so that the progress of the game is advanced with respect to the extracted dealer D.

The operation management unit 613 further creates statistics of the bet time, the gaming time, the chip collection time, and the chip withdrawal time for each dealer D. For each dealer D, it is desirable that the turnover rate is high, but it is effective to analyze how long the bet time, the chip collection time, the chip withdrawal time, and the gaming time are as a factor that does not increase the turnover rate. The length of the bet time depends largely on a betting operation of the player P and the dealer D has few elements capable of controlling the length of the bet time. Meanwhile, the length of the chip liquidation time depends largely on the operation of the dealer and may be shortened by the effort of the dealer D. Behaviors of both player P and the dealer D may influence the length of the gaming time (for example, a squeeze of the player P in the baccarat affects the gaming time).

Herein, the operation management unit 613 calculates the chip collection time/the number of players and the chip withdrawal time/the number of players for each game record. In addition, the operation management unit 613 calculates an average of the bet times for a plurality of game records, an average of the chip collection time/the number of players, an average of the chip withdrawal time/the number of players, and an average of the gaming times for each dealer D to extract a dealer D in which such an average is larger than a predetermined threshold value and a dealer D in which such an average is smaller than the predetermined threshold value. The game organizer may provide necessary guidance to the dealer D using the statistical data.

Further, the operation management unit 613 determines the dealer in charge of each game table 4 based on the game record sent from the control device 14 and detects, for each dealer, at least one element time of 1) the bet time, 2) the chip collection time, 3) the chip withdrawal time, and 4) the gaming time, and stores the detected element time in the recording device 62.

Further, the operation management unit 613 determines the bet position (bet target) and/or the number of stacks of the chip 9 placed by a game participant on the game table 4 or the number of chips 9 per stack, and outputs the bet position and/or the number of stacks or the number of chips 9 in association with the number of games and a time taken for the number of games. In addition, the operation management unit 613 determines the number of players on the game table 4 and outputs the number of players in association with the number of games and the time taken for the number of games. Herein, the time taken for the game may be the sum of the bet time, the gaming time, the chip collection time, and the chip withdrawal time of the number of games, or the sum (chip liquidation time) of only the chip collection time and the chip withdrawal time of each game (Chip settling time) or may be either the chip collection time or the chip withdrawal time.

The layout management unit 614 calculates the gross profit rate in a predetermined period for each type of layout. By studying the gross profit rate, it is possible to know which layout may make the gross profit rate higher. The layout management unit 614 calculates the bet amount for each bet target. By analyzing the bet amount of each bet target for each layout, it may be determined which layout is more desirable.

The layout management unit 614 analyzes whether the difference in layout affects the sales. Specifically, the layout management unit 614 calculates the bet unit price/minimum bet amount for each game record and performs totaling for each layout. Further, more specifically, the layout management unit 614 evaluates the layout by analyzing in which bet target (PLAYER, BANKER, TIE, PLAYER PAIR, and BANKER PAIR) the number of times of betting or the bet amount is larger for each layout. For example, it may be evaluated that the layout with a large bet amount to TIE, PLAYER PAIR, and BANKER PAIR contributes to an increase in sales.

As described above, the larger the number of players and the bet unit price, the higher the sales of the house. The number of players and the bet unit price may not be increased directly by instructing the dealer, so it is effective by the motion of the player. As the motion of the player, there are point granting and setting of the minimum bet amount. Hereinafter, the point granting and the setting of the minimum bet amount will be described in order.

The point management unit 615 grants the point to the player P who is a member and gives a benefit corresponding to the point. The player P may change the point to various benefits according to the size of the point. The point management unit 615 devises the setting of the benefit to increase the number of players and the bet unit price.

The recording unit 62 stores points owned by each member. In order to grant the points to the member, the point management unit 615 notifies the control device 14 of the granted points and updates the points owned by the corresponding member, which are stored in the recording unit 62. The control device 14 adds the points granted by the management device 60 to the points owned by the player P and updates the owned points. The reader/writer 5 records the updated owned points in the membership card 1 of the player P.

The point management unit 615 grants points of the number of points corresponding to the bet amount of the player P. Alternatively, the point managing unit 615 may determine the number of participating games for each player P in a predetermined time or period and grant the point or a status to the player P under predetermined conditions. When a value obtained by subtracting the loss amount from the gross profit of the game organizer is positive, the game organizer gains a profit and when the value is minus, the game organizer suffers a loss. The value obtained by subtracting the loss amount from the gross profit of the game organizer is called the net profit of the game organizer and cost of the game organizer related to the benefit granted to the member may be determined according to the net profit as a whole.

The point management unit 615 adjusts the ratio of the granted points to the bet amount of the player P and the relationship between the benefit and the consumption point according to the net profit. In addition, the point management unit 62 adjusts the ratio of the granted points to the bet amount of the player as a temporary campaign promotion and the relationship between the benefit and the consumption point so as to increase the number of players and the bet unit price according to the number of players and the bet unit price in the game record. The ratio of the granted points to the bet amount of the player and the relationship between the benefit and the consumption point are stored in the recording unit 62.

In addition, the point management unit 615 records in the recording device 62 at least one information of 1) the number of times of visitation to the game arcade, 2) the number of times of betting, 3) the winning amount, and 4) the losing amount for each specific game participant weekly or monthly, or in a predetermined period and reads at least one information of 1) to 4) from the recording device 62 and outputs the read information when the player P enters the casino game arcade. The fact that a specific player P visits the game arcade may be determined by confirming the ID using the membership card 1 when entering the game arcade, determined by confirming the ID using the membership card 1 when purchasing the chip, or determined by reading the membership card 1 with the reader/writer 5 on the game table 4.

The member may receive the benefit or status by consuming the owned points, but a specific grant condition is set with respect to a predetermined benefit and status in addition to the consumption of the owned point to grant the relevant benefit or status only to a player P which satisfies the grant condition.

Further, the point management unit 615 not only may grant the point and status according to the sales but also may specially give the point or status when the specific grant condition is satisfied. The specific grant condition may mean that the bet amount, the number of times of betting, the winning amount, and the losing amount satisfy the predetermined condition in a predetermined time or period. Here, the predetermined time or period may be a unit of day, a plurality of consecutive days or a unit of month, or cumulative (indefinite). Further, the point management unit 615 may additionally grant the point or status to a member to which the point is intensively granted in a predetermined time or period.

For example, since members whose net profit in a predetermined period is equal to or greater than a predetermined amount stay in the casino game arcade and participate in the game after the next day, it is effective to grant the benefit immediately available as payment of usage fee of a service (for example, postponing a check-out date of a hotel, upgrading a room, etc.) of the hotel for urging a long stay. Therefore, for example, the point management unit 615 assigns a grant condition that the net profit of the player in the predetermined period is equal to or more than a predetermined amount to the benefits such as postponing the check-out date of the hotel currently staying and upgrading the room.

Meanwhile, when the net profit of the player in the predetermined period is equal to or less than the predetermined amount, it is effective to grant a time limit chip that may be used after a predetermined period of time, a chip that may be bet, but may not be converted, or a coupon that may be used at the casino game arcade as the benefit. Therefore, for example, the point management unit 615 assigns the grant condition that the profit of the player in the predetermined period is equal to or less than the predetermined amount to the benefit such as the time limit chip that may be used after the predetermined period of time and the coupon that may be used at the casino game arcade. Of course, the grant condition is not set in the benefit, but the benefit may include a benefit which may be obtained only by consuming the point.

The member uses the membership card 1 in order to exchange the owned points into the benefit. The point management unit 615 acquires a request to change the points into the benefit and with reference to the recording unit 62, with respect to the required benefit, judges whether the owned points of the relevant member ID are sufficient for the number of consumption points corresponding to the benefit and whether to satisfy the grant condition when the grant condition is set.

When the owned points are sufficient and the grant condition is satisfied, the point management unit 615 updates the owned points by subtracting the number of points corresponding to the benefit from the owned points. The point management unit 615 rewrites the owned points of the recording unit 62 with the owned point updated by granting the benefit.

The benefit may be used at the casino game arcade, a related hotel, and a predefined facility. In the case of using the benefit in the casino game arcade, the benefit may be an entry right to a VIP room or substitute money for the game that may not be converted. In this case, the point management unit 615 may grant the entry right to the VIP room in exchange for a predetermined number of points and when the owned point is equal to or more than a predetermined value, the point management unit 615 may grant the substitute money for the game which may not be converted, which corresponds to the number of points. Further, when the benefit is used in the hotel, the benefit may be various services of the hotel.

The point management unit 615 may grant the benefit without consuming the point when granting to the member the benefit corresponding to the owned point. In other words, the status (rating) of the members may be set according to the owned point and the benefit corresponding to the status may be granted. Alternatively, the status may be granted instead of the point. In this case, the point management unit 615 confirms the owned point of the member who intend to receive the benefit and grants the benefit when the point are equal to or greater than a predetermined value. For example, a right to use the VIP room may be granted to a member whose owned point is larger than a predetermined threshold value.

Further, the point management unit 615 may output a cumulative bet amount for each game participant or the bet amount in a predetermined period as credit information of the game participant.

The minimum bet management unit 616 determines the minimum bet amount (or a recommendation value) of each game table 4 based on the game record acquired from the control device 14. By appropriately setting the minimum bet amount of the plurality of game tables 4 at the casino game arcade, the number of games, the number of players, and the bet unit price are optimized to enhance the sales. That is, in a predetermined game table 4, when a player (high-amount player) playing with a bet amount sufficiently higher than the minimum bet amount and a player (low-amount player) playing with the minimum bet amount or a bet amount slightly higher than the minimum bet amount coexist, the sales of the entire casino game arcade may be kept low.

Figure 42:
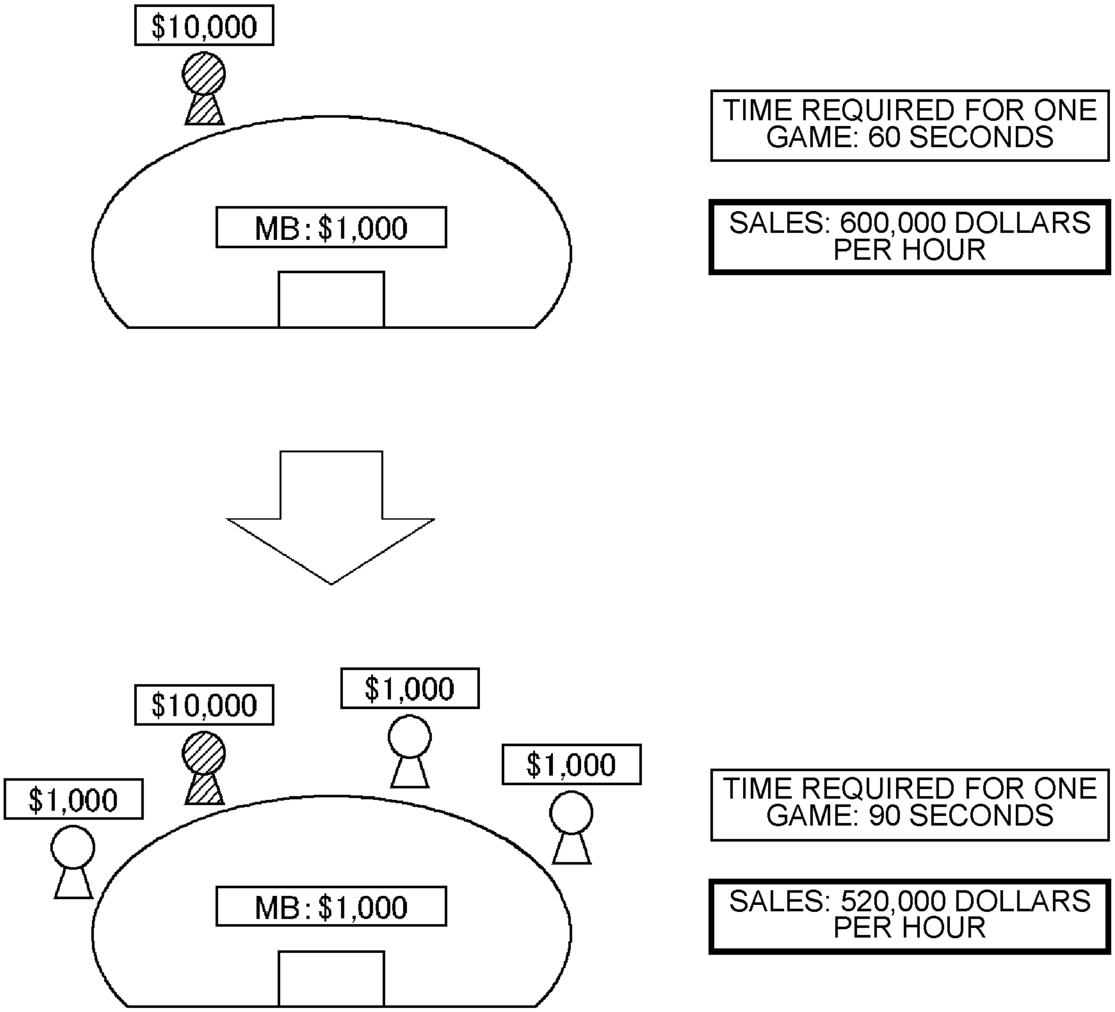
FIG. 42 is a diagram for describing a situation in which the sales of the entire casino game arcade is kept low.

FIG. 42 is a diagram for describing such a situation. Now, as shown in the upper end of FIG. 42, when the minimum bet amount is set to 1,000 dollars in a predetermined game table and herein, it is assumed that a high-amount player having a bet amount of approximately 10,000 dollars is playing alone. In this case, an average required time (including the bet time, the chip liquidation time (chip collection time+chip withdrawal time), and the gaming time) of one game is 60 seconds, and the average sales per hour is 600,000 dollars.

When three low-amount players with a bet amount of approximately 1,000 dollars are added to the game table 4, the total bet amount of the game table 4 rises to approximately 1,3000 dollars, but as the number of players increases, the average time required for one game also increases. Assuming that the play time increases by 10 seconds each time one player increases, when the number of players reaches 4, the average time required for one game is 90 seconds. As a result, the sales per hour will decrease from approximately 600,000 dollars to approximately 520,000 dollars. As described above, since the high-amount player and the low-amount player coexist in the same game table, the sales of the house decreases even if the number of players increases.

Figure 43A:
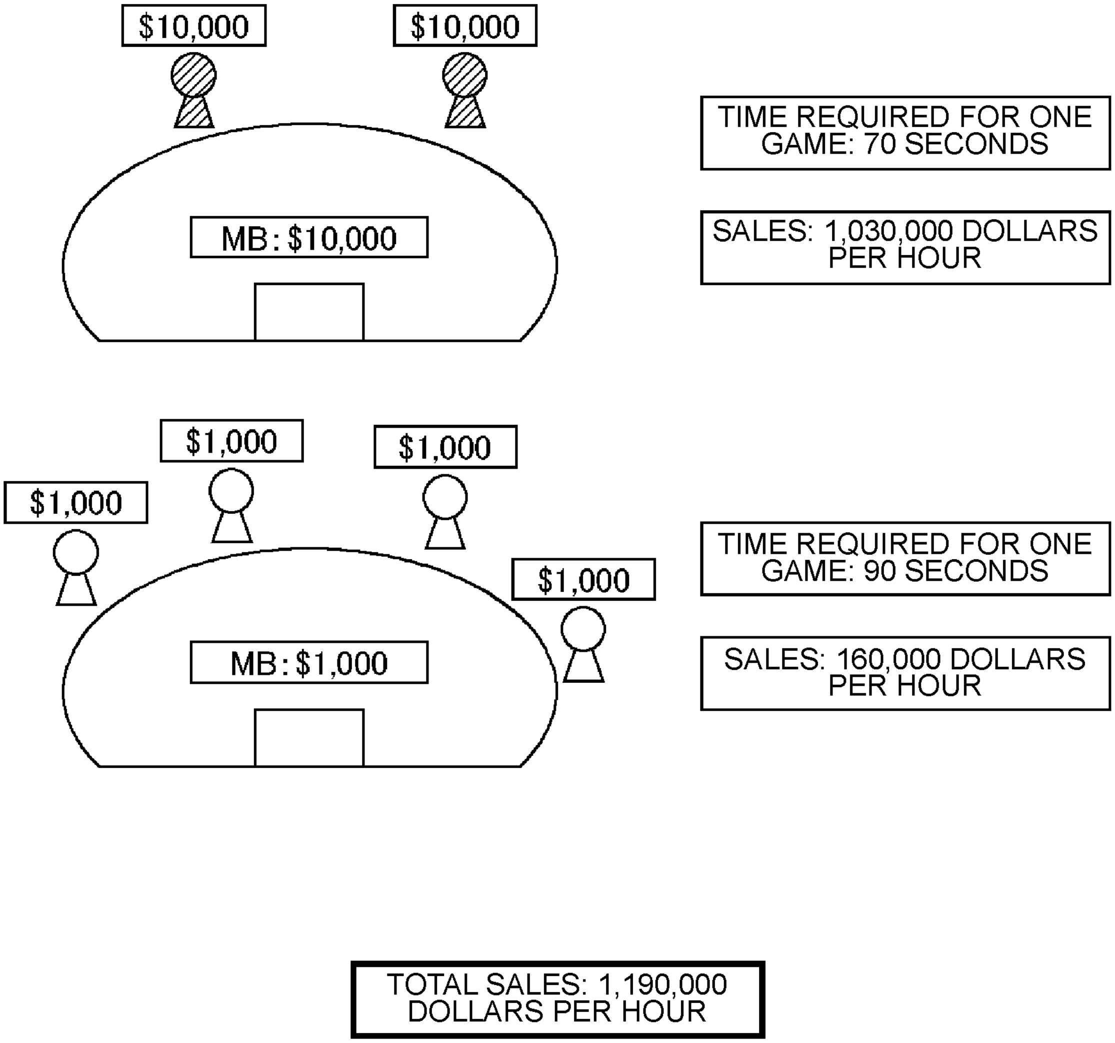
FIG. 43A is a diagram for describing a situation in which the sales of the entire casino game arcade is kept low.
Figure 43B:
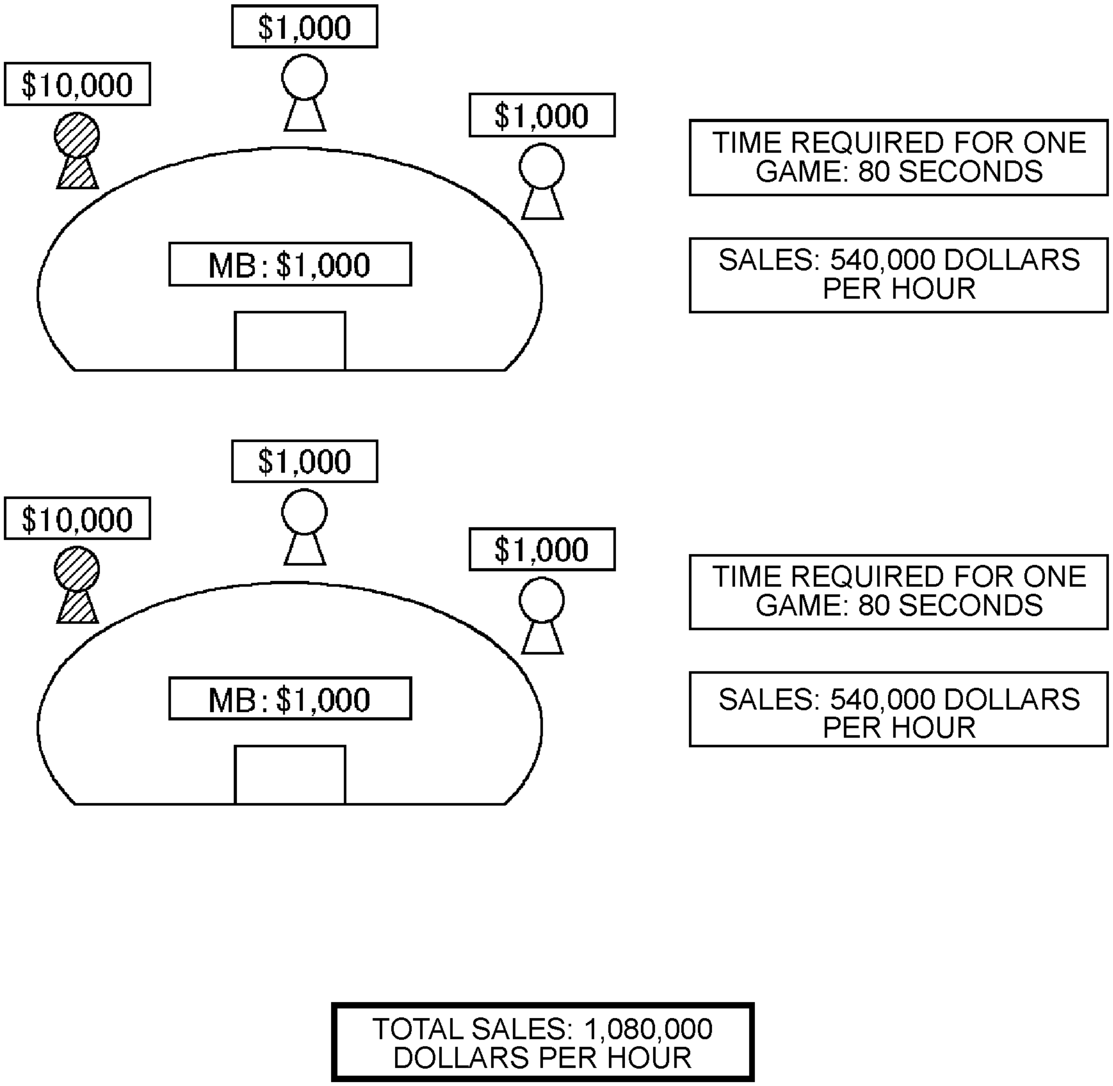
FIG. 43B is a diagram for describing a situation in which the sales of the entire casino game arcade is kept low.

FIGS. 43A and 43B are diagrams for describing another example. Now, as shown in FIG. 43A, the minimum bet amount of one of the two game tables is set to 10,000 dollars and the minimum bet amount at the other side is set to 1,000 dollars. The average time required for one game in the game table of the high-amount player is 70 seconds and the sales per hour are approximately 1.03 million dollars. Meanwhile, the average time required for one game in the game table of the low-amount player is 90 seconds and the sales per hour is approximately 160,000 dollars. Therefore, the total sales per hour of the two game tables are approximately 1.9 million dollars.

In the example of FIG. 43B, two high-amount players in FIG. 43A are distributed in different game tables. That is, there are two game tables in which the minimum bet amount is set to 1,000 dollars, and in any of the game tables, one high-amount player having a bet amount of approximately 10,000 dollars plays the game and two low-amount players having a bet amount of approximately 1,000 dollars play the game. In this case, the average time required for one game on each game table 4 is 80 seconds, the sales per hour is approximately 540,000 dollars, and the total sales per hour of the two game tables 4 is approximately 1.08 million dollars.

As described above, when the high-amount player is distributed in the plurality of game tables 4 and the high-amount player and the low-amount player coexist in each game table 4, the sales (in the case of FIGS. 43A and 43B, 1.19 million dollars to 1.08 million dollars) of the house is reduced.

As in the above example, since the high-amount player and the low-amount player coexist in the game table 4 without appropriately setting the minimum bet amount, not only the sales of the house is reduced, but also the time required for one game increases in the high-amount player, and as a result, it is difficult to play the game comfortably.

Herein, the minimum bet management unit 616 sets an appropriate minimum bet amount of each game table 4 of the casino game arcade based on the game record sent from each control device 14.

The minimum bet management unit 616 sets the minimum bet amount of each game table 4 so as to increase the sales and the gross sales-versus-profit rate. Further, the minimum bet management unit 616 may set the minimum bet amount of each game table 4 so as to increase an average value of the number of games per unit time or the total bet amount per game.

In the minimum bet management unit 616, candidates of the minimum bet amount divided into a plurality of stages are set. In the embodiment, in the minimum bet management unit 616, five steps of minimum bet amount candidates of 100 dollars, 500 dollars, 1,000 dollars, 5,000 dollars, and 10,000 dollars are prepared. The minimum bet management unit 616 is set to select any one of the candidates of the minimum bet amount. Moreover, the minimum bet management unit 616 sets a more appropriate minimum bet amount in addition to the prepared candidates and when the minimum bet amount is inappropriate among predetermined minimum bet amount candidates, the minimum bet management unit 616 may more finely classify the minimum bet amount candidates.

The management device 60 outputs (transmits) the set minimum bet amount to the control device 14 of the game table 4. The control device 14 displays on the display 15 the minimum bet amount received from the management device 60. When receiving the minimum bet amount set from the management device 60, the control device 14 may display the recommendation value on the display 15 as it is or the control device 14 instructs only the dealer to display the recommendation value on the display 15 in accordance with the judgment and operation of the dealer.

Based on the information on the number of players in the game record and the information on the bet amount which is a minimum amount of the bet amount for each player position, or the information on the average bet amount in the game record, the minimum bet management unit 616 selects any one of the minimum bet amount candidates divided into the plurality of stages.

The minimum bet management unit 616 sets the minimum bet amount of each game table 4 by determining the total bet amount of each player for each game table 4, for each game and/or for each predetermined time or for each predetermined period. In the embodiment, the minimum bet management unit 616 raises the minimum bet amount when the number of players betting on the current minimum bet amount of the game table 4 at a predetermined rate or more is equal to or more than a predetermined ratio.

Specifically, the minimum bet management unit 616 rates, a player in which the minimum amount among the bet amounts of a predetermined number (five games in the embodiment) of games in the past is the predetermined ratio of the minimum bet amount (150% in the present embodiment) or more is rated as the high-amount player for each player position with respect to each game table 4. When the number of high-amount player is equal to or more than the predetermined ratio (50% in the embodiment) or more in the game table 4, the minimum bet management unit 616 sets the minimum bet amount which is higher than the previously set minimum bet amount in the game table 4.

FIGS. 44A and 44B are diagrams showing an example of setting of a minimum bet amount according to an actual bet amount. In the examples of FIGS. 44A and 44B, four players participate in the game and the minimum bet amount is set to 1,000 dollars.

In the example of FIG. 44A, the minimum amount of the bet amounts of player 1 in the past 5 games is 1,000 dollars, the minimum amount of the bet amounts of player 2 in the past 5 games is 2,000 dollars, the minimum amount of the bet amounts of player 3 in the past 5 games is 1,500 dollars, and the minimum amount of the bet amounts of player 4 in the past 5 games is 1,000 dollars. In this case, with respect to player 2 and player 3, the minimum bet amount of the past 5 games is equal to or more than 1,500 dollars which is 150% of the current minimum bet amount of 1,000 dollars and player 2 and player 3 are rated as the high-amount players. Since the ratio of the high-value players (two players) among the four players participating in the game is 50% and reaches 50% which is a reference value, the minimum bet management unit 616 determines the minimum bet amount higher than the already set minimum bet amount of 1,000 dollars as a recommendation value.

Meanwhile, in the example of FIG. 44B, the minimum amount of the bet amounts of player 1 in the past 5 games is 1,000 dollars, the minimum amount of the bet amounts of player 2 in the past 5 games is 1,500 dollars, the minimum amount of the bet amounts of player 3 in the past 5 games is 1,000 dollars, and the minimum amount of the bet amounts of player 4 in the past 5 games is 1,100 dollars. In this case, with respect to player 2, the minimum bet amount of the past 5 games is equal to or more than 1,500 dollars which is 150% of the current minimum bet amount of 1,000 dollars and player 2 is rated as the high-amount player. Since the ratio of the high-value players (one player) among the four players participating in the game is 25% and does not reach 50% which is the reference value, the minimum bet management unit 616 determines the current minimum bet amount of 1,000 dollars as the recommendation value without changing the already set minimum bet amount of 1,000 dollars.

When raising the minimum bet amount, the minimum bet management unit 616 increases the minimum bet amount by one level and performs the same calculation as above. In the case of FIG. 44A, when the current minimum bet amount is set to 5,000 dollar higher by one level, a condition for determining a higher minimum bet amount as the recommendation value is not satisfied, so 5,000 dollars is determined as the recommendation value of the minimum bet amount. In the case where the same calculation is performed by raising the minimum bet amount by one level and the above condition is further satisfied, the minimum bet amount is increased by one level and this is repeated until the above condition is not satisfied.

In the above example, the minimum bet management unit 616 evaluates the minimum amount among the bet amounts of the past 5 games of the respective player positions (players), but instead of this, the minimum bet management unit 616 may rate a player in which the average value (average bet amount) of the bet amounts of the past predetermined number of games (for example, 5 games) is equal to or more than a predetermined ratio of the minimum bet amount (for example, 300%) as the high-amount player for each player position with respect to each game table 4.

Further, in the above example, when the number of high-amount players is equal to or more than the predetermined ratio, the minimum bet amount is changed to the amount higher by one level among the predetermined candidates, but instead of this, a predetermined ratio (for example, 150%) of the minimum bet amount, that is, in the example of FIG. 44A, 150% of 1,500 dollars, which is the minimum bet amount of 1,000 dollars, may be set as the minimum bet amount. Further, in the example of FIG. 44A, when the current minimum bet amount is 500 dollars, the minimum bet amount may be increased to 1,000 dollars which is the minimum bet amount of the player.

Next, determination of the recommendation value of the minimum bet amount according to the table congestion degree will be described. The minimum bet management unit 616 calculates the table congestion degree of each game table 4 based on the information on the number of players of the game record. Moreover, the table congestion degree indicates a ratio of the number of players participating in the game to a capacity of each game table 4. The minimum bet management unit 616 sets the minimum bet amount of each game table 4 according to the table congestion degree determined by the minimum bet management unit 616.

Figure 45A:
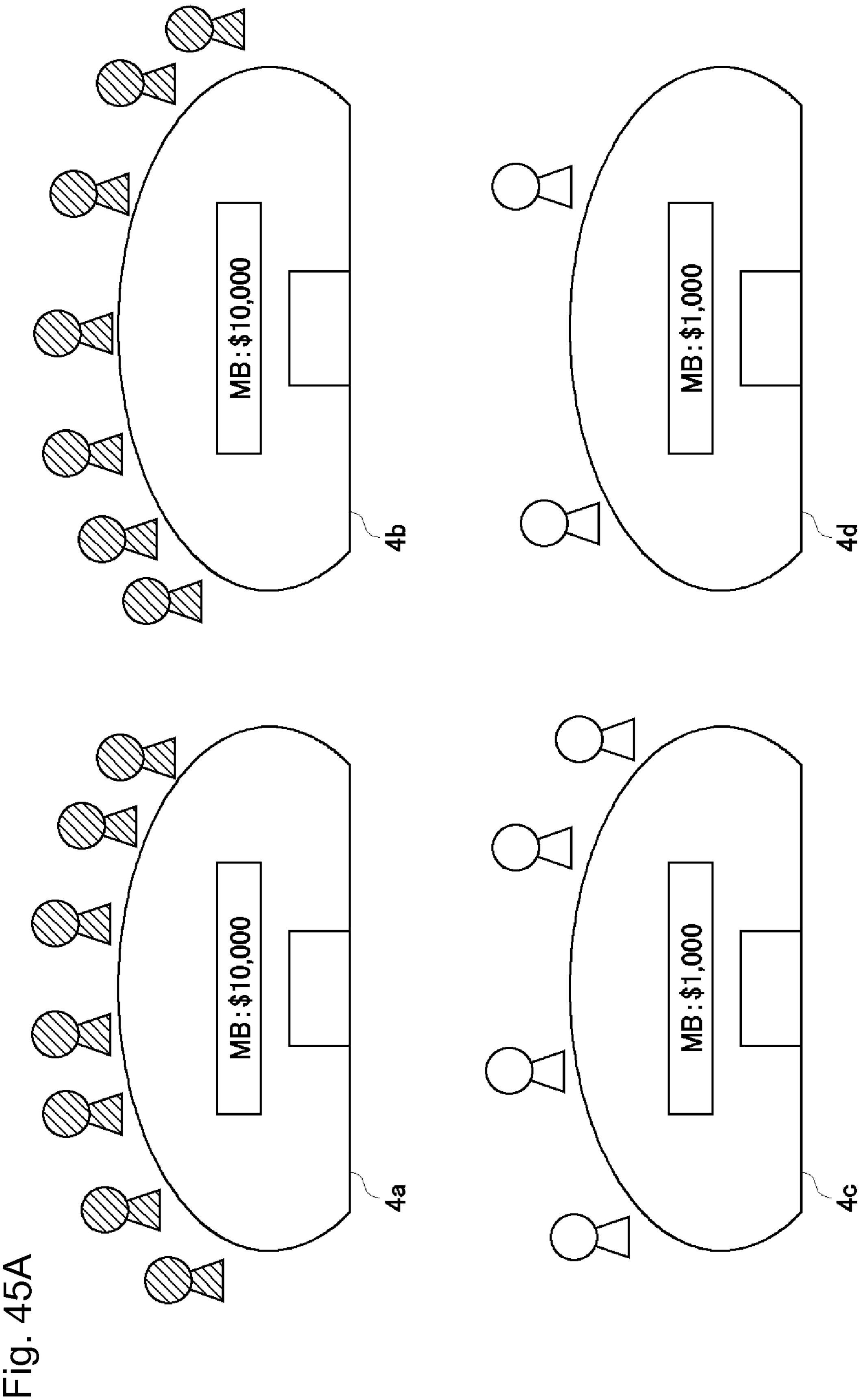
FIG. 45A is a diagram showing an example of determination of a recommended value of a minimum bet amount according to a table congestion degree.
Figure 45B:
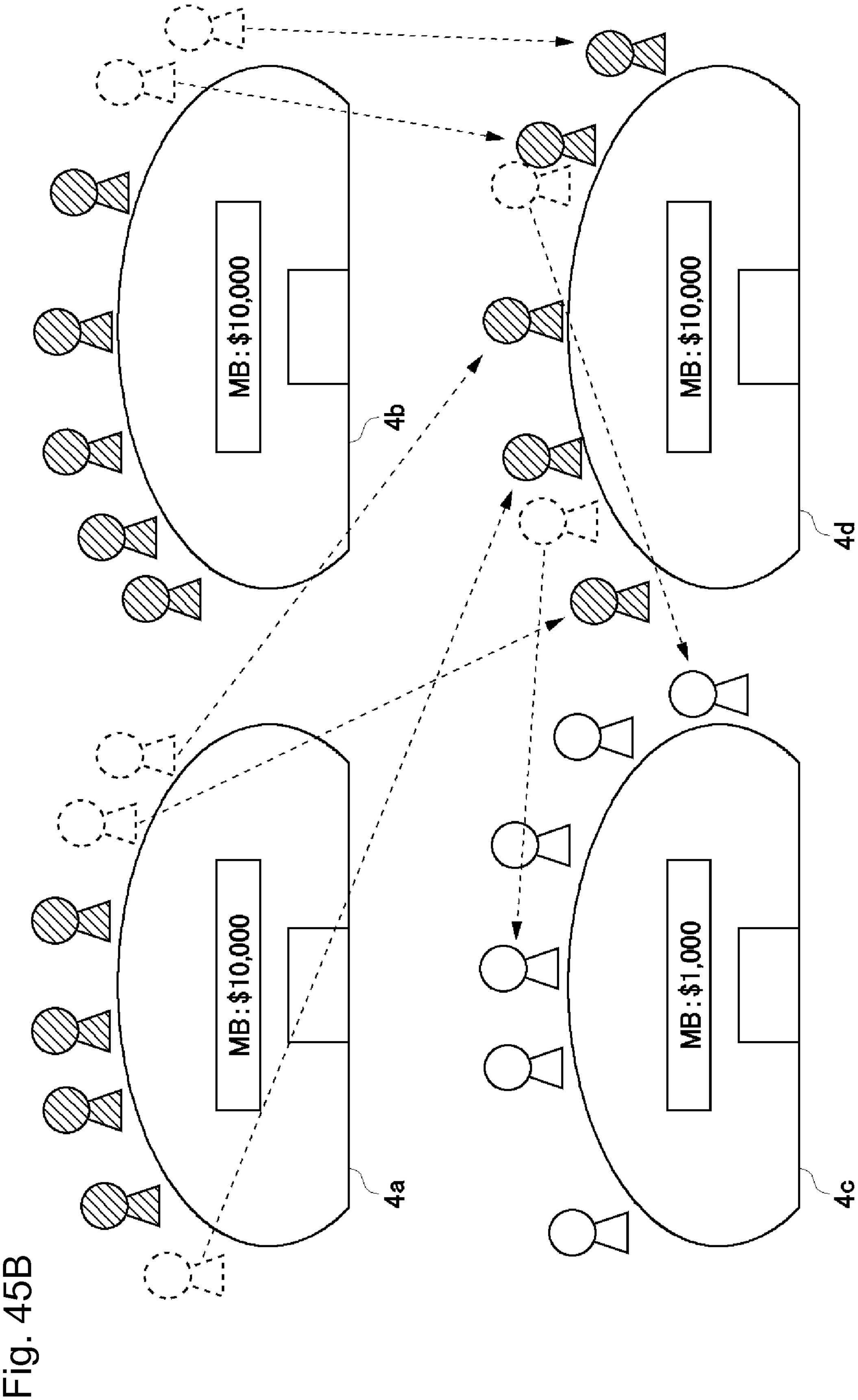
FIG. 45B is a diagram showing an example of determination of a recommended value of a minimum bet amount according to a table congestion degree.

FIGS. 45A and 45B are diagrams showing an example of determination of a recommendation value of a minimum bet amount according to a table congestion degree. Now, as shown in FIG. 45A, there are four game tables 4*a* to 4*d*, and in two game tables 4*a* and 4*b* thereof, the minimum bet amount is set to 10,000 dollars and in the other two game tables 4*c* and 4*d*, the minimum bet amount is set to 1,000 dollars.

As shown in FIG. 45A, in the two game tables 4*a* and 4*b* in which the minimum bet amount is set to 10,000 dollars, the number of players participating in the game is large (table congestion degree is high), and as a result, in two game tables 4*c* and 4*d* in which the minimum bet amount is set to 1,000 dollars, the number of players participating in the game is small (table congestion degree is low).

In such a situation, the minimum bet management unit 616 raises to 10,000 dollars the minimum bet amount of the game table 4*d* in which the number of players participating in the game is smallest (table congestion degree is lowest) of the game tables 4*c* and 4*d* in which the minimum bet amount is 1,000 dollars. In doing so, as shown in FIG. 45B, it is expected that the player participating in the game on the game table 4*d* moves to the game table 4*c* with the minimum bet amount of 1,000 dollars and some of players participating in the game on the game tables 4*a* and 4*b* with the minimum bet amount of 10,000 dollars move to the game table 4*d* in which the minimum bet amount increases to 10,000 dollars.

As described with reference to FIGS. 43A and 43B, it is obvious that the sales of the house is higher in FIG. 45B than in FIG. 45A. As described above, the minimum bet management unit 616 sets the minimum bet amount of each game table 4 for each area so that the high-amount player may play the game on the game table 4 with the smaller number of persons according to the table congestion degree determined by the minimum bet management unit 616.

In this way, the minimum bet management unit 616 determines the recommendation value of the minimum bet amount of each game table 4 so as to reduce the average number of players in the game in the game table 4 in which the minimum bet amount is high. Therefore, the minimum bet management unit 616 may lower the recommendation value of the minimum bet amount when the game table 4 with the number of participants in the game equal to or smaller than a predetermined number of persons is equal to or larger than a predetermined ratio.

As described above, in the example, the minimum bet management unit 616 manages a plurality of game tables 4 and determines the total bet amount for each of the plurality of game tables 4, for each game and/or for each predetermined time or for each predetermined period, and for each player to set different minimum bet amounts with respect to the plurality of game tables, respectively.

The minimum bet management unit 616 calculates the area congestion degree of each area when the casino game arcade is divided into a plurality of areas based on the information on the number of players determined by the control device 14 as a player number determination device. The area congestion degree is a ratio of the total number of players to the total number of player positions in the area. Moreover, the minimum bet management unit 616 may set the ratio of the game table 4 whose table congestion degree exceeds a predetermined value (for example, 80%) for each area as the area congestion degree.

The minimum bet management unit 616 determines all game tables 4 in the casino game arcade and the number of opened game tables 4 among them, and determines the recommended number of game tables 4 to be opened for each area according to the area congestion degree determined by the minimum bet management unit 616. Specifically, when the area congestion degree becomes equal to or greater than a predetermined value (80% in the embodiment), the minimum bet management unit 616 determines to newly open the game table 4 in the area.

When opening a new game table 4, the minimum bet management unit 616 sets the minimum bet amount of the game table 4. The minimum bet management unit 616 may simply set the same minimum bet amount as the minimum bet amount of the game table 4 around the newly opened game table 4 in the newly opened game table 4. As a result, customers are guided to the area to efficiently play the game.

Figure 46A:
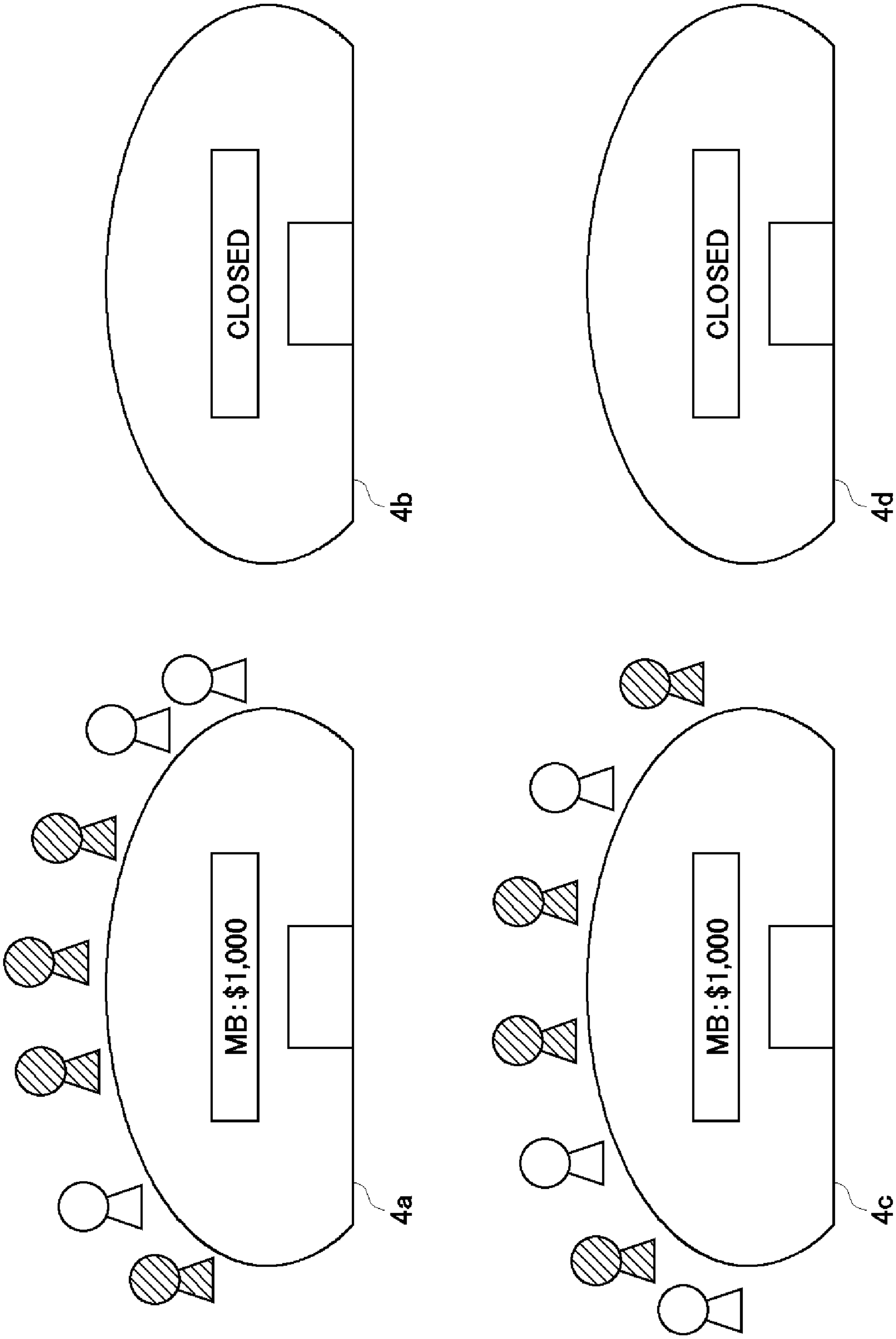
FIG. 46A is a diagram for describing an example in which a game table 4 is newly opened in a predetermined area.
Figure 46B:
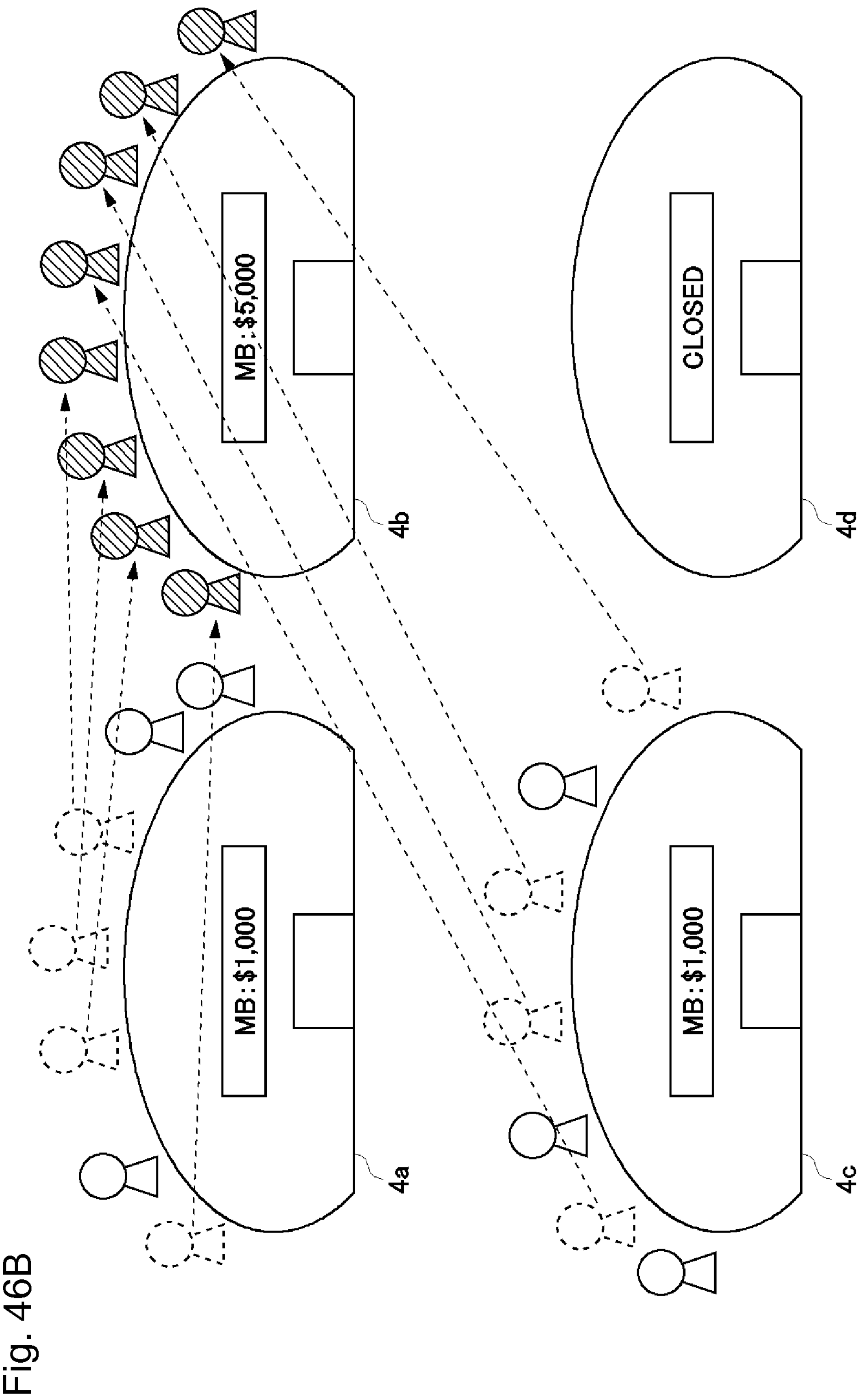
FIG. 46B is a diagram for describing an example in which a game table 4 is newly opened in a predetermined area.
Figure 46C:
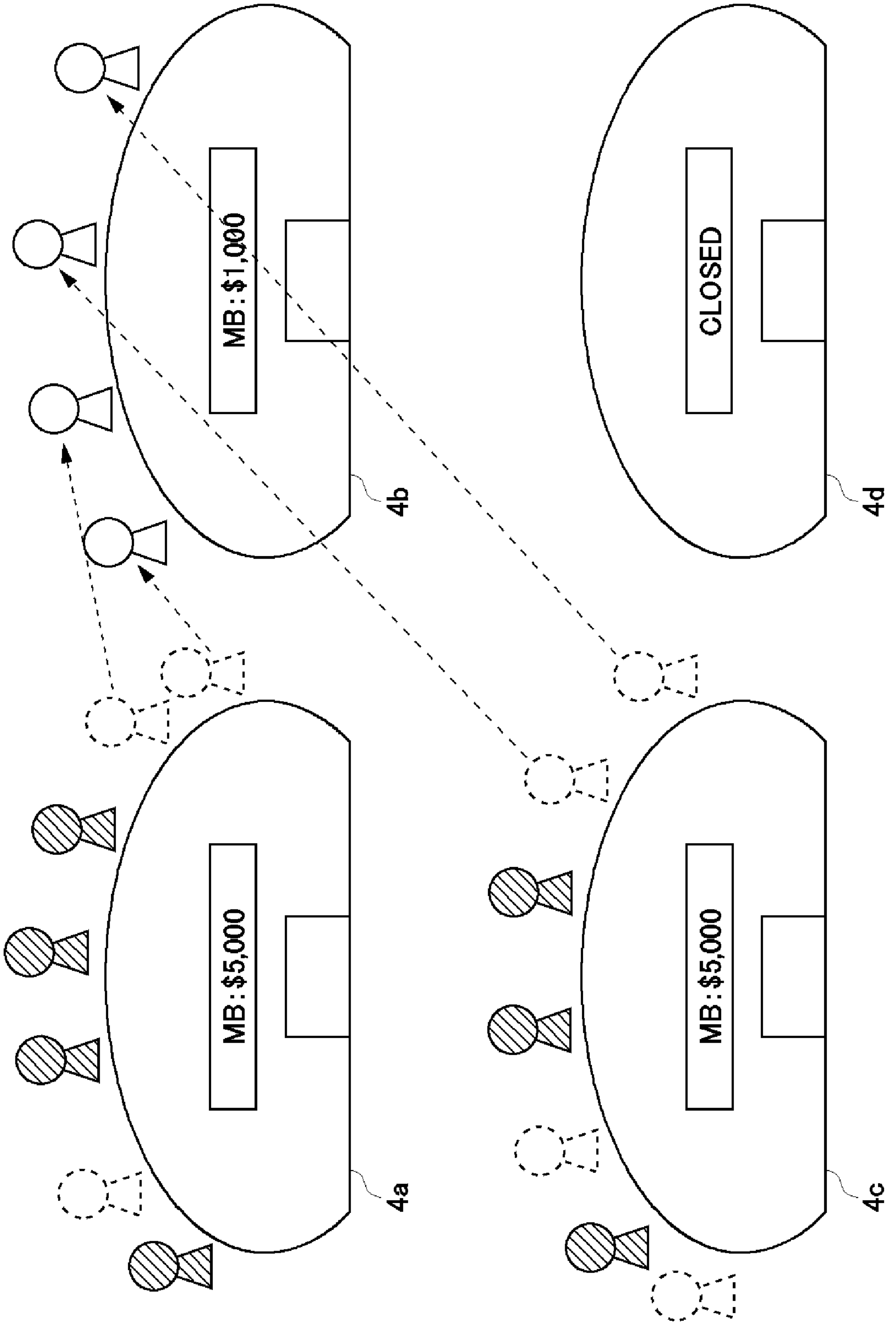
FIG. 46C is a diagram for describing an example in which a game table 4 is newly opened in a predetermined area.

Meanwhile, the minimum bet management unit 616 may set the minimum bet amount so that the sales of the house is maximized in order to newly open the game table 4. FIGS. 46A to 46C are diagrams for describing an example in which a game table 4 is newly opened in a predetermined area. Herein, it is also assumed that the average required time of one game when the player plays alone is 60 seconds and the average required time of one game increases by 10 seconds each time the number of players increases by one. Further, the average bet amount of the high-amount player (hatched player in the drawing) is set to 5,000 dollars and the average bet amount of the low-amount player (the player painted in white in the drawing) is set to 1,000 dollars.

In the case of FIG. 46A, the game tables 4*a* and 4*c* are opened, seven players participate in the game for each of the eight people, four of them are the high-amount players, and three players are the low-amount players. FIG. 46B shows a case where the game table 4*b* is newly opened in the situation of FIG. 46A and the minimum bet amount is set to 5,000 dollars. By setting the minimum bet amount of the newly opened game table 4*b* to 5,000 dollars, it may be considered that all the high-amount players playing on the game tables 4*a* and 4*c* move to the game table 4*b* as shown in FIG. 46B.

In the case of FIG. 46B, the average sales of 1.38 million dollars per hour in the situation of FIG. 46A is reduced to 1.377 million dollars per hour. In this way, when newly opening the game table 4, depending on the setting of the minimum bet amount, the sales does not increase much or even decrease in some cases. Furthermore, considering the cost by opening the new game table 4, the profit of a casino manager will decrease.

In the case of FIG. 46A, as shown in FIG. 46C, the minimum bet amount is set low for the newly opened game table 4*b*, and at the same time, it is effective to increase the minimum bet amount for the already opened game tables 4*a* and 4*c*. By doing this, the average sales of 1.38 million dollars per hour in the situation of FIG. 46A increases to 1.76 million dollar per hour.

In this manner, the minimum bet management unit 616 determines the minimum bet amount of the newly opened game table 4 based on the minimum bet amount and the actual bet amount of the game table 4 around the game table 4. Further, as in the example of FIG. 46C, the minimum bet management unit 616 changes the minimum bet amount of the surrounding game table 4 at the timing of opening the new game table 4, so that the minimum bet management unit 616 urges the movement of the player from the surrounding game table 4 to the newly opened game table 4.

The minimum bet management unit 616 manages the dealer who is at work and determines whether to open the new game table 4 according to the number of dealers. Specifically, even when the area congestion degree becomes high, when there are no dealer waiting (to be allowed to move) (that is, all dealers are on the game table 4) and when the game table 4 which may be newly opened disappears (that is, when all of the game tables 4 are opened), the minimum bet management unit 616 does not determine to open the new game table 4 and the minimum bet management unit 616 responds by changing the minimum bet amount of the already opened game table 4.

The minimum bet management unit 616 records the transition of the area congestion degree in the recording unit 62 for each area to determine the recommended number of game table 4 to be opened for each area based on the recorded transition information. That is, when the area congestion degree tends to increase, the minimum bet management unit 616 determines to open the new game table 4 before the area congestion degree reaches a predetermined value in the area.

As described above, in the example, the minimum bet management unit 616 manages a plurality of game tables 4 and determines the total bet amount for each of the plurality of game tables 4, for each game and/or, for each predetermined time or for each predetermined period, and for each player to set the minimum bet amount with respect to the newly opened game table.

The minimum bet management unit 616 records the bet amount and withdrawal/collection information included in the game record in the recording unit 62 in association with the member ID. In this way, the minimum bet management unit 616 records past play contents in the recording unit 62 for each player.

Based on the game record, the minimum bet management unit 616 further calculates with respect to each player the average bet amount, an average continuous play time in the same table, an absence rate when the minimum bet amount increases, a recent winning rate, the winning amount, etc. from the past play contents based on the game record, and stores them in the recording unit 62 as tendency information of each player in association with the member ID.

The minimum bet management unit 616 may determine the recommended number of game tables to be newly opened based on the tendency information of the plurality of players in the area recorded in the recording unit 62 for each area. Further, the minimum bet management unit 616 sets the minimum bet amount of the currently opened game table 4 based on the tendency information of the plurality of players in the area recorded in the recording unit 62 for each area or set the minimum bet amount of the newly opened game table 4.

That is, in the above description, it is assumed from the state of FIG. 46A that all of the high-amount players move to the game table 4*b* when the game table 4*b* having a relatively high minimum bet amount is newly opened as shown in FIG. 46B, but actually, there is a possibility that the player does not move as shown in FIG. 46B. Further, in FIG. 46C, it is assumed that all of the low-amount players leave when the minimum bet amount increases in the game tables 4*a* and 4*c*, but the low-amount player may increase the bet amount corresponding to the increased minimum bet amount and remain in the same game tables 4*a* and 4*c*. Therefore, the minimum bet management unit 616 performs a simulation using the probability based on a tendency of each player stored in the recording unit 62 to set the minimum bet amount so as to maximize the sales.

The dealer accommodates the chips 9 collected from the losing player in the chip tray 17 and also withdraws the chips 9 from the chip tray 17 to the winning player. Therefore, the number of chips 9 in the chip tray 17 increases or decreases.

When many chips 9 are collected and may not be accommodated in the game table 4, the dealer calls a staff (pit manager) of a nearest pit to collect the chips 9. On the contrary, even if many chips 9 are withdrawn and the chips to be withdrawn in the game liquidation are insufficient, the dealer calls the staff of the nearest pit to replenish the chips 9.

When the dealer chip amount after liquidation in the game record sent from the control device 14 exceeds a predetermined upper limit threshold value and falls below a predetermined lower limit threshold value, the dealer chip management unit 617 notifies the nearest pit of the game table 4 of the effect. The notification includes at least the table number of the corresponding game table 4 and information indicating collection or replenishment.

As a result, the pit manager may collect or replenish the corresponding game table 4 according to the notification from the management device 60. Further, the dealer does not need to pay attention to the timing of calling the pit manager and may concentrate on dealing of the game.

As described above, according to the table game management system of the embodiment, by installing various sensors in each game table 4, the fraud or the mistake is automatically discovered and the fraud or the mistake is reduced, thereby increasing the gross profit of the house. Further, by statistically processing sensing data acquired for discovering the fraud and mistake, various analyses to increase the gross profit of the house are conducted and presented to the game organizer. This allows the game organizer not only to increase gross profit by reducing passive factors such as fraud and loss due to the mistake but also to increase the gross profit by strengthening more aggressive factors.

Moreover, in the embodiment, the management system 100 has a configuration including the plurality of control devices 14 installed for each game table 4 and the management device 60 connected to the plurality of control devices 14, but some or all functions of the control device 14 may be provided in the management device 60 or some or all functions of the management device 60 may be provided in the control device 14 of each game table 4. That is, the configurations and functions of the control device 14 and the management device 60 described above may be implemented by a device which may be provided in each game table 4 or a device which may be provided in places (for example, the backyard) different from the game table 4.

As described above, according to the third embodiment, in the game table 4, the bet contents are determined by the camera 2 and the control device 14 as the image recognition device, the game result is determined by the card distribution device 3, and the dealer amount is determined by the antenna and the RF reader and the information is intensively managed by the management devices 50 and 60, and as a result, it is possible to automatically determine the sales, the profit, the profit rate, etc. of a casino operator.

In the embodiment described above, the win or lose determination device is realized by the card distribution device 3, that is, the card distribution device 3 has a configuration of performing win or lose determination, but the win or lose determination may be performed by the control device 14. In this case, from the card distribution device 3, the information read out from the distributed card (card reading information) is transmitted to the control device 14, and the control device 14 determines the win or lose result of the game according to the game rule, on the basis of the card reading information from the card distribution device 3, as the win or lose determination device.

In addition, in the embodiment described above, the calculation unit 511 calculates the sales, the profit, and the profit rate, and the table creation unit 512 creates the table or the graph by adding up the calculated sales, profit, and profit rate, but instead thereof, a part or all of the adding-up may be performed by the calculation unit 511, and the table creation unit 512 may create the table or the graph by using the added-up result of the calculation unit 511.

What is claimed is:

1. A management system for management of games in a casino having a plurality of game tables, comprising:
- for each game table of the plurality of game tables:
  - a camera configured to capture an image of one or more chips on the game table;
  - an image analyzer with a deep learning structure configured to identify positions, types, and number of chips on the game table based on an image analysis of the image; and
  - a controller configured to, for each player position or each player at the game table, determine an amount bet based on the identified positions, types, and number of chips; and
- a management device configured to, based on the amount bet for each player position or each player at each game table of the plurality of game tables:
  - calculate a profit rate, for a predetermined period of time or a predetermined number of games, and
  - detect a peculiar situation by using a machine learning model based on a transition of the profit rate.

2. The management device according to claim 1, wherein, for each game table of the plurality of game tables, the image analyzer is configured to perform the image analysis on the image.

3. The management device according to claim 1, wherein the management device is configured to receive, in association with each game table of the plurality of game tables, an indication of the bet amount of the game table for each player position or each player at the game table.

4. The management device according to claim 1, wherein the management device is configured to provide a benefit to a player.

5. The management system according to claim 1, further comprising a reader configured to read a member card of a player.

6. The management system according to claim 1, further comprising, for each game table of the plurality of game tables, a player identification device configured to identify a player who plays at the game table.

7. The management system according to claim 6, wherein the management device is further configured to record a bet amount for each player identified by the player identification device.

8. The management system according to claim 1, wherein, for at least one game table of the plurality of game tables, the camera of the game table is configured to capture one or more images of a plurality of stacks of chips placed offset in the depth direction along with the layout of the betting areas of the game table.

9. The management system according to claim 8, wherein, for the at least one game table of the plurality of game tables, the image analyzer of the game table is configured to recognize the chips even when some of the stacks of chips are hidden by other stacks of chips.

10. The management system according to claim 1, wherein the machine learning model is a model of outputting a probability of being peculiar by using the transition of the profit rate as input, and in a case where the probability is more than or equal to a predetermined threshold value, the management device determines that the peculiar situation is detected.

* * * * *